(12) United States Patent
Ma et al.

(10) Patent No.: US 11,935,048 B2
(45) Date of Patent: Mar. 19, 2024

(54) MANAGING BLOCKCHAIN-BASED TRUSTABLE TRANSACTION SERVICES

(71) Applicant: ALIPAY (HANGZHOU) INFORMATION TECHNOLOGY CO., LTD., Zhejiang (CN)

(72) Inventors: Qisheng Ma, Hangzhou (CN); Feifei Jin, Hangzhou (CN); Xuan Tao, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/855,363

(22) Filed: Jun. 30, 2022

(65) Prior Publication Data

US 2022/0335421 A1   Oct. 20, 2022

Related U.S. Application Data

(63) Continuation of application No. PCT/CN2020/120037, filed on Oct. 9, 2020.

(51) Int. Cl.
*G06Q 20/38* (2012.01)
*G06Q 20/24* (2012.01)
(Continued)

(52) U.S. Cl.
CPC .......... *G06Q 20/389* (2013.01); *G06Q 20/24* (2013.01); *G06Q 20/4016* (2013.01); *G06Q 10/0838* (2013.01); *G06Q 30/04* (2013.01)

(58) Field of Classification Search
CPC ............................ G06Q 40/025; H04L 9/0643
See application file for complete search history.

(56) References Cited

U.S. PATENT DOCUMENTS

2007/0288326 A1   12/2007   Boldin
2008/0086397 A1   4/2008    Hahn-Carlson
(Continued)

FOREIGN PATENT DOCUMENTS

CN   101617333   12/2009
CN   101876983   11/2010
(Continued)

OTHER PUBLICATIONS

Extended European search report in Euroepan Application No. 20956527.4, dated Nov. 9, 2022, 11 pages.
(Continued)

*Primary Examiner* — Ojo O Oyebisi
(74) *Attorney, Agent, or Firm* — Fish & Richardson P.C.

(57) ABSTRACT

Disclosed herein are methods, systems, and apparatus, including computer programs encoded on computer storage media, for managing blockchain-based trustable transaction services. One of the methods includes: storing order data of an order between a buyer and a seller on a blockchain of a blockchain network, the order data including one or more payment conditions and data of a trustable undertaking (TU) service for the order, verifying that the buyer has the TU service for the order guaranteed by the buyer financial institution, generating a smart contract for the order based on the order data on the blockchain, and executing the smart contract to automatically instruct the buyer financial institution to make a payment of the order for the buyer to the seller according to the TU service for the order in response to determining that a payment condition for the payment specified in the smart contract is met.

19 Claims, 17 Drawing Sheets

(51) Int. Cl.
 *G06Q 20/40* (2012.01)
 *G06Q 10/083* (2023.01)
 *G06Q 30/04* (2012.01)

(56) References Cited

U.S. PATENT DOCUMENTS

| | | | |
|---|---|---|---|
| 2016/0364702 | A1 | 12/2016 | Bianchi et al. |
| 2018/0025442 | A1 | 1/2018 | Isaacson et al. |
| 2018/0068008 | A1 | 3/2018 | Cruanes et al. |
| 2018/0232417 | A1 | 8/2018 | Das et al. |
| 2018/0268479 | A1 | 9/2018 | Dowling |
| 2019/0318433 | A1 | 10/2019 | McGee et al. |
| 2020/0118068 | A1 | 4/2020 | Turetsky et al. |
| 2020/0175588 | A1* | 6/2020 | Li .................... G06Q 40/03 |
| 2020/0259666 | A1 | 8/2020 | Jacobs et al. |
| 2020/0272619 | A1 | 8/2020 | Alferov |
| 2020/0294128 | A1 | 9/2020 | Cella |
| 2020/0374128 | A1 | 11/2020 | Kurian et al. |
| 2022/0292467 | A1 | 9/2022 | Shinya |

FOREIGN PATENT DOCUMENTS

| | | |
|---|---|---|
| CN | 104657459 | 5/2015 |
| CN | 107516184 | 12/2017 |
| CN | 109102411 | 12/2018 |
| CN | 109325331 | 2/2019 |
| CN | 109325830 | 2/2019 |
| CN | 109493196 | 3/2019 |
| CN | 110390597 | 10/2019 |
| CN | 110751484 | 2/2020 |
| CN | 110992020 | 4/2020 |
| CN | 110992211 | 4/2020 |
| CN | 111127187 | 5/2020 |
| CN | 111652707 | 9/2020 |
| WO | WO 2017098519 | 6/2017 |
| WO | WO 2018045372 | 3/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Search Report and Written Opinion in International Application No. PCT/CN2020/120035, dated Jun. 29, 2021, 8 pages.
PCT International Search Report and Written Opinion in International Application No. PCT/CN2020/120037, dated Jun. 30, 2021, 2021, 8 pages.
PCT International Search Report and Written Opinion in International Application No. PCT/CN2020/120039, dated Jul. 7, 2021, 8 pages.
Nobul, "Nobul Corporation Introduces Blockchain to its Real Estate Platform," Sep. 2018, PR Newswire, retrieved from URL <https://www.pmewswire.com/news-releases/nobul-corporation-introduces-blockchain-to-its-real-estate-platform-300708295.html>, 6 pages.
Anonymous, "Blockchain in Procurement—Industry Trends—Rowse," March 202, retrieved from the Internet: URL <https://web.archive.org/web/20200805083351/https://www.rowse.co.uk/blog/post/blockchain-inprocurement>, retreived on Sep. 28, 2022, 4 pages.
Extended European search report in Euroepan Application No. 20956525.8, dated Oct. 10, 2022, 11 pages.
Extended European search report in Euroepan Application No. 20956525.8, dated Oct. 10, 2022, 12 pages.
Antgroup, "Ant Group Launches "Trusple", an Antchain-powered global trade and finance platform for SMEs and financial institutions", Businesswire, Sep. 28, 2020, 3 pages.
PCT International Preliminary Report on Patentability in International Application No. PCT/CN2020/120037, dated Apr. 20, 2023, 5 pages.
PCT International Preliminary Report on Patentability in International Application No. PCT/CN2020/120039, dated Apr. 20, 2023, 5 pages.
PCT International Preliminary Report on Patentability in International Application No. PCT/CN2020/120035, dated Apr. 20, 2023, 7 pages.

* cited by examiner

800 

Invoice Info — 802

| Invoice Number | Order Number | Invoice Date | Buyer bank |
|---|---|---|---|
| INV0000001 | 25678000000 | 2020-05-12 | Standard Chartered Bank |

Buyer/Seller Info — 804

Seller Info
Name: BIG SELLER CO.
Registration address:  1 Marker street, Shanghai, China
Email:  Bigseller@gamil.com Buyer Info
Name: BIG BUYER CO.
Registration address:  1 Commerce street, London, UK
Email:  Bigbuyer@gamil.com

Logistics Info — 806

Shipping method: Sea
Shipiment Term: FOB
Shipping cost:  USD 2,000.00

Customs status: Pass
Customs No.: 200000000001
Shipping status:  in transit

Product Info — 808

| Picture | Name | Specification | Note | Number | Cost |
|---|---|---|---|---|---|
|  | Item 1 | Red / Dia. 80mm/ Height 20cm | N/A | 500 | USD 10,000.00 |
|  |  | Blue / Dia. 60mm/ Height 10cm | N/A | 500 | USD 10,000.00 |
|  |  | Green / Dia. 60mm/ Height 10cm | N/A | 500 | USD 10,000.00 |
|  | Item 2 | Red / Dia. 80mm/ Height 20cm | N/A | 500 | USD 10,000.00 |

810

Order total amount:  USD 40,000.00
Shipping cost:  USD 2,000.00
Shipping insurance fee:  USD 1,000.00
Order total cost:  USD 43,000.00

BPU Certificate

| Bank payment undertaking (BPU) | | | | | |
|---|---|---|---|---|---|
| BPU No. | Order No. | Buyer Name | Seller Name | Buyer bank | |
| BPU0000001 | 25679000000 | BIG BUYER COMPANY | BIG SELLER COMPANY | Standard Chartered Bank | — 902 |

| BPU Data | |
|---|---|
| BPU Amount: USD 30,100.00 | Order total amount: USD 40,000.00 |
| BPU Effective date: 2020-05-10 | Payment condition: make payment after 30 days when seller submits bill of lading |

— 904

| Bank Account Info | |
|---|---|
| Buyer bank account | Seller bank account |
| Name: test001 | Name: test002 |
| Account No.: 523647222766531 | Account No.: 622222222999990 |
| Bank name: Standard Chartered Bank | Bank name: E-Commerce Bank |

— 906

| Shipping Info | |
|---|---|
| Shipping method: Sea | Shipment term: FOB |

— 908

| Product Info | | | | | | |
|---|---|---|---|---|---|---|
| Picture | Name | Specification | Note | Number | Cost | |
|  | Item 1 | Red / Dia. 90mm/ Height 20cm | N/A | 500 | USD 10,000.00 | |
|  |  | Blue / Dia. 60mm/ Height 10cm | N/A | 500 | USD 10,000.00 | — 910 |
|  |  | Green / Dia. 60mm/ Height 10cm | N/A | 500 | USD 10,000.00 | |
|  | Item 2 | Red / Dia. 90mm/ Height 20cm | N/A | 500 | USD 10,000.00 | |

| | |
|---|---|
| Order total amount: | USD 40,000.00 |
| Shipping cost: | USD 2,000.00 |
| Shipping insurance fee: | USD 1,000.00 |
| Order total cost: | USD 43,000.00 |

MANAGING BLOCKCHAIN-BASED TRUSTABLE TRANSACTION SERVICES

CROSS-REFERENCE TO RELATED APPLICATIONS

This application is a continuation of PCT Application No. PCT/CN2020/120037, filed on Oct. 9, 2020, which is hereby incorporated by reference in its entirety.

TECHNICAL FIELD

This specification relates to managing trustable transaction services based on blockchain technology.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities, which control the consensus process, and includes an access control layer.

Digital networks have enabled people around the world to find information and interact with each other conveniently and efficiently, which have also driven a vigorous development of transactions, e.g., trade including international trade or cross-border trade. However, in traditional transactions, transaction parties typically lack trust with each other, especially international transactions or cross-border transactions where the transaction parties are distant from each other and may have hardly any transaction history before. Although the transaction parties can reach an agreement on transaction terms such as payment terms in a contract or order, it is difficult to make sure that the transaction terms are met. For example, payment actions are generally controlled by buyers. Even if a buyer agrees to pay a seller, when to make the payment is still controlled by the buyer. Whether the buyer has made the payment is not transparent or immediately available to the seller, especially the payment involves international or cross-border money transfer between financial institutions in different countries or regions. In some cases, the seller can only confirm that the buyer has made the payment when the payment is actually received. Before that happens, the seller may have to manually or even repeatedly request the payment or the status of the payment. In some cases, trust and trustable services have been implemented based on escrow systems provided by transaction platforms for the transaction parties. However, these implementations require the transaction parties to open escrow accounts on the escrow systems and cannot use their own financial accounts in their own financial institutions, which may cause them lack of trust and security. The transaction platforms also take great risks as guarantees for the escrow accounts.

Additionally, although the seller has trade orders and promised payments from the buyer, the seller has not able to use the trade orders to obtain financing from financial institutions because the lack of trustable technologies for the financial institutions to verify authenticity of the trade orders.

Therefore, it would be desirable to develop new digital trustable technologies and systems that can create trust and provide trustable transaction services, e.g., in international trade or cross-border trade for multiple participants including trading parties and financial institutions.

SUMMARY

Described embodiments of the subject matter can include one or more features, alone or in combination.

For example, in one embodiment, a system for managing blockchain-based trustable transaction services, including: a blockchain network of a plurality of trustable nodes that includes: a trading platform node corresponding to a trading platform for providing blockchain-based trustable trading services between a buyer and a seller, where the buyer is verified to have a trustable automatic payment service guaranteed by a buyer financial institution that automatically makes a payment on behalf of the buyer in response to that a condition specified in a smart contract deployed on a blockchain of the blockchain network is met; and a buyer financial institution node corresponding to the buyer financial institution. The trading platform node is configured to: store order data of an order on a corresponding blockchain for the order after the order is confirmed by the buyer and the seller on the trading platform, the order data including one or more payment conditions for the order; and generate a corresponding smart contract for the order based on the order data of the order, where the corresponding smart contract includes an automatic function that automatically instructs the buyer financial institution to make an order payment for the order to the seller in response to determining that a corresponding payment condition for the order payment is met. The buyer financial institution node is configured to: communicate with a computing device of the buyer financial institution to verify that the buyer has the trustable automatic payment service guaranteed by the buyer financial institution, and execute the corresponding smart contract, where executing the corresponding smart contract includes automatically instructing the computing device of the buyer financial institution to make the order payment to the seller in response to determining that the corresponding payment condition for the order payment is met.

In some embodiments, one or more of these general and specific embodiments may be implemented using a device, a system, a method, or a computer-readable media, or any combination of devices, systems, methods, and computer-readable media. The foregoing and other described embodiments can each, optionally, include one or more of the following embodiments:

In some embodiments, one or more of these general and specific embodiments may be implemented using a device, a system, a method, or a computer-readable media, or any combination of devices, systems, methods, and computer-readable media. The foregoing and other described embodiments can each, optionally, include one or more of the following embodiments:

In some embodiments, the buyer financial institution node is configured to: receive order payment data confirming that the buyer financial institution has made the order payment to the seller; and store the order payment data on the corresponding blockchain.

In some embodiments, the trading platform is configured to: receive the order payment data from the corresponding blockchain; and feed back a payment status to the buyer and the seller based on the order payment data.

In some embodiments, the buyer financial institution node is configured to: execute the corresponding smart contract to automatically instruct the computing device of the buyer financial institution to make the order payment to the seller in response to determining that a predetermined time has reached or a predetermined time period has lapsed after the corresponding payment condition for the order payment is met.

In some embodiments, the buyer financial institution node is configured to: execute the corresponding smart contract to generate an automatic payment command in response to determining that the corresponding payment condition for the order payment is met; and transmit the automatic payment command to the computing device of the buyer financial institution, the automatic payment command instructing the computing device of the buyer financial institution to make the order payment to the seller according to the trustable automatic payment service.

In some embodiments, the buyer financial institution node is configured to store order payment data on the corresponding blockchain, the order payment data confirming that the order payment has been made by the buyer financial institution to the seller.

In some embodiments, the buyer has a buyer financial account in the buyer financial institution, and the seller has a seller financial account in a seller financial institution, and the buyer financial institution node is configured to execute the corresponding smart contract to automatically instruct the computing device of the buyer financial institution to make the order payment directly to the seller financial account in the seller financial institution, without going through the trading platform, in response to determining that the corresponding payment condition for the order payment is met.

In some embodiments, the blockchain network of the plurality of trustable nodes further includes a seller financial institution node corresponding to the seller financial institution.

In some embodiments, one of the buyer financial institution and the seller financial institution is an offshore entity, and the other one of the buyer financial institution and the seller financial institution is an onshore entity. The offshore entity and the onshore entity are subject to different financial regulations, and the buyer financial institution node corresponding to the buyer financial institution and the seller financial institution node corresponding to the seller financial institution belong to the same blockchain network of the plurality of trustable nodes.

In some embodiments, the buyer financial institution node is configured to: in response to the automatic payment command, transfer a digital value corresponding to the order payment to the seller financial institution node.

In some embodiments, the seller financial institution node is configured to: store payment reception data on the corresponding blockchain, the payment reception data confirming that the order payment has been received by the seller financial account in the seller financial institution from the buyer financial institution.

In some embodiments, the trading platform node is configured to: after the buyer logs in a buyer trading account on the trading platform, communicate with the buyer financial institution node to verify whether a buyer financial account of the buyer in the buyer financial institution is qualified for the trustable automatic payment service on the trading platform, the buyer trading account including information of the buyer financial account.

In some embodiments, the trading platform is configured to: permit the buyer to draft or review the order on the trading platform in response to determining that the buyer financial account is qualified for the trustable automatic payment service.

In some embodiments, the corresponding smart contract further includes: an order status update function that automatically updates a status of the order in response to determining the status of the order is changed based on order status data uploaded to the corresponding blockchain.

In some embodiments, the order status data includes at least one of logistics data, supplychain data, customs data, bill of lading data, or payment data.

In some embodiments, the status of the order indicates at least one of: products associated with the order having been prepared or shipped by the seller, the products having been inspected by a customs office, the products being transported by at least one logistics provider, a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, a consensus having been reached between the buyer and the seller on the order, the automatic payment having been made by the buyer financial institution, the automatic payment having been received by the seller, or the products having been received by the buyer.

In some embodiments, the blockchain network of the plurality of trustable nodes further includes at least one of: a customs office node corresponding to a customs office, where the order status data includes custom data uploaded to the corresponding blockchain by the customs office node, or a logistic provider node corresponding to at least one logistics provider, where the order status data include logistic data uploaded to the corresponding blockchain by the logistic provide node.

In some embodiments, the one or more payment conditions includes a first payment condition for a first payment for the order and a second payment condition for a second payment for the order. The buyer financial institution node is configured to: execute the corresponding smart contract to automatically instruct the computing device of the buyer financial institution to make the first payment to the seller in response to determining that the first condition for the first payment is met, and execute the corresponding smart contract to automatically instruct the computing device of the buyer financial institution to make the second payment to the seller in response to determining that the second condition for the second payment is met.

In some embodiments, the first payment is an initial payment of the order, and the first payment condition includes the order having been validated on the trading platform, and the second payment is a remaining payment of the order, and the second payment condition includes at least one of: a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, or a consensus having been reached between the buyer and the seller on the order.

In some embodiments, the system includes the trading platform.

In some embodiments, the trading platform node is configured to generate the corresponding smart contract for the order from a smart contract template based on the order data, the smart contract template including a plurality of functions for the trustable trading services, and in generating the corresponding smart contract for the order, the trading platform node is configured to call one or more of the plurality of functions in the smart contract template and use the order data as input to the one or more of the plurality of functions in the smart contract template.

For example, in another embodiment, a system for managing blockchain-based trustable transaction services, including: a blockchain network of a plurality of trustable nodes that includes: a trading platform node corresponding to a trading platform for providing blockchain-based trustable trading services between a buyer and a seller, where the buyer is verified to have a trustable undertaking (TU) service guaranteed by a buyer financial institution that automatically makes a payment for the buyer to the seller based on a credit of the buyer in the buyer financial institution in response to that a condition specified in a smart contract deployed on a blockchain of the blockchain network is met; and a buyer financial institution node corresponding to the buyer financial institution. The trading platform node is configured to: store order data of an order on a corresponding blockchain of the blockchain network for the order after the order is confirmed by the buyer and the seller on the trading platform, the order data including one or more payment conditions for the order and TU service data representing a corresponding TU service for the order, and generate a corresponding smart contract for the order based on the order data of the order, where the corresponding smart contract includes an automatic function that automatically instructs the buyer financial institution to make an order payment for the order to the seller according to the corresponding TU service for the order in response to determining that a corresponding payment condition for the order payment is met. The buyer financial institution node is configured to: communicate with a computing device of the buyer financial institution to verify that the buyer has the corresponding TU service for the order guaranteed by the buyer financial institution, and execute the corresponding smart contract, where executing the corresponding smart contract includes automatically instructing the computing device of the buyer financial institution to make the order payment to the seller according to the corresponding TU service in response to determining that the corresponding payment condition for the order payment is met.

In some embodiments, one or more of these general and specific embodiments may be implemented using a device, a system, a method, or a computer-readable media, or any combination of devices, systems, methods, and computer-readable media. The foregoing and other described embodiments can each, optionally, include one or more of the following embodiments:

In some embodiments, the buyer financial institution node is configured to: receive order payment data confirming that the buyer financial institution has successfully made the order payment to the seller according to the corresponding TU service for the order; and store the order payment data on the corresponding blockchain.

In some embodiments, the blockchain network of the plurality of trustable nodes further includes a seller financial institution node corresponding to a seller financial institution. The seller has a seller financial account in the seller financial institution, and the seller financial institution node is configured to store payment reception data on the corresponding blockchain, the payment reception data confirming that the order payment for the order has been received by the seller financial account in the seller financial institution from the buyer financial institution.

In some embodiments, the trading platform node is configured to: determine, based on the TU service data, that the buyer selects to use the corresponding TU service for the order on the trading platform, and transmit a request to the computing device of the buyer financial institution through the buyer financial institution node, the request requesting the buy financial institution to verify whether the buyer is qualified for the corresponding TU service for the order guaranteed by the buyer financial institution.

In some embodiments, the trading platform is configured to provide a user interface for receiving user input of the order data, and the user interface includes a selection to use the corresponding TU service for the order.

In some embodiments, the buyer financial institution node is configured to: receive verification data from the computing device of the buyer financial institution, the verification data confirming that the buyer has the corresponding TU service for the order guaranteed by the buyer financial institution, and store the verification data on the corresponding blockchain.

In some embodiments, the trading platform is configured to: determine, based on the verification data stored on the corresponding blockchain, that the buyer has the corresponding TU service for the order guaranteed by the buyer financial institution, and validate the order after determining that the buyer has the corresponding TU service for the order guaranteed by the buyer financial institution.

In some embodiments, the trading platform node is configured to transmit the request after storing the order data of the order on the corresponding blockchain.

In some embodiments, the corresponding payment condition for the order payment is determined based on the corresponding TU service for the order.

In some embodiments, the buyer financial institution node is configured to execute the corresponding smart contract to automatically instruct the computing device of the buyer financial institution to make the order payment to the seller according to the corresponding TU service for the order in response to determining that a predetermined time has reached or a predetermined time period has lapsed after the corresponding payment condition for the order payment is met.

In some embodiments, the predetermined time or the predetermined time period is determined based on the corresponding TU service for the order.

In some embodiments, the one or more payment conditions includes a first payment condition for a first payment for the order and a second payment condition for a second payment for the order. The second payment is the order payment made according to the corresponding TU service, and the second payment condition includes the corresponding payment condition. The buyer financial institution node is configured to execute the corresponding smart contract to automatically instruct the computing device of the buyer financial institution to make the second payment to the seller according to the corresponding TU service for the order in response to determining that the second payment condition for the second payment is met.

In some embodiments, the buyer financial institution node is configured to: execute the corresponding smart contract to automatically instruct the computing device of the buyer financial institution to make the first payment to the seller according to a trustable automatic payment service for the buyer provided by the buyer financial institution in response to determining that the first payment condition for the first payment is met.

In some embodiments, the trading platform node is configured to: after the buyer logs in a buyer trading account on the trading platform, communicate with the computing device of the buyer financial institution through the buyer financial institution node to verify whether a buyer financial account of the buyer in the buyer financial institution is qualified for the trustable automatic payment service, the buyer trading account including information of the buyer financial account.

In some embodiments, the first payment is an initial payment for the order, and the first payment condition includes a validation of the order. The second payment is a remaining payment for the order, and the second payment condition includes at least one of: a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, or a consensus having been reached between the buyer and the seller on the order.

In some embodiments, the corresponding smart contract further includes an order status update function that automatically updates a status of the order in response to determining the status of the order is changed based on order status data uploaded to the corresponding blockchain.

In some embodiments, the status of the order indicates at least one of: products associated with the order having been prepared or shipped by the seller, the products having been inspected by a customs office, the products being transported by at least one logistics provider, a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, a consensus having been reached between the buyer and the seller on the order, the automatic payment having been made by the buyer financial institution, the automatic payment having been received by the seller, or the products having been received by the buyer.

In some embodiments, the blockchain networks of the plurality of trustable nodes further includes at least one of: a customs office node corresponding to the customs office, the order status data including custom data uploaded to the corresponding blockchain by the customs office node, or a logistic provider node corresponding to the at least one logistics provider, the order status data including logistic data uploaded to the corresponding blockchain by the logistic provide node.

In some embodiments, the order status data includes at least one of logistics data, supplychain data, customs data, bill of lading data, or payment data.

In some embodiments, the system includes the trading platform.

For example, in another embodiment, a system for managing blockchain-based trustable transaction services, including: a blockchain network of a plurality of trustable nodes that includes: a trading platform node corresponding to a trading platform for providing blockchain-based trustable trading services between a buyer and a seller, where the buyer has a buyer financial account in a buyer financial institution, and the seller has a seller financial account in a seller financial institution, and where the buyer is verified to have a trustable undertaking (TU) service guaranteed by the buyer financial institution that automatically makes a payment for the buyer based on a credit of the buyer in the buyer financial institution in response to that a condition specified in a smart contract deployed on a blockchain of the blockchain network is met; a buyer financial institution node corresponding to the buyer financial institution; and a seller financial institution node corresponding to the seller financial institution. The trading platform node is configured to: store order data of an order on a corresponding blockchain of the blockchain network for the order after the order is confirmed by the buyer and the seller on the trading platform, the order data including one or more payment conditions for the order and data representing a corresponding TU service for the order, generate a trustable undertaking certificate for the order based on the TU service data, the trustable undertaking certificate including an amount of the order payment for the order, and store the trustable undertaking certificate for the order on the blockchain. The seller financial institution node is configured to: transmit the trustable undertaking certificate to a computing device of the seller financial institution to determine whether to approve a financing request of the seller based on the trustable undertaking certificate.

In some embodiments, one or more of these general and specific embodiments may be implemented using a device, a system, a method, or a computer-readable media, or any combination of devices, systems, methods, and computer-readable media. The foregoing and other described embodiments can each, optionally, include one or more of the following embodiments:

In some embodiments, one of the buyer financial institution and the seller financial institution is an offshore entity, and the other one of the buyer financial institution and the seller financial institution is an onshore entity. The offshore entity and the onshore entity are subject to different financial regulations. The buyer financial institution node corresponding to the buyer financial institution and the seller financial institution node corresponding to the seller financial institution belong to the same blockchain network of the plurality of trustable nodes.

In some embodiments, the seller financial institution node is configured to: receive approval data from the computing device of the seller financial institution, the approval data indicating that the seller financial institution has approved the financing request of the seller for a financing amount based on the trustable undertaking certificate, and store the approval data on the blockchain, where the approval data references the trustable undertaking certificate.

In some embodiments, the seller financial institution node is configured to: receive financing payment data from the computing device of the seller financial institution, the financing payment data confirming that a financing amount associated with the financing request has been paid by the seller financial account in the seller financial institution, and store the financing payment data on the blockchain.

In some embodiments, the trustable undertaking certificate includes at least one of: an identifier of the trustable undertaking certificate, an effective time of the trustable undertaking certificate, the corresponding payment condition for the order payment, information of the order including at least one of an order identifier, a total cost of the order, or product information, logistics information for the order including at least one of a shipping method, a trade term, a shipping cost, or a shipping insurance cost, information of the buyer and the seller, information of the buyer financial institution and the seller financial institution, or information of the buyer financial account in the buyer financial institution and the seller financial account in the seller financial institution.

In some embodiments, the seller financial institution node is configured to: receive payment reception data from the computing device of the seller financial institution, the payment reception data confirming that the order payment for the order has been received by the seller financial account in the seller financial institution from the buyer financial institution, and store the payment reception data on the blockchain.

In some embodiments, the trading platform node is configured to: generate a corresponding smart contract for the order based on the order data of the order. The corresponding smart contract includes an automatic function that automatically instructs the buyer financial institution to make an order payment for the order to the seller according to the corresponding TU service for the order in response to determining that a corresponding payment condition for the order payment is met.

In some embodiments, the trading platform node is configured to: verify whether the buyer is authorized for the corresponding TU service for the order on the trading platform with a computing device of the buyer financial institution through the buyer financial institution node.

In some embodiments, generating the trustable undertaking certificate for the order on the blockchain is in response to verifying that the buyer is authorized for the corresponding TU service for the order guaranteed by the buyer financial institution.

In some embodiments, the trading platform node is configure to submit a verification request with the trustable undertaking certificate to a computing device of the buyer financial institution through the buyer financial institution node, and the buyer financial institution is configured to verify whether the buyer is authorized for the corresponding TU service for the order based on the trustable undertaking certificate.

In some embodiments, the trading platform node is configured to: in response to verifying that the buyer is authorized for the corresponding TU service for the order guaranteed by the buyer financial institution, transmit a verification message to the trading platform confirming that the buyer is authorized for the corresponding TU service for the order.

In some embodiments, the trading platform is configured to validate the order after receiving the verification message from the trading platform node.

In some embodiments, the trading platform node is configured to transmit the verification request after storing the order data of the order on the blockchain.

In some embodiments, the corresponding payment condition is determined based on the corresponding TU service for the order.

In some embodiments, the buyer financial institution node is configured to: execute the corresponding smart contract, where executing the corresponding smart contract includes automatically instructing the computing device of the buyer financial institution to make the order payment to the seller according to the corresponding TU service for the order in response to determining that the corresponding payment condition for the order payment is met.

In some embodiments, the buyer financial institution node is configured to: execute the corresponding smart contract to generate an automatic payment command in response to determining that the corresponding payment condition for the order payment is met, the automatic payment command instructing the computing device of the buyer financial institution to make the order payment to the seller according to the corresponding trustable undertaking service for the order; and transmit the automatic payment command to the computing device of the buyer financial institution.

In some embodiments, the blockchain network is configured to: execute the corresponding smart contract to automatically instruct the computing device of the buyer financial institution to make the order payment to the seller according to the corresponding TU service for the order in response to determining that a predetermined time has reached or a predetermined time period has lapsed after the corresponding payment condition is met.

In some embodiments, the predetermined time or the predetermined time period is determined based on the corresponding TU service for the order.

In some embodiments, the one or more payment conditions includes a first payment condition for a first payment for the order and a second payment condition for a second payment for the order. The second payment is the order payment made according to the TU service for the order, and the second condition includes the corresponding payment condition.

In some embodiments, the buyer financial institution node is configured to: execute the corresponding smart contract to automatically instruct the computing device of the buyer financial institution to make the first payment to the seller according to a trustable automatic payment service for the buyer provided by the buyer financial institution in response to determining that the first payment condition for the first payment is met, and execute the corresponding smart contract to automatically instruct the computing device of the buyer financial institution to make the second payment to the seller according to the corresponding TU service for the order in response to determining that the second payment condition for the second payment is met.

In some embodiments, the first payment is an initial payment for the order, and the first payment condition includes a validation of the order. The second payment is a remaining payment for the order, and the second payment condition includes at least one of: a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, or a consensus having been reached between the buyer and the seller on the order.

In some embodiments, the trading platform node is configured to: after the buyer logs in a buyer trading account on the trading platform, communicate with the computing device of the buyer financial institution through the buyer financial institution node to verify whether a buyer financial account of the buyer in the buyer financial institution is qualified for the trustable automatic payment service, the buyer trading account including information of the buyer financial account.

In some embodiments, the corresponding smart contract further includes an order status update function that automatically updates a status of the order in response to determining the status of the order is changed based on order status data uploaded to the corresponding blockchain.

In some embodiments, the status of the order indicates at least one of: products associated with the order having been prepared or shipped by the seller, the products having been inspected by a customs office, the products being transported by at least one logistics provider, a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, a consensus having been reached between the buyer and the seller on the order, the automatic payment having been made by the buyer financial institution, the automatic payment having been received by the seller, or the products having been received by the buyer.

In some embodiments, the blockchain networks of the plurality of trustable nodes further includes at least one of: a customs office node corresponding to the customs office, the order status data including custom data uploaded to the corresponding blockchain by the customs office node, or a logistic provider node corresponding to the at least one logistics provider, the order status data including logistic data uploaded to the corresponding blockchain by the logistic provide node.

In some embodiments, the order status data includes at least one of logistics data, supplychain data, customs data, bill of lading data, or payment data.

In some embodiments, the system includes the trading platform.

It is appreciated that methods in accordance with this specification may include any combination of the embodiments described herein. That is, methods in accordance with this specification are not limited to the combinations of embodiments specifically described herein, but also include any combination of the embodiments provided.

The details of one or more embodiments of this specification are set forth in the accompanying drawings and the description below. Other embodiments and advantages of this specification will be apparent from the description and drawings, and from the claims.

BRIEF DESCRIPTION OF THE DRAWINGS

FIG. 8 is a diagram illustrating an example of a blockchain trade invoice in accordance with embodiments of this specification.

FIG. 9 is a diagram illustrating an example of a trustable undertaking certificate in accordance with embodiments of this specification.

Like reference numbers and designations in the various drawings indicate like elements.

DETAILED DESCRIPTION

Figure 1:
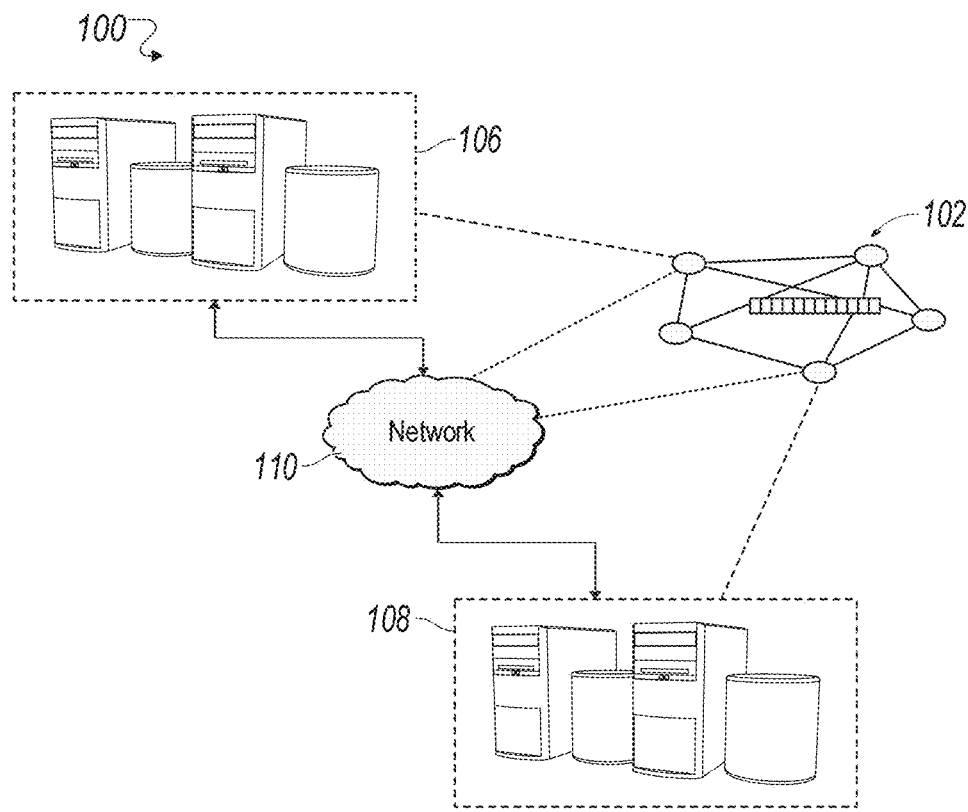
FIG. 1 is a diagram illustrating an example of an environment that can be used to execute embodiments of this specification.

This specification describes technologies for managing trustable transaction services based on a new blockchain architecture that enhances several aspects of data exchange between possibly unaffiliated entities. The trustable transaction services can include trading services, payment services, financing services, data exchange services, or any other transaction services. These technologies can implement a new trustable transaction (e.g., trading and financing) service system by integrating a number of trustable nodes into a blockchain network to provide trustable transaction services to transaction entities (e.g., trading parties), especially for international order or cross-border transactions. These technologies can create a trustable transaction platform that allow transaction parties, e.g., small and medium-size enterprises (SMEs), which may be unaffiliated and have no or weak trust before, to be able to communicate and conduct business with each other in a reliable and efficient manner. These technologies can bridge the trust gap between the transaction parties and connect them through a transaction platform. The technologies can integrate the transaction platform, financial institutions such as offshore banks and onshore banks, customs offices, logistics providers, and/or any other relevant entities as the network nodes in the blockchain network to create a new ecosystem, for example, for providing trusted digital international or cross-border transactions. The new ecosystem improves upon prior transaction systems in several ways. For example, implementations of the technologies described in this specification can provide more secure, reliable efficient, convenient, diversified, inclusive, and transparent transaction services. The new ecosystem also implements a system that enhances trust between the transaction parties and trust between enterprises and financial institutions. The new ecosystem can make transactions more secure and reliable, make financial loans transparent and credible or valid, and make services efficient and convenient or effective. For illustration purposes, in this specification, a trading service (that can also include a financial service such as a payment service) is described as an example of a transaction service; a trading platform or system is described as an example of a transaction platform or system, an order (e.g., a purchase order or another trade order) is described as an example of a transaction between transaction entities; and a buyer and a seller is described as an example of a pair of transaction entities. The described techniques can be applied to additional or different examples of transaction services.

The techniques can overcome well-known problems with conventional transaction systems (e.g., trading systems), such as weak or insufficient trust between participants, low efficiency, low degree of digitization, high transaction cost, long payment turnover, financing pressures on enterprises such as SMEs, and lack of transparency. For example, the techniques implemented herein can avoid complex offline processes and reviewing and can make a trade, especially international or cross-border trade, with lower transactional cost, automatic settlements, easy access to enterprises' credit, and authenticated orders and counterparties. The technologies can mitigate trade risk, e.g., mitigate uncertainties (such as in shipping products and making payments) and risks by using traceable trade data and trustable automatic payment services, and help deliver inclusive and efficient financial services. The technologies can create a next generation global transaction system to serve global entities such as enterprises including SMEs.

The techniques described in this specification produce several technical effects. In some embodiments, the technologies can establish a new blockchain-based trading system with hardware and software that integrate a selected groups of network nodes to build a blockchain network. The selected groups of network nodes can include, for example, computer systems of one or more trading platform, financial institutions of trading parties, and one or more customs offices, logistics providers. The selected network nodes are trustable nodes with enhanced trust guaranteed by consensus processes and data immutability, reliability, transparency, traceability, and verifiability in the established blockchain network. In some embodiments, the blockchain network can be, for example, a consortium blockchain network, with additional safeguard in controlling whether an entities can be jointed as a network node of the blockchain network for providing trustable transaction services. In some embodiments, the technologies can establish achieve enhanced data security, provide more secure and reliable communication channels, reduce latency in data transmission, order operation triggering, and confirmation receiving to provide trustable trading services. In some embodiments, the technologies can define and deploy one or more smart contracts the smart contracts on blockchains of the blockchain network to automatically trigger payment and other trading operations and enable trustable trading services. For example, once a buyer and a seller (or a supplier) generate (or confirm) a trade order on a trading platform, the order can be automatically uploaded and recorded on a blockchain of the blockchain network, which is traceable and tamperproof. The order can include order details such as order terms, one or more payment conditions, and a payment time. A corresponding smart contract can be generated once the order is recorded on the blockchain. As the order is executed, the smart contract can be automatically executed to track and update order status data transmitted by the trustable nodes in the blockchain network. The order status data can include, for example, order placement data, logistics data, customs data, payment data, and tax refund option information. Using the blockchain, the buyer financial institution and seller financial institution can automatically process the payment settlements through the smart contract. For example, the smart contract can include an automatic function that automatically instructs the buyer financial institution to make a payment for the order to the seller in response to determining that a corresponding payment condition for the payment is met. The automatic triggering and immutability features of the smart contract can enhance the seller's trust and assurance in the payment of the order and be more willing to conduct business with the seller.

In some embodiments, the buyer's payment can be backed or guaranteed by the buyer financial institution to further enhance the trust. In some cases, the buyer is verified to have a trustable automatic payment (AP) service guaranteed by the buyer financial institution that automatically makes a payment on behalf of the buyer in response to that the payment condition specified in the smart contract on the blockchain is met. According to the trustable AP service, a computing device of the buyer financial institution automatically executes an action to make a payment transaction without receiving an authorization or confirmation from the buyer in response to that the payment condition specified in the smart contract on the blockchain is met. In some cases, the buyer is verified to have a trustable undertaking (TU) service, e.g., a bank payment undertaking (BPU) service, guaranteed by the buyer financial institution that automatically makes the payment for the buyer to the seller based on a credit of the buyer in the buyer financial institution in response to that the condition specified in the smart contract on the blockchain is met. According to the TU service, the computing device of the buyer financial institution executes an action to make a payment transaction no matter whether the buyer financial account has enough money or fund in the buyer financial institution and without receiving an authorization or confirmation from the buyer.

In some embodiments, the technologies can improve efficiency and reduce latency in a sequence of operations in a trading order (including product shipping, different stages of payments, payment confirmation, etc.). In some embodiments, the sequence of operations in a particular trading order can be written into a smart contract customized for the trading order, with defined triggering conditions. Once the trigger conditions are satisfied, the smart contract can automatically trigger a next operation and thus reduce the processing latency and ensure ordered execution of the trading process. In addition, during the actual execution of the trading order, data related to the trading order (e.g., logistics data and payment data) can be uploaded and stored in the blockchain, for example, by the trustable nodes in real time or substantially real time. The smart contract can receive the data (as input to trigger further operations) and track and update the status of the trading order based on the received data. Each of the trustable nodes in the blockchain network can have transparency and trust in the order status and order data stored in the blockchain. As an example, payment confirmation data from the buyer financial institution and/or payment reception data from the seller financial institution can be timely returned and recorded on the blockchain and made available to other trustable nodes in the blockchain network. For example, the trading platform can receive the payment confirmation data and/or payment reception data instantaneously and feed back the payment status to the buyer and the seller. In such a way, the payment for the order can be guaranteed and the latency of payment confirmation can be reduced, which can make the payment more efficient and transparent. The trust between the buyer and the seller can be built and increased. The buyers' and suppliers' on-chain trust can continue to accumulate.

In some embodiments, the technologies can enable trustable financing services for buyers. For example, the buyer can apply for a corresponding TU service from a buyer financial institution for an order to be made with a seller. The buyer financial institution can verify whether the buyer is qualified for the TU service for the order, for example, based on a credit of the buyer in the buyer financial institution. If the buyer is verified to be qualified for the TU service, the buyer financial institution can make a payment commitment and guarantee (or promise) to make a payment for the order to the seller once the payment condition is met. In such a way, the TU service can convert the buyer's credit in the buyer financial institution into a credit of the buyer financial institution, which can increase the credibility and leverage of the buyer in the trade. Thus, the buyer can use the TU service to negotiate better order terms, e.g., payment terms such as longer payment time. The TU service can capitalize the buyer's credit in the buyer financial institution, and can use the buyer financial institution's guarantee to increase the buyer's credit in the trade. For example, the blockchain network can generate a trustable undertaking certificate for the order based on, for example, order data, logistics data, customs data, and/or invoice data. The resulting trustable undertaking certificate can be deposited, transferred, and traded on the blockchain like an asset. The buyer can ask the buyer financial institution to provide the TU service for the order based on the trustable undertaking certificate.

In some embodiments, the technologies can enable trustable financing services for sellers. For example, with the TU service guaranteed by the buyer financial institution, the seller does not need to concern about whether the buyer would make the payment from after the seller ships products, and can have certainty that the payment would be made by the buyer financial institution to ensure funding liquidity and security of the seller. The trustable financing services can also help the seller secure more financing based on the TU-backed trade orders. As an example, when the seller has financing needs, the seller can submit a financial request, e.g., for a financial loan, to the seller financial institution. The seller financial institution can verify whether the seller is qualified for the financial loan based on on-chain trust of the trading parties, e.g., the trustable undertaking certificate generated on the blockchain. In some embodiments, the trustable undertaking certificate can function as receivables of the seller, and be regarded as any other types of assets of the seller that can be transferred or used for financing. In some embodiments, the seller financial institution can submit verification requests to the blockchain network to check credible trade data on the blockchain and obtain the trustable undertaking certificate, or the seller can submit the financial request with the trustable undertaking certificate. If the seller financial institution verifies that the seller is qualified for the financial loan, the seller can get the financial loan for its financial needs. The seller can repay the financial loan, e.g., with the payment received from the buyer financial institution according to the TU service for the order.

In some embodiments, the technologies can provide trustable trading services of trading, for example, to a large number of trading parties, through a unified, more user friendly interface, while reducing the infrastructure cost and operating cost of the trading entities. In some embodiments, the buyer and the seller do not join the blockchain network as the trustable nodes. Instead, the trading platform, as a trustable node in the blockchain network, can serve as the common interface of a buyer and a seller, and provide secure and trustable trading services between the buyer and the seller. However, in some embodiments, the trading platform does not need to act as an escrow system between the buyer and the seller, and the buyer and the seller do not need to open their own financing or monetary accounts in the trading platform to make payments. Instead, the buyer and the seller can exchange money or make payment using their own bank accounts with their respective banks end to end without channeling the money or other type of payment through the trading platform, which can be more efficient and reliable. In this way, the trading platform can scale to accommodate a large number of buyers and sellers, can save the buyers' and sellers' operating expenses (OPEX) in continuing with their respective financial instructions, without the need to open new financing or monetary accounts. On other hand, the large number of buyers and sellers can enjoy the blockchain-based trustable trading services, without itself joining the blockchain network as a network node, which in turn saves the infrastructure cost by limiting the trustable nodes to the trading platform, one or more financial institutions, logistics providers, customs offices, and/or any relevant parties that can serve multiple buyers and sellers. Such a structure of the blockchain-based trading platform can also and improve operational efficiency of the blockchain network by reducing network traffic and computational load in performing consensus before storing data into the blockchain of the blockchain network. The technologies can provide more opportunities to trading platforms or trading marketplaces, to trading parties, to financial institutions, to logistics providers, to customs offices, and/or to any relevant parties.

In some embodiments, the technologies provide additional capabilities for making trustable connections between possibly unaffiliated entities. For example, the technologies can connect the trading platforms with buyer financial institutions, seller financial institutions, logistics providers or companies, or supplychain companies to build a trustable trade network in the form of a blockchain alliance to provide guarantee trade services. The technologies can make the trading and financing services have the traceable, decentralized, immutable, and transparent features, with which all participants (or parties) on the blockchain are able to build a better trust system. The trust system can allow trading to be made and assets or credits to be transferred more reliably and efficiently.

In some embodiments, the technologies can enhance the security and convenience of performing electronic transactions. For example, the technologies can provide secure and convenient transactions, smart and inclusive finance, efficient and digital order management. In some embodiments, the technologies can make data on the blockchain as the source of truth by distributing the control fairly to parties to use the system with the transparency of the transaction history. Through upstream and downstream cross-validation, uploading source data to a blockchain, and blockchain consensus mechanisms, the authenticity of the data on the blockchain can be guaranteed, so that trade participants can efficiently obtain real trade data from the blockchain and improve collaboration efficiency. In some embodiments, the blockchain network can generate a blockchain trade invoice that can integrate real trade data on the blockchain to form a voucher. The voucher can be used as a basis for verification of trade authenticity by participants, as well as a transaction voucher for buyers and sellers, and even as a basis for payment. The blockchain trade invoice can be used to verify the authenticity of trade, without complex offline processes and requirements of a variety of certification materials and paperwork.

To provide further context for embodiments of this specification, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a hash of the previous block. Each block also includes a local timestamp (e.g., provided by a computing device that generates the block or a computing system that manages the blockchain), its own hash, and one or more transactions. For example, the block can include a block header and a block body. The block header can include the local timestamp, its own hash, and a hash of the previous block. The block body can include payload information such as the one or more transactions (or transaction data). The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

Whereas a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

In some embodiments, a centralized ledger system can also adopt the data structure of a blockchain to leverage immutability, reliability, and trustworthiness of data stored on a blockchain. In some embodiments, such a centralized ledger system can be referred to as a blockchain-based centralized ledger system or a universal auditable ledger service system. In some embodiments, the blockchain-based centralized ledger system can include a central trusted authority that provides transparent, immutable, and cryptographically verifiable data that are stored in blocks of a blockchain data structure. The stored data can be in a log format, including, for example, not only for transaction logs but also other transaction data and block data. Due to the existence of the central trusted authority, the blockchain-based centralized ledger system does not need to perform consensus processes to establish trust. In some embodiments, the blockchain-based centralized ledger system can be more efficient compared to a typical blockchain-based distributed or decentralized ledger system. In some embodiments, the blockchain-based centralized ledger system can provide a cloud-based storage service with enhanced trust, efficiency, and storage performance.

In some embodiments, the centralized ledger system can be a node of a blockchain network. For example, the centralized ledger system can be a non-consensus node in the blockchain network and can provide highly reliable and high-performance auditable streaming ledger services for the consensus nodes or other non-consensus nodes in the blockchain network, or entities outside of the blockchain network.

FIG. 1 is a diagram illustrating an example of an environment 100 that can be used to execute embodiments of this specification. In some examples, the environment 100 enables entities to participate in a consortium blockchain network 102. The environment 100 includes computing systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing systems 106, 108 can be nodes of a cloud computing system (not shown), or each of the computing systems 106, 108 can be a separate cloud computing system including a number of computers interconnected by a network and functioning as a distributed processing system.

In the depicted example, the computing systems 106, 108 can each include any appropriate computing system that enables participation as a node in the consortium blockchain network 102. Examples of computing systems include, without limitation, a server, a desktop computer, a laptop computer, a tablet computing device, and a smartphone. In some examples, the computing systems 106, 108 host one or more computer-implemented services for interacting with the consortium blockchain network 102. For example, the computing system 106 can host computer-implemented services of a first entity (e.g., user A), such as a transaction management system that the first entity uses to manage its transactions with one or more other entities (e.g., other users). The computing system 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
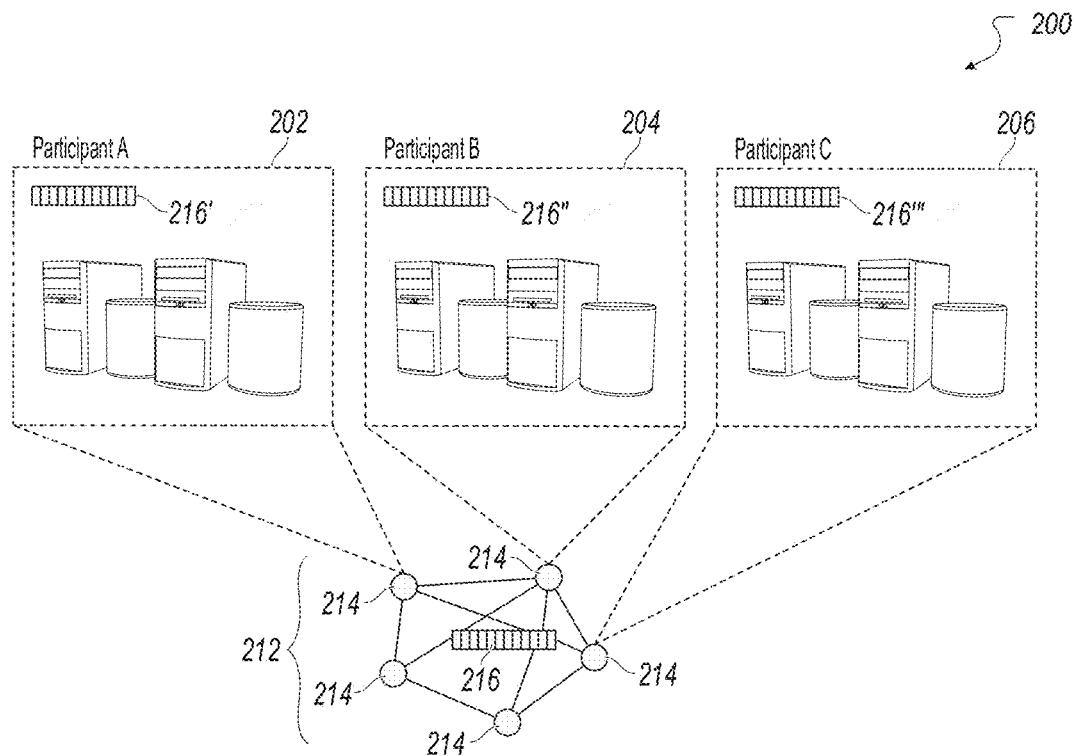
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including multiple nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", and 216''' of the blockchain 216.

A blockchain (e.g., the blockchain 216 of FIG. 2) is made up of a chain of blocks, each block storing data. Examples of data include transaction data representative of a transaction between two or more participants. Transaction data is used as an example of data record stored in the blockchain. Examples of a transaction can include, without limitation, exchanges of something of value (e.g., assets, products, services, currency). In some embodiments, one or more operations executed in the ledger system can be stored as transaction data in the blockchain. For example, the transaction data can include one or more operations or manipulations of data stored in the block chain, information (e.g., timestamp information) obtained from an external resource, or any appropriate data can be stored in a blockchain (e.g., documents, images, videos, audio). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed, Transactions are added to the blockchain by all consensus nodes within the blockchain network reaching an agreement as to the world state of the blockchain network. In this process, messages are transmitted between consensus nodes, and each consensus nodes proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
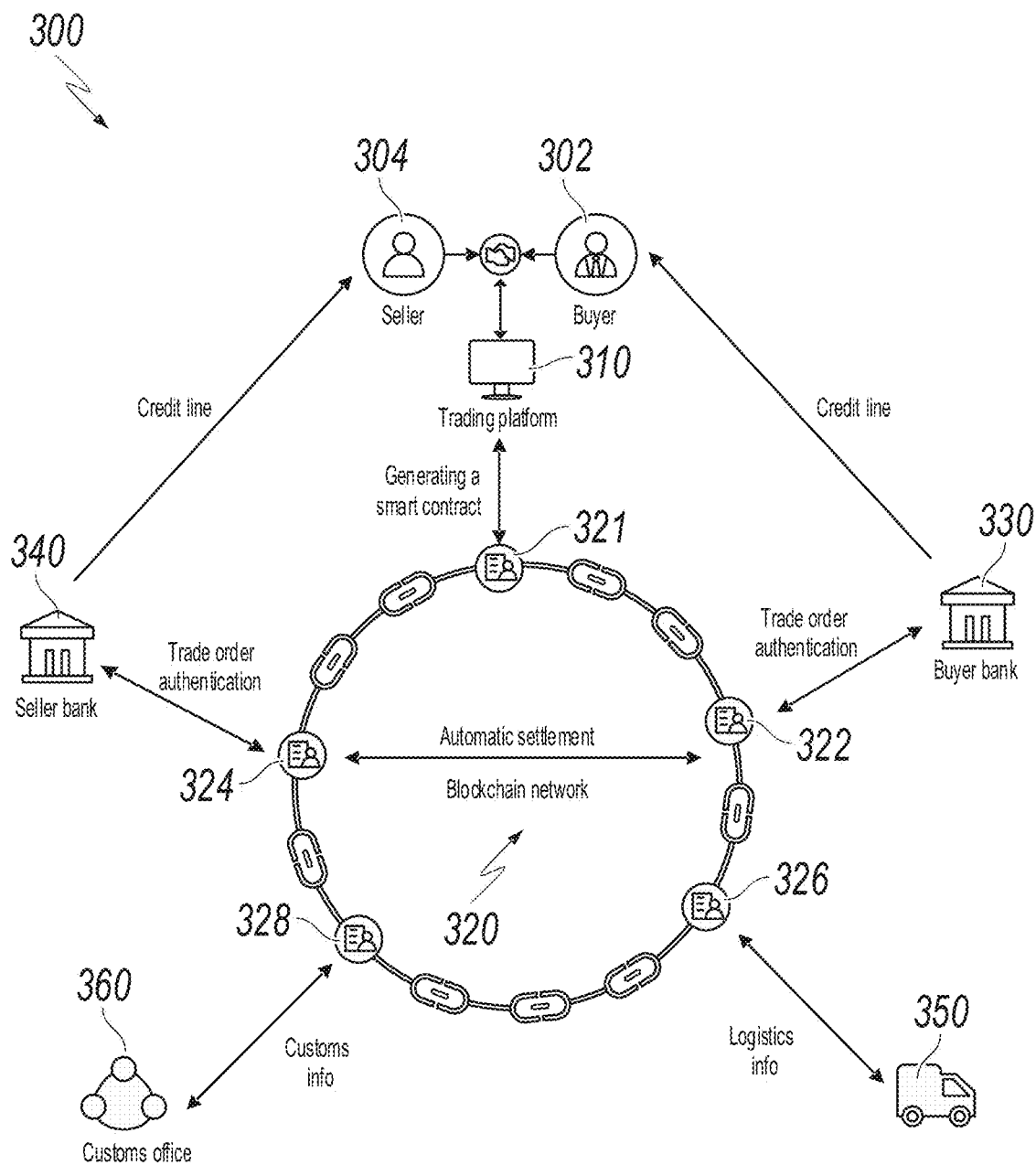
FIG. 3 is a diagram illustrating an example of a blockchain-based trustable transaction system implementing blockchain-based trustable trading services in accordance with embodiments of this specification.

FIG. 3 is a diagram illustrating an example of a blockchain-based trustable transaction system (such as a trading and financing system) 300 in accordance with embodiments of this specification. The blockchain-based trustable transaction system 300 implements blockchain-based trustable trading, financing, and other data-exchange services using a blockchain network 320. The blockchain network 320 can be the blockchain network 102 of FIG. 1 or the blockchain network 212 of FIG. 2. For illustration purposes, a consortium blockchain network is described as an example of the blockchain network 320, and the blockchain network 320 can also be a public or private blockchain network. The blockchain network 320 can be composed of a plurality of trustable nodes, e.g., nodes 321, 322, 324, 326, 328, for a selected group of participants, e.g., entities 310, 330, 340, 350, 360. Although FIG. 3 shows the nodes 321, 322, 324, 326, and 328 and their respective entities 310, 330, 340, 350, 360 with separated annotations, a person skilled in the art would understand that, in some embodiments, the nodes 321, 322, 324, 326, and 328 can integrate one or more computing devices of the their respective entities 310, 330, 340, 350, 360 as a single device or system, and vice versa. In some embodiments, the plurality of trustable nodes can be consensus nodes that control consensus processes of the blockchain network 320. Each of the plurality of trustable node can be, for example, the node 106 or 108 of FIG. 1 or the node 214 of FIG. 2. The blockchain network 320 can connect the participants, e.g., trading platforms, buyer financial institutions, seller financial institutions, logistics providers or companies, customs offices, and/or supplychain companies, together to build a trustable trade network in the form of a blockchain alliance to provide guaranteed trade services. The blockchain technologies can make the trading and financing services traceable, decentralized, immutable, and transparent, with which all participants on the blockchain are able to build a better trust system. The trust system can allow values to be transferred efficiently.

The participants can include one or more financial institutions, e.g., a buyer bank 330 and a seller bank 340. A financial institution can be a company engaged in the business of dealing with financial and monetary transactions such as deposits, loans, investments, and currency exchange. The financial institution can provide one or more financial services, such as payments, loans, and currency exchanges to clients. The financial institution can include, for example, a bank, a trust company, an insurance company, a brokerage firm, or an investment company. For illustration purposes, a bank is used as an example of a financial institution in the present disclosure, and the described techniques can be applied to any other type of financial institutions.

In some embodiments, as illustrated in FIG. 3, the blockchain network 320 includes a trustable trading platform node 321 corresponding to a trading platform 310. In some embodiments, the trustable trading platform node 321 and the trading platform 310 are communicatively connected. In some embodiments, the trustable trading platform node 321 and the trading platform 310 can be implemented as a single computing device or system. In some embodiments, the trustable trading platform node 321 and the trading platform 310 can be implemented as separated computing device or systems. In some embodiments, a trustable trading system can include the blockchain network 320 and the trading platform 310.

In some embodiments, the blockchain network 320 includes a number of trustable trading platform nodes for a number of different trading platforms. A trustable trading system can include the blockchain network 320 and the number of different trading platform 310.

The trading platform 310 can provide trading services for trading parties, e.g., buyers 302 and sellers 304. The trading parties can be individuals or enterprises, e.g., SMEs. The sellers 304 can be suppliers for providing products (including services). The trading platform 310 can be an international or cross-border trading platform that provides trading services to buyers and sellers in different countries or regions. In some embodiments, each buyer has a buyer trading account on the trading platform 310, and each seller has a seller trading account on the trading platform 310.

A buyer 302 can use a buyer client device (e.g., a mobile device, a laptop, a desktop, or any other type of a computing device) to log in the buyer trading account on the trading platform 310 with corresponding credential information and get verified to trade with one or more sellers on the trading platform 310. A seller 304 can use a seller client device (e.g., a mobile device, a laptop, a desktop, or any other type of a computing device) to log in the seller trading account on the trading platform 310 with corresponding credential information and get verified to trade with one or more buyers on the trading platform 310. One or both parties of the buyer 302 and the seller 304 can draft an order on the trading platform 310 and send to the other party for review. The other party can amend or confirm the order, until an agreement between the buyer 302 and the seller 304 is reached. After both of the buyer 302 and the seller 304 confirm the order, the trading platform 310 can upload order data of the order to the trading platform node 321. The order data can include, for example, information of the buyer 302, information of the seller 304, product information, and/or logistics information (e.g., shipping information). The order data can also include one or more order payments associated with one or more corresponding payment conditions and corresponding payment time. In some embodiments, each order payment can have a corresponding payment service.

The trading platform 310 can upload the order data of the order to the blockchain network 320 through the corresponding trading platform node 321. The trading platform node 321 can be configured to store the order data of the order on a blockchain of the blockchain network 320. The blockchain can store associated information of the order, including the order data, logistics data, payment data, customs data, supplychain data, invoice data, or any data related to the order. The blockchain can be accessed by each network node of the blockchain network. The blockchain can be the blockchain 216 of FIG. 2. In some embodiments, each network node of the blockchain network can store a local copy of the blockchain in its own storage space. In some embodiments, each node in the blockchain network 320 can receive corresponding order status data uploaded to the blockchain by a corresponding participant and store the corresponding order status data on the blockchain. For example, the order status data can include logistics data from a logistics provider 350 uploaded via a corresponding logistics provider node 326, supplychain data from a supplychain service company, customs data from a customs office 360 uploaded via a customs office node 328, bill of lading data from the trading platform to the trading platform node, or payment confirmation data from the buyer bank 330 uploaded via the buyer bank node 322 and/or payment reception data from the seller bank 340 uploaded via the seller bank node 324. In such a way, the blockchain network 320 can provide secure and convenient transactions, smart and inclusive finance, efficient and digital order management, which can make data on the blockchain as the source of truth and provide transparency of the transaction history to users of the blockchain-based trustable trading and financing system 300. Through upstream and downstream cross-validation, uploading source data to the blockchain and blockchain consensus mechanisms, the authenticity of the data on the blockchain can be guaranteed, so that the participants of the blockchain network 320, e.g., the trading platform 310, the buyer bank 330, the seller bank 340, the logistics provider 350, and the customs office 360, can efficiently obtain real trade data from the blockchain and improve collaboration efficiency.

In some embodiments, the blockchain network 320 can generate a blockchain trade invoice that can integrate real trade data on the blockchain to form a voucher. The voucher can be used as a basis for verification of trade authenticity by the participants, as well as a transaction voucher for buyers and sellers, and even as a payment confirmation. The blockchain trade invoice can be used to verify the authenticity of trade, without complex offline processes and requirements of a variety of certification materials and paperwork.

FIG. 8 illustrates an example of a blockchain trade invoice 800 in accordance with embodiments of this specification. The blockchain trade invoice 800 can be generated by the blockchain network 320, e.g., the trading platform node 321, based on order data of an order. The invoice 800 can be updated, e.g., dynamically or in real time, based on corresponding order status data of the order, e.g., customs information or logistics information that can be updated with a state change of the order. In some embodiments, the invoice 800 includes invoice information 802, buyer/seller information 804, logistics information 806, product information 808, and summary information 810.

As an example illustrated in FIG. 8, the invoice information can include an invoice number (or an invoice identifier), an order number of the order, an invoice date, and a buyer bank name. The buyer/seller information 804 can include seller information (e.g., seller name, registration address, email, or other contact information) and buyer information (e.g., buyer name, registration address, email, or other contact information). The logistics information 806 can include a shipping method (e.g., sea), a shipment term (e.g., free on board—FOB), a shipping cost. The logistics information 806 can also include a customs status (e.g., pass) and customs number, which can be updated with customs data provided by the customs office 360. The logistics information 806 can also include a shipping status (e.g., in transit), which can be updated with logistics data uploaded by the logistics provider 350. The production information 808 can include product picture, product name, specification, note, number, and cost. The summary information 810 can include an order total amount, the shipping cost, a shipping insurance fee, and a total cost of the order.

Referring back to FIG. 3, the trading platform node 321 can generate a smart contract corresponding to the order on the blockchain. A smart contract can include one or more computer-executable logics, instructions, scripts, or lines of codes that can be stored on the blockchain and automatically executed when one or more predetermined conditions are met. As the smart contract is stored on the blockchain of the blockchain network 320, the smart contract is executed by the trustable nodes of the blockchain network 320, and a result of the execution of the smart contract occurs through a consensus process among the nodes. The smart contract can enforce an agreement such that participants can be certain of an outcome without an intermediary's involvement. As an example, a smart contract can include functions such as "if/when . . . then . . . " written in the form of computer-executable codes. The smart contract can be deployed on the blockchain network, for example, by having a contract account corresponding to the smart contract on the blockchain, and the contract account has a specific address (also referred to as a smart contract address). The smart contract be invoked, for example, by a transaction on the blockchain transmitted from a network node, e.g., the node 321, 322, 324, 326, or 328 of the blockchain network 320. The network node can execute the smart contract when predetermined conditions have been met and verified. In some embodiments, the smart contract can be executed independently on each node in the blockchain network.

In some embodiments, the trading platform node 321 can generate a smart contract template that includes a plurality of logics or functions of the trustable trading services and deploy the smart contract template in the blockchain network 320. For each order, a transaction corresponding to the order can be generated based on the order data of the order. For example, the trading platform node 321 can generate a transaction to invoke or call one or more of the plurality of functions in the smart contract template and use the order data as input to the one or more of the plurality of functions in the smart contract template. The trading platform node 321 can submit the transaction corresponding to the order to the blockchain for storage and execution.

In some embodiments, the trading platform node 321 can generate a respective smart contract corresponding to each order and deploy the respective smart contract on the blockchain network 320. The respective smart contract are generated based on the order data of the corresponding order and include functions of the trustable trading services for the corresponding order.

In some embodiments, in the former implementation, the transaction corresponding to the order can be referred to as a smart contract corresponding to the order as well since the transaction also includes instructions or codes to invoke the functions defined in the smart contract template. In some embodiments, in either of the example implementations or other possible implementations, it is collectively described that a smart contract corresponding to an order can be generated based on the order data of the order. A person skilled in the art would understand that the smart contract corresponding to the order can be implemented in different ways to include logics or functions to realize trustable trading services for the corresponding order. For example, the trading platform node 321 is configured to generate the smart contract for the order from scratch, or the trading platform node 321 is configured to generate the smart contract for the order from a smart contract template based on the order data, and the smart contract template can include a plurality of functions for the trustable trading services. In the latter case, in generating the corresponding smart contract for the order, the trading platform node 321 can be configured to call one or more of the plurality of functions in the smart contract template and use the order data as input to the one or more of the plurality of functions in the smart contract template to generate the smart contract for the order as output.

In some embodiments, the smart contract for the order includes an order status update function that automatically updates a status of the order in response to determining the status of the order is changed based on the order status data uploaded to the blockchain. The status of the order can indicate, for example, products associated with the order having been prepared or shipped by the seller, the products having been inspected by the customs office 360, the products being transported by the logistics provider 350, a bill of lading associated with the order having been submitted by the seller 304 on the trading platform 310, the submitted bill of lading having been confirmed by the buyer 302 on the trading platform 310, an invoice associated with the order having been generated by the blockchain network 320, the generated invoice having been confirmed by the buyer 302, a consensus having been reached between the buyer 302 and the seller 304 on the order, a payment for the order having been made by the buyer bank 330, the payment for the order having been received by the seller bank 340, the products having been received by the buyer 302, or any other order status information.

In some embodiments, the buyer 302 has a buyer financial account in the buyer bank 330 that provides one or more financial services, e.g., payment services, to the buyer. The buyer trading account on the trading platform 310 can include information of the buyer financial account, e.g., a name of the buyer bank 330, an account number, and a name of the buyer. In some embodiments, the seller 304 has a seller financial account in a seller bank 340 that provides one or more financial services, e.g., deposit services and/or financial loan services, to the seller 304. The seller trading account on the trading platform 310 can include information of the seller financial account, e.g., a name of the seller bank 340, an account number, and a name of the seller. In some embodiments, an order payment of an order between the buyer and the seller can be made between the buyer bank 330 and the seller bank 340 without going through the trading platform 310. Thus, the trading platform 310 does not need to act as an escrow system between the buyer and the seller, which can mitigate a risk of the trading platform 310 as a guarantee. The buyer 302 and the seller 304 do not need to open their own financing or monetary accounts in the trading platform 310 to make payments. Instead, the buyer and the seller can exchange money or make payment using their own bank accounts with their respective banks end to end without going through the trading platform, which can be more reliable and more efficient, e.g., can save their costs and efforts and can reduce their concerns on the safety of their financial accounts.

In some embodiments, the buyer 302 and the seller 304 can be located or incorporated in different countries or regions so their trade is international trade or cross-border trade. Similarly, the buyer bank 330 and the seller bank 340 can be located or incorporated in different countries or regions and subject to different financial regulations. The payment or other asset transfer between the buyer bank 330 and the seller bank 340 can be international or cross-border transactions. For example, relative to the trading platform 310, one of the buyer bank 330 and the seller bank 340 is an offshore bank, and the other one of the buyer bank 330 and the seller bank 340 is an onshore bank. The offshore bank and the onshore bank can deal with different currencies that are incompatible. The blockchain-based trustable trading and financing system 300 create a reliable and secured platform that can make unaffiliated or incompatible entities compatible, e.g., enabling the buyer bank 330 and the seller bank 340 to conduct transactions by integrating the buyer bank node 322 for the buyer bank 330 and the seller bank node 324 for the seller bank 340 in the blockchain network 320.

In some embodiments, an order payment between the buyer 302 and the seller 304 from the buyer bank 330 to the seller bank 340 is made by a wire transfer. The wire transfer can be, for example, a Whale transfer or a SWIFT transfer. In some embodiments, the order payment can be made in digital currencies between the buyer bank 330 and the seller bank 340. In response to receiving a payment command, the buyer bank 330 can transfer a digital value corresponding to the order payment to the seller bank 340, e.g., in the blockchain network 320 through the buyer bank node 322 and the seller bank node 324 or in any other blockchain network.

As discussed with further details below, in some embodiments, the buyer bank 330 can provide a trustable automatic payment (AP) service to the buyer 302 for trading on the trading platform 310. The trustable AP service is guaranteed by the buyer bank 330 that automatically makes a payment on behalf of the buyer 302 in response to that a payment condition for the payment specified in a corresponding smart contract deployed on a corresponding blockchain of the blockchain network 320 is met. According to the trustable AP service, the buyer bank 330 can automatically make the payment without authorization or confirmation of the buyer 302. In such a way, the payment for the order can be guaranteed and can be made efficiently, effectively, and transparently. The trust between the buyer 302 and the seller 304 can be built or enhanced.

In some embodiments, the buyer 302 can select to use a corresponding trustable AP service for an order on the trading platform 310 when drafting the order or reviewing the order from the seller 304. After the order is confirmed by the buyer 302 and the seller 304, the trading platform 310 transmits order data of the order to the trading platform node 321 that stores the order data in a corresponding blockchain. The order data can include one or more order payments with one or more corresponding payment conditions and data of the trustable AP service for the order. The data of the trustable AP service can include an order payment using the trustable AP service. The trading platform node 321 can send a request to a computing device of the buyer bank 330 through the buyer bank node 322 to verify whether the buyer 302 or the buyer financial account is qualified for the trustable AP service for the order payment. The buyer bank 330 can determine the qualification of the buyer 302 or the buyer financial account based on, for example, a credit line of the buyer 302 or the buyer financial account. If the buyer bank 330 determines that the buyer 302 or the buyer financial account is qualified for the trustable AP service for the order payment, the computing device of the buyer bank 330 can transmit verification data to the buyer bank node 322 that stores the verification data on the blockchain for the order. Accordingly, the trading platform node 321 can send a verification message corresponding to the verification data to the trading platform 310. The trading platform 310 can confirm that the buyer 302 can use the trustable AP service for the order based on the verification message and can then validate the order. The validation of the order can be uploaded to the blockchain by the trading platform 310 via the trading platform node 321. The trading platform node 321 can generate a corresponding smart contract for the order. The corresponding smart contract can be executed to automatically instruct the computing device of the buyer bank 330 to make the order payment to the seller according to the trustable AP service in response to determining that the corresponding payment condition for the order payment is met.

In some embodiments, having a trustable AP service can be a base requirement or a default payment service for trading on the trading platform 310. After the buyer 302 logs in the buyer trading account on the trading platform 310, the trading platform node 321 can communicate with the buyer bank 330 to verify whether the buyer financial account of the buyer 302 or the buyer in the buyer bank 330 is qualified for the trustable AP service on the trading platform 310. The trading platform 310 can be configured to permit the buyer 302 to draft an order or review an order the seller 304 prepared on the trading platform 310 in response to determining that the buyer 302 or the buyer financial account associated with the buyer trading account is qualified for the trustable AP service. If the trading platform 310 determines that the buyer 302 or the buyer financial account is not qualified for the trustable AP service, the trading platform 310 can alert the buyer 302 and refuse the buyer 302 to work on the order.

As discussed with further details below, in some embodiments, the buyer bank 330 can also provide a trustable undertaking (TU) service, e.g., a trustable bank payment undertaking (BPU) service. The TU payment service is guaranteed by the buyer bank 330 that automatically makes a payment for the buyer 302 based on a credit of the buyer 302 in the buyer bank 330 in response to that a payment condition for the payment specified in a corresponding smart contract deployed on a corresponding blockchain is met. According to the TU service, the buyer bank 330 guarantees to make the payment no matter whether the buyer 302 has enough money or fund in the buyer bank 330, which can greatly increase the certainty of the payment and improve the trust between the buyer and the seller for the order. For illustration purposes, the trustable BPU service is used as an example of the TU service in the present disclosure, and the described techniques can be applied to any other type of trustable undertaking services.

In some embodiments, the trading platform 310 provides a user interface (e.g., a user interface 400 in FIG. 4), for example, to the buyer 302 and/or the seller 304 for receiving user input of order data. In some embodiments, the user interface can include a selection to use a corresponding trustable BPU service for at least one payment of the order with a corresponding payment condition and/or a corresponding payment time. The payment time indicates, for example, a time period after the payment condition is met and before executing the trustable BPU service for the payment. As the trustable BPU service can be guaranteed by the buyer bank 330, the buyer 302 can negotiate the payment time with the seller 304 based on the selection of the trustable BPU service for the payment of the order.

In some embodiments, if the trading platform 310 determines that the buyer 302 selects to use the trustable BPU service for the order confirmed by the buyer 302 and the seller 304, the trading platform 310 can request to verify whether the buyer bank 330 approves the buyer 302 to use the trustable BPU service for the order through the trading platform node 321 and the buyer bank node 322. The buyer bank 330 can determine the qualification of the buyer 302 or the buyer financial account, for example, based on a credit of the buyer 302 or the buyer financial account in the buyer bank 330. If the buyer bank 330 determines that the buyer 302 or the buyer financial account is qualified for the trustable BPU service for the order payment, the computing device of the buyer bank 330 can transmit verification data to the buyer bank node 322. The buyer bank node 322 can store the verification data for the order on the blockchain. Accordingly, the trading platform node 321 can receive the verification data for the order from the blockchain and send a verification message corresponding to the verification data to the trading platform 310. The trading platform 310 can confirm that the buyer 302 is qualified to use the trustable BPU service for the order based on the verification message and can then validate the order. The validation of the order can be uploaded by the trading platform 310 to the blockchain via the trading platform node 321. The trading platform node 321 can generate a corresponding smart contract for the order. The corresponding smart contract can be executed to automatically instruct the computing device of the buyer bank 330 to make the order payment to the seller 304 according to the trustable BPU service in response to determining that the corresponding payment condition for the order payment is met. The buyer bank 330 can make the payment commitment and guarantee to make the order payment for the order to the seller 304. In such a way, the trustable BPU service can convert the credit of the buyer bank 330 into the buyer's credit in the buyer bank 330, which can increase the credit of the buyer 302 in the trade. Thus, the buyer 302 can use the trustable BPU service to negotiate better order terms, e.g., payment terms such as more payment time, and/or lower initial payment amount. The trustable BPU service can capitalize the buyer's credit in the buyer bank 330, and can use the buyer bank 330's guarantee to increase the buyer's credit in the trade.

In some embodiments, a trustable undertaking certificate, e.g., a trustable BPU certificate, can be generated based on the order data of the order. The order data can include information of the buyer 302, information of the seller 304, product information, logistics information, and at least one payment using the trustable BPU service and corresponding payment condition.

FIG. 9 illustrates an example trustable undertaking certificate, e.g., a BPU certificate 900 generated based on order data of a corresponding order in accordance with embodiments of this specification. The BPU certificate 900 includes BPU information 902, BPU data 904, bank account information 906, shipping information 908, and product information 910. In some embodiments, the BPU information 902 includes a BPU certificate number (or an identifier of the BPU certificate), an order number, a buyer name, a seller name, and a buyer bank. The BPU data 904 can include a corresponding payment amount or BPU amount, an effective date of the BPU, a total cost of the order, and a corresponding payment condition, e.g., making payment after 30 days when seller submits bill of lading. The bank account information 906 can include information of a buyer bank account (e.g., buyer name, account number, and buyer bank name) and information of a seller bank account (e.g., buyer name, account number, and seller bank name). The shipping information 908 can include a shipping method, e.g., sea, and a shipment term (or trade term), e.g., FOB. The product information 910 can include product picture, name, specification, note, number, and cost. The BPU certificate 900 can also include summary information 912 that includes a shipping cost, a shipping insurance rate, the total amount of the order, and a total cost of the order.

Referring back to FIG. 3, the trustable undertaking certificate can be generated by the trading platform 310 or another trustable node in the blockchain network 320. The resulting trustable undertaking certificate can be deposited, transferred, and traded on the blockchain like an asset. The trustable undertaking certificate can be used by the buyer 302, the seller 304, or both.

In some embodiments, after an order is confirmed by the buyer 302 and the seller 304, the trading platform 310 determines that the buyer 302 selects a trustable BPU service for at least one payment for the order, and the trading platform 310 can generate a corresponding trustable undertaking certificate, e.g., a trustable BPU certificate (e.g., the BPU certificate 900), based on order data of the order. The trading platform 310 can submit the trustable undertaking certificate and the order data to the trading platform node 321 to be stored on a corresponding blockchain of the blockchain network 320. The buyer 302 can ask the buyer bank 330 to provide the trustable BPU service for the payment of the order based on the trustable undertaking certificate. The trustable undertaking certificate can be a proof of authentication of the order. The buyer bank 330 can verify whether the buyer 302 is qualified for the trustable BPU service for the payment of the order based on a credit of the buyer 302 in the buyer bank 330.

In some embodiments, the trading platform node 321 can receive the order data of the order from the trading platform 310. In some embodiments, the order data of the order includes user input data indicating that the buyer 302 selects the trustable BPU service for the payment of the order. The trading platform node 321 can determine that the buyer 302 selects the trustable BPU service for the payment of the order, and can generate a corresponding trustable undertaking certificate based on the order data of the order. The trading platform node 321 can store the trustable undertaking certificate on the blockchain, together with the order data. The trading platform node 321 can provide the trustable undertaking certificate to the trading platform 310 that can forward to a client device of the buyer 302. The buyer 302 can ask the buyer bank 330 to provide the BPU service for the payment of the order. The buyer bank 330 can get the trustable undertaking certificate from the blockchain through the buyer bank node 322 and verify the authentication of the order and qualification of the buyer 302.

In some embodiments, as discussed above, after an order is confirmed by the buyer 302 and the seller 304, the trading platform 310 determines that the buyer 302 selects a trustable BPU service for at least one payment of the order, and the trading platform 310 can submit a request to the buyer bank 330 through the trading platform node 321 and the buyer bank node 322 to verify whether the buyer bank 330 will provide the trustable BPU service for the payment of the order to the buyer 302 or to verify whether the buyer 302 is qualified for the trustable BPU service for the payment of the order guaranteed by the buyer bank 330. If the buyer 302 is qualified for the trustable BPU service, the buyer bank 330 can submit verification data to the buyer bank node 322. The buyer bank node 322 stores the verification data on the blockchain. The buyer bank node 322 or the trading platform node 321 can generate a corresponding trustable undertaking certificate for the order based on the verification data, e.g., in response to determining that the buyer 302 is qualified for the trustable BPU service for the payment of the order guaranteed by the buyer bank 330.

In some embodiments, with the trustable BPU service guaranteed by the buyer bank 330, the seller 304 does not need to concern the payment from the buyer 302, and can have payment certainty for the order to ensure the seller 304's funding liquidity and security. When the seller 304 has financing needs, e.g., need for more money to manufacture products for the order, the seller 304 can submit a financial request, e.g., for a financial loan, to the seller bank 340. The seller bank 340 can verify whether the seller 304 is qualified for the financial loan based on a credit of the seller 304 and/or on-chain trust, e.g., the trustable undertaking certificate generated on the blockchain. The seller bank 340 can submit a verification request to the seller bank node 324 to check credible trade data on the blockchain and get the trustable undertaking certificate, or the seller 304 can submit the financial request with the trustable undertaking certificate to the seller bank 340. If the seller bank 340 verifies that the seller 304 is qualified for the financial loan, the seller 304 can get the financial loan for its financial needs. The seller 304 can repay the financial loan, e.g., with the payment received from the buyer bank 330 according to the trustable BPU service for the order.

The order can include one or more order payments corresponding to one or more payment conditions. For example, the order can include an initial payment (or prepayment) and a corresponding payment condition for the initial payment and a remaining payment (or balance payment) and a corresponding payment condition for the remaining payment. In some embodiments, all the order payments of the order can be made according to a same payment service, e.g., a trustable automatic payment (AP) service or a trustable undertaking (TU) service such as a trustable BPU service. In some embodiments, the order payments of the order can be made according to a combination of the trustable AP service and the trustable BPU service, e.g., different order payments can be made with different payment services. The buyer 302 or the seller 304 can select corresponding payment services for different order payments on the trading platform 310, e.g., through a user interface.

Figure 4:
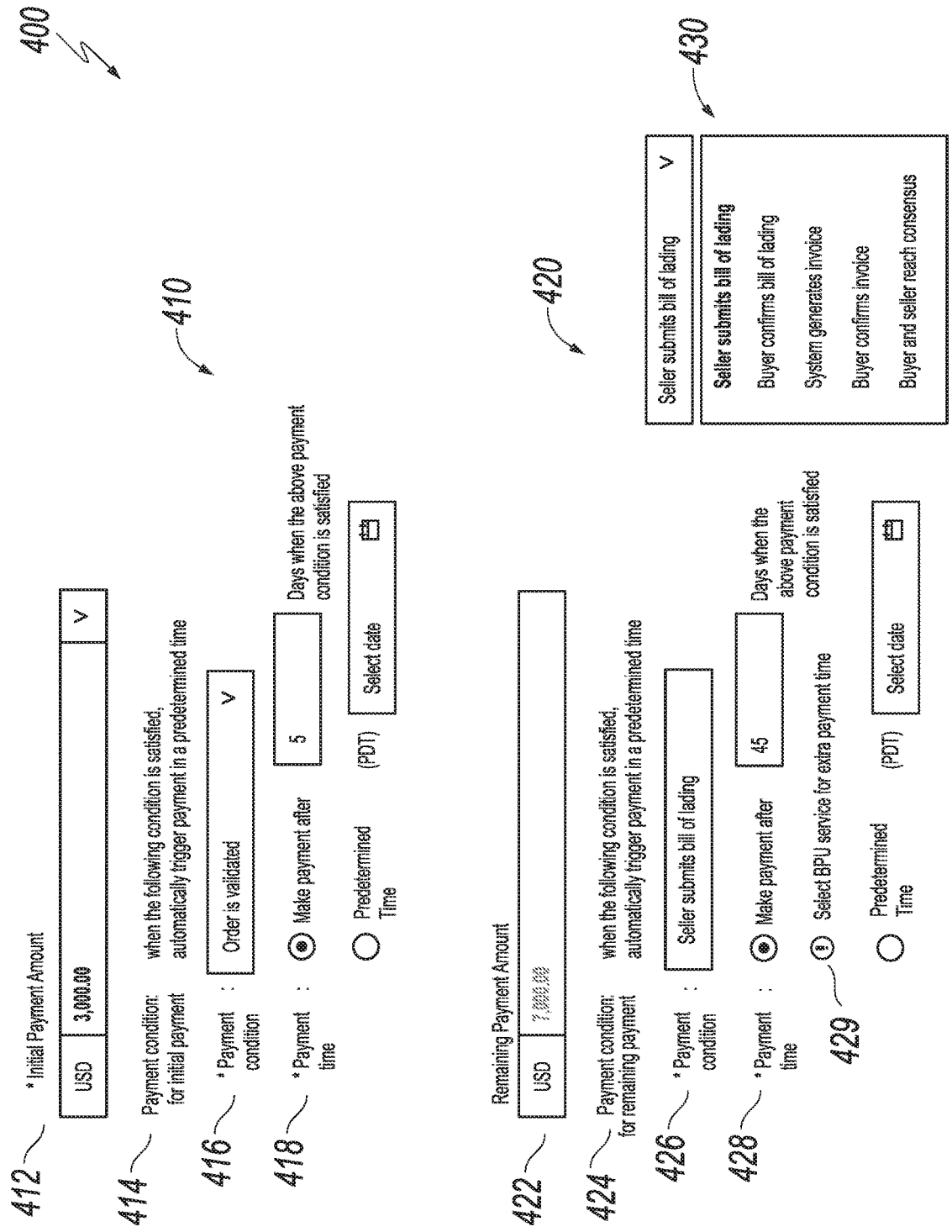
FIG. 4 is a diagram illustrating an example of a user interface of a trading platform for implementing trustable trading services in accordance with embodiments of this specification.

FIG. 4 illustrates an example of a user interface 400 provided by the trading platform 310 of FIG. 3. The trading platform 310 can have a default payment service, e.g., the trustable AP service. As noted above, the trading platform 310 can first verify whether a buyer is qualified for the trustable AP service guaranteed by a buyer bank and present the user interface 400 for the buyer to draft the order after a successful verification.

The payment of the order can include one or more payments. A sum of the one or more payments is a total amount of the order. For example, a payment of the order can be divided into an initial payment and a remaining payment. A sum of the initial payment and the remaining payment is a total amount of the order. In some examples, the initial payment is 30% of the total amount of the order, and the remaining payment is 70% of the total amount of the order. As illustrated in FIG. 4, the user interface 400 includes an initial payment portion 410 for the initial payment and a remaining payment portion 420 for the remaining payment. The buyer can set an initial payment amount 412, e.g., $3000. The label 414 shows that a payment condition for automatically triggering the remaining payment is that a predetermined time has lapsed after the following condition is satisfied. The buyer can select a payment condition 416, e.g., order is validated, and set up a payment time 418, e.g., input a number of days or select a particular date as a predetermined time (PDT). There is no selection for selecting the trustable AP service in the initial payment portion 410, which means that the initial payment is made according to the default trustable AP service.

In the remaining payment portion 420, a remaining payment amount 422 is shown, e.g., automatically determined after the initial payment is selected. The label 424 shows that a payment condition for automatically triggering the remaining payment is that a predetermined time has lapsed after the following condition is satisfied. The buyer can select a payment condition 426. A pop-up window 430 shows a list of payment conditions, e.g., seller submits bill of lading, buyer confirms bill of lading, system generates invoice such as the invoice 800 of FIG. 8, buyer confirms invoice, or buyer and seller reach consensus. The selected payment condition can be highlighted, e.g., bolded. The buyer can also select a payment time 428, e.g., input a number of days or select a particular date as a predetermined time (PDT). Different from the initial payment portion 410, the remaining payment portion 420 includes a selection 429 for selecting BPU service. If the buyer does not select the BPU service, the remaining payment is assumed to be paid according to the default payment service, e.g., the trustable AP service. If the buyer selects the BPU service, the remaining payment is assumed to be made according to the BPU service. The buyer can negotiate extra payment time with the seller with the selection of the BPU service. As noted above, a trustable BPU certificate, e.g., the BPU certificate 900 of FIG. 9, can be generated accordingly. The trading platform can submit a verification request to verify whether the buyer is qualified for the BPU service for the order.

Figure 5:
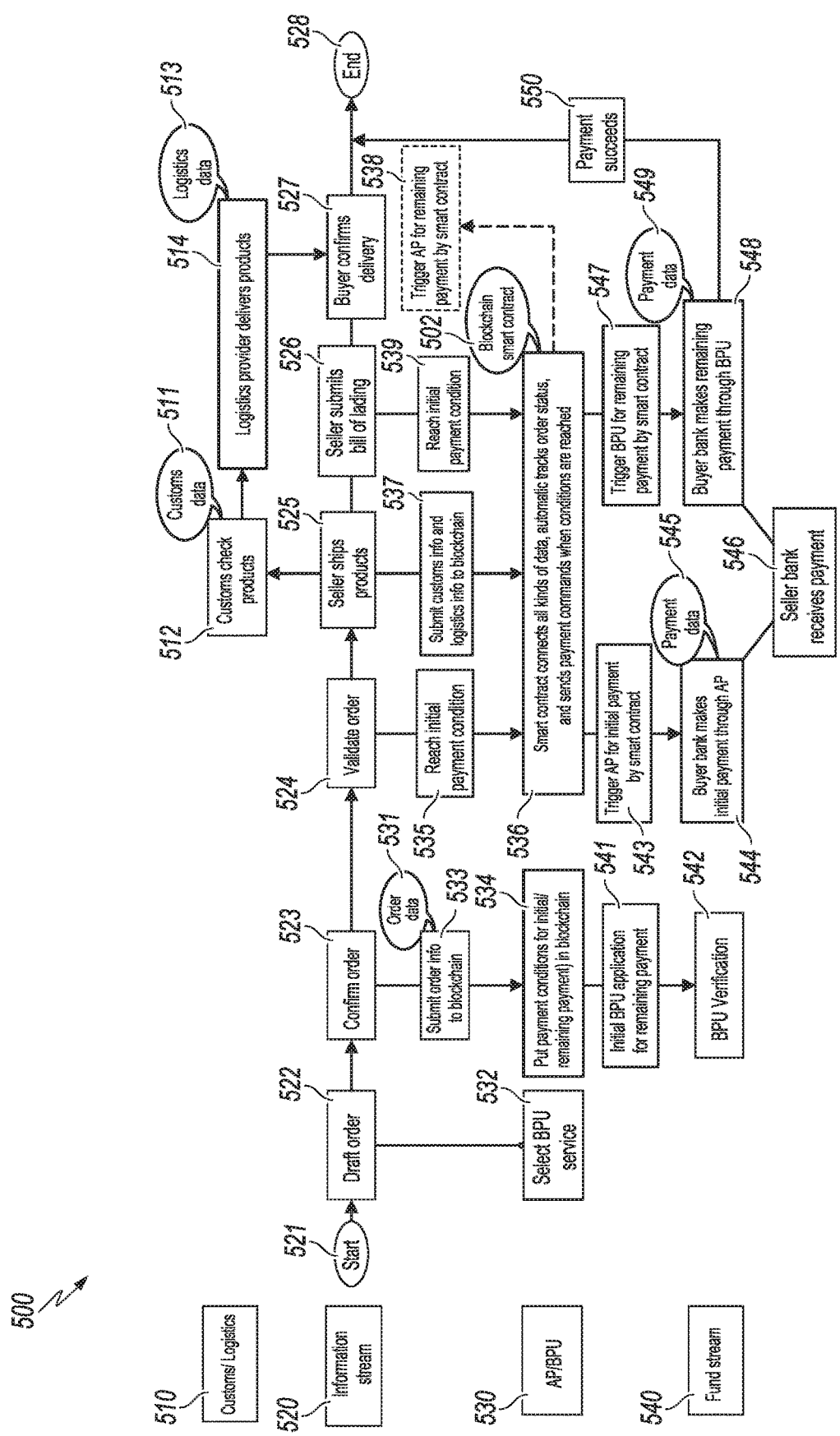
FIG. 5 is a flowchart illustrating an example of a process for implementing blockchain-based trustable transaction services that can be executed in accordance with embodiments of this specification.
Figure 6:
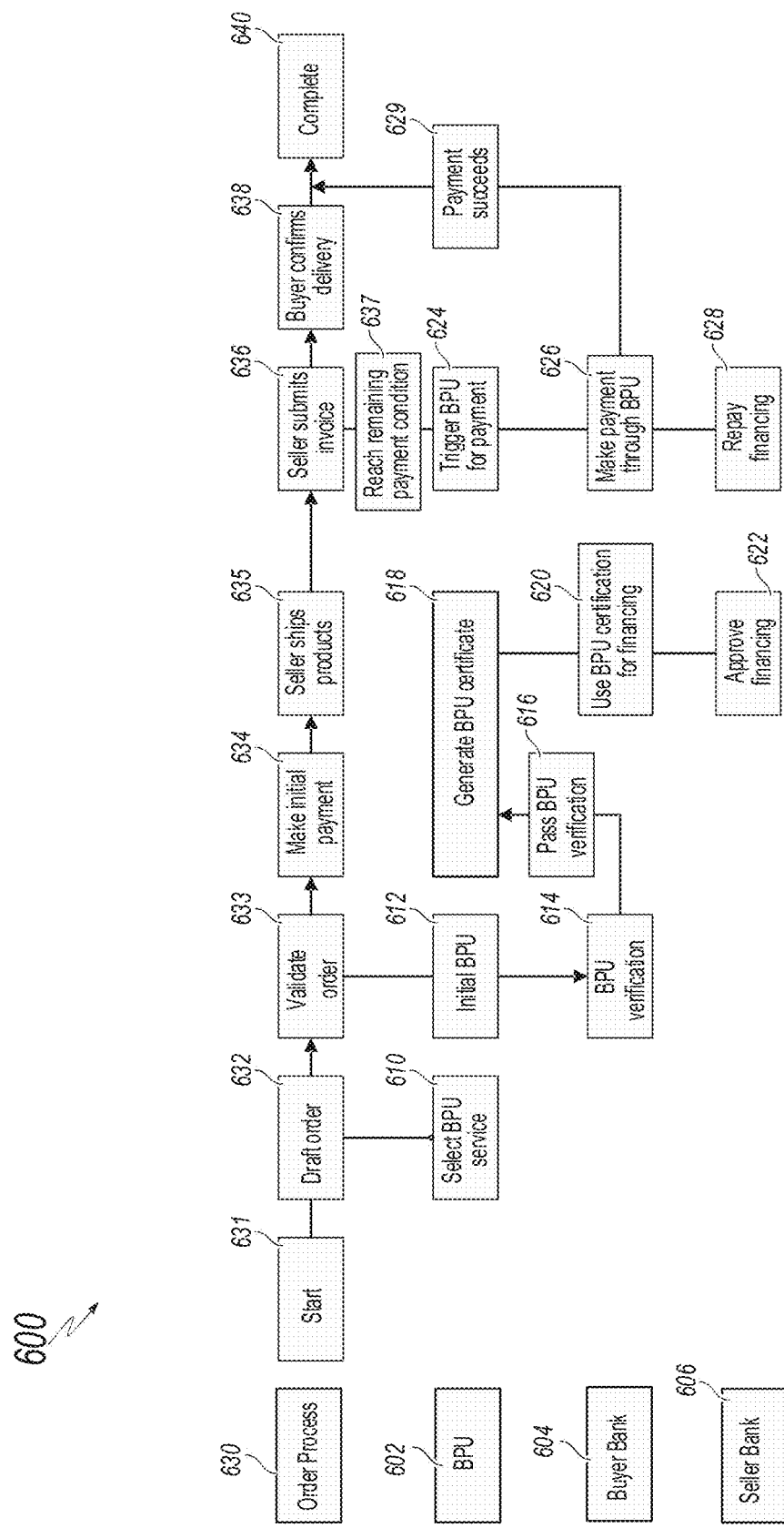
FIG. 6 is a flowchart illustrating an example of a process for implementing blockchain-based trustable transaction services that can be executed in accordance with embodiments of this specification.
Figure 7:
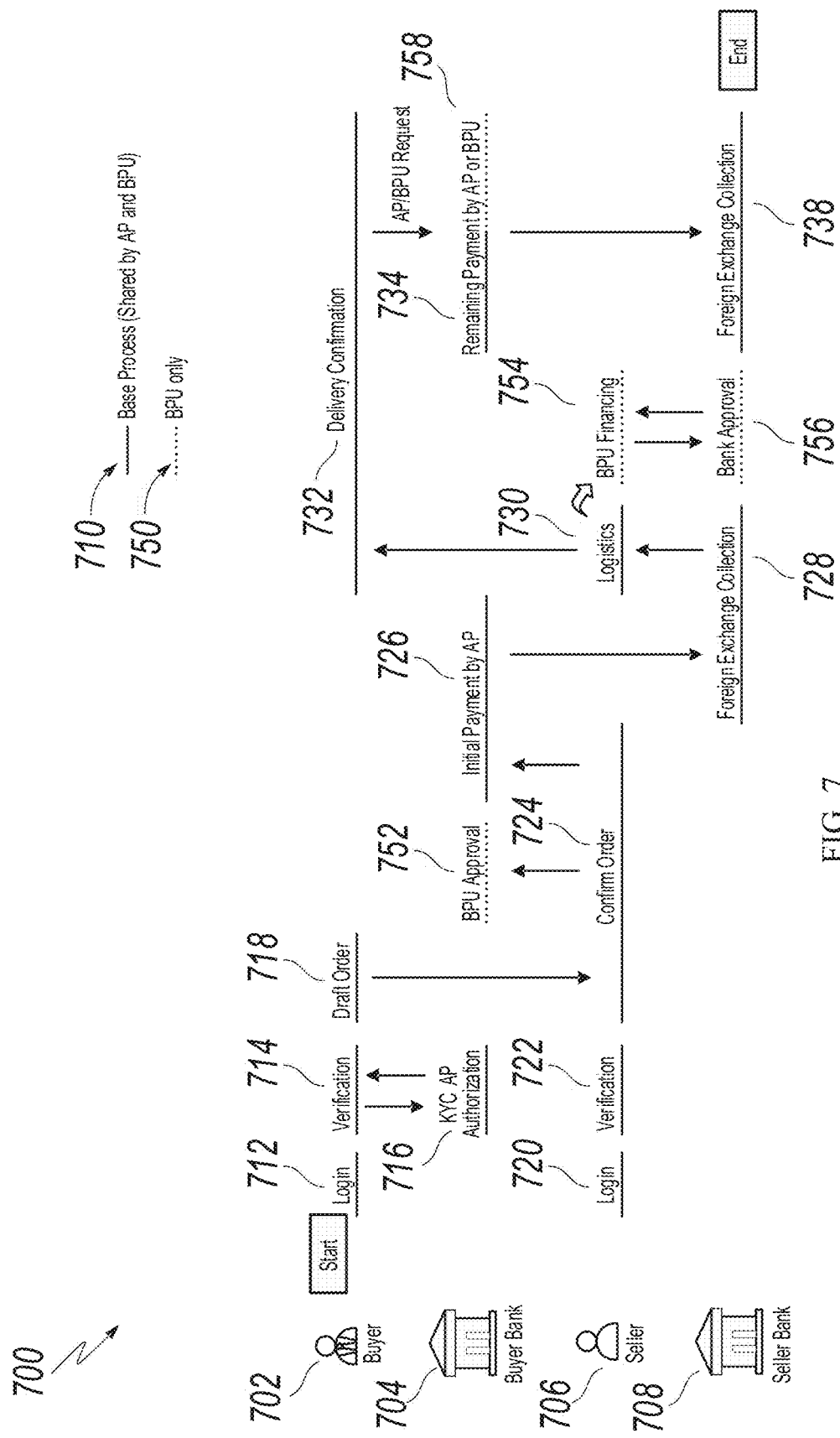
FIG. 7 is a flowchart illustrating an example of a process for implementing blockchain-based trustable transaction services that can be executed in accordance with embodiments of this specification.

For illustration, the following figures FIGS. 5, 6, 7 are flowcharts illustrating examples of processes for implementing blockchain-based trustable trading services that can be executed in accordance with embodiments of this specification. Each process includes operations related to a trustable automatic payment (AP) service and a trustable bank payment undertaking (BPU) service. The process can be implemented in an environment or system, e.g., the blockchain-based trustable trading and financing system 300 of FIG. 3, that includes a blockchain network, e.g., the blockchain network 320 of FIG. 3 and multiple participants including a trading platform, e.g., the trading platform 310 of FIG. 3, a buyer bank, e.g., the buyer bank 330 of FIG. 3, a seller bank, e.g., the seller bank 340 of FIG. 3, a logistics provider, e.g., the logistics provider 350 of FIG. 3, and a customs office, e.g., the customs office 360 of FIG. 3. The blockchain network can include multiple trustable nodes corresponding to the multiple participants. The trading platform provides trustable trading services between a buyer, e.g., the buyer 302 of FIG. 3, and a seller, e.g., the seller 304 of FIG. 3. The buyer bank provides financial services, e.g., payment services, for the buyer. The seller bank provides financial services, e.g., financial loans, deposits, for the seller. The trustable automatic payment (AP) service can be a default payment service on the trading platform. The BPU service can be selected and verified.

Referring to FIG. 5, in a process 500, row 510 includes steps related to logistics that are performed by the customs office and the logistics provider; row 520 includes steps related to an information stream that are performed on the trading platform, row 530 includes steps related to AP/BPU service, and row 540 includes steps related to a fund stream that are performed by the buyer bank and the seller bank.

At 521, the process 500 starts. The buyer or the seller can log into a buyer trading account on the trading platform. The buyer trading account can include information of a buyer financial account in the buyer bank. In some embodiments, after the buyer logs into the buyer trading account, the trading platform can submit a request to the blockchain network to verify with the buyer bank whether the buyer is qualified for the trustable AP service guaranteed by the buyer bank. The process 500 proceeds if the trading platform receives a successful verification from the buyer bank.

At 522, an order is drafted on the trading platform. The trading platform can present a user interface, e.g., the user interface 400 of FIG. 4. The buyer can select an initial payment amount or a remaining payment amount, and corresponding payment conditions and payment times for the initial payment and the remaining payment. At 532, the buyer selects BPU service, e.g., in the user interface. After the order is completed, the buyer can send the order to the seller for review. The seller can modify the order and send back the modified order to the buyer for review.

At 523, the order is confirmed by the buyer and the seller on the trading platform. At 533, after the order is confirmed, the trading platform submits order data 531 (or order information) to a corresponding trading platform node of the blockchain network, e.g., the node 321 of FIG. 3. The order data 531 can include corresponding payment conditions for one or more payments (such as initial payment and remaining payment) and BPU data for the BPU service. The BPU data can indicate that the BPU service is selected for the remaining payment.

At 534, the trading platform node stores the order data 531 on a blockchain of the blockchain network. The order data 531 includes an initial payment condition for the initial payment, e.g., the payment condition 416 of FIG. 4, and a remaining payment condition for the remaining payment, e.g., the payment condition 426 of FIG. 4. The trading platform node can generate a blockchain trade invoice, e.g., the invoice 800 of FIG. 8, based on the order data, and store the invoice on the blockchain. The trading platform node can determine that the buyer selects the BPU service for the remaining payment for the order. In some embodiments, the trading platform node can generate a trustable BPU certificate, e.g., the BPU certificate 900 of FIG. 9, based on the order data.

At 541, the trading platform node initials BPU application for the remaining payment by submitting a verification request to the buyer bank through a buyer bank node, e.g., the buyer bank node 322 of FIG. 3. At 542, the buyer bank performs the BPU verification to determine whether the buyer is qualified for the BPU service for the remaining payment based on a credit of the buyer in the buyer bank, the invoice, and/or the BPU certificate. If the buyer bank determines that the buyer is qualified for the BPU service for the remaining payment, the buyer bank can submit corresponding verification data to the buyer bank node that stores the verification data on the blockchain. The trading platform node can transmit the verification data to the trading platform. At 535, the trading platform validates the order in response to receiving the verification data. The trading platform uploads validation data of the order to the trading platform node of the blockchain network.

At 536, the trading platform node generates a smart contract 502 on the blockchain based on the order data. The smart contract 502 includes an automatic function that automatically instructs the buyer bank to make the initial payment for the order to the seller according to the trustable AP service in response to determining that the initial payment condition for the initial payment is met and to make the remaining payment for the order to the seller according to the trustable BPU service in response to determining that the remaining payment condition for the remaining payment is met. The smart contract 502 includes an order status update function that automatically updates a status of the order in response to determining the status of the order is changed based on the order status data uploaded to the blockchain from the participants, e.g., the trading platform, the buyer bank, the seller bank, the customs office, and the logistics provider.

At 543, in response to determining that the initial payment condition for the initial payment is met, the smart contract automatically triggers an automatic payment command. The initial payment condition for the initial payment can be that the order is validated by the trading platform. In some embodiments, the automatic payment command is triggered in response to determining that a predetermined time has reached or a predetermined time period has lapsed after the initial payment condition for the initial payment is met. The buyer financial institution node transmits the automatic payment command to a computing device of the buyer bank, and the automatic payment command instructs the computing device of the buyer financial institution to make the initial payment to the seller according to the trustable AP service.

At 544, the buyer bank makes the initial payment according to the trustable AP service and submits payment data 545 to the buyer bank node. The payment data 545 confirms that the buyer bank has made the initial payment to the seller. The buyer bank node stores the payment data 545 on the blockchain. At 546, the seller bank receives the initial payment from the buyer bank and can submit payment reception data to the seller bank node that stores the payment reception data on the blockchain. The payment reception data confirms that the seller financial account has received the initial payment. The trading platform can be configured to receive the payment data (and/or the payment reception data) from the blockchain through the trading platform node and feed back a payment status to the buyer and the seller based on the payment data (and/or the payment reception data).

At 525, the seller ships products of the order. The seller can ship out the products after step 524 that the order is validated on the trading platform, or after receiving the payment data and/or the payment reception data. At 512, the customs office checks products and generates customs data 511. At 514, the logistics provider delivers the products and generates logistics data 513. At 537, the customs data 511 is submitted to the blockchain, e.g., from the customs office to the customs office node, and the logistics data 513 is submitted to the blockchain, e.g., from the logistics provider to the logistics provider node.

At 526, after the seller ships out the products, the seller submits a bill of lading (B/L or BOL) to the trading platform, which can be the remaining payment condition for the remaining balance. The bill of lading can be an electronic bill of lading (eBOL). The trading platform submits the B/L to the trading platform node for storing the B/L on the blockchain.

At 539, the remaining payment condition is reached, which can be detected by the smart contract based on the order status data. In response to determining that the remaining payment condition for the remaining payment is met, the smart contract triggers an automatic payment command to instruct the buyer bank to make the remaining payment for the order to the seller. In some cases, if the buyer does not select the BPU service or the BPU application is rejected by the buyer bank, at 538, the smart contract triggers an automatic AP command for the buyer bank to make the remaining payment according to the trustable AP service. In some cases, if the BPU application is approved by the buyer bank, at 547, the smart contract triggers an automatic BPU command to automatically instruct the buyer bank to make the remaining payment for the order to the seller according to the trustable BPU service.

At 548, the buyer bank makes the remaining payment according to the BPU service and submits payment data 549 to the buyer bank node that stores the payment data on the blockchain. At 546, the seller bank receives the remaining payment from the buyer bank according to the BPU service and can submit payment reception data to the seller bank node that stores the payment reception data on the blockchain.

At 550, the buyer bank can submit a payment success message to the trading platform, e.g., through the buyer bank node and the trading platform node. Or the trading platform node can generate the payment success message based on the payment data and/or the payment reception data. At 527, the buyer confirms delivery of the products on the trading platform. Thus, the buyer receives the products and the seller receives the payment. The process 500 ends at 528.

Referring to FIG. 6, another process 600 for implementing blockchain-based trustable trading services is illustrated. In addition to the trustable AP service and the trustable BPU service shown in the process 500 of FIG. 5, the process 600 shows a generation of a trustable BPU certificate and a trustable BPU financing service.

The process 600 can include steps along row 630 related to an order process, steps along row 602 related to BPU service, steps along row 604 related to activities of the buyer bank, and steps along row 606 related to activities of the seller bank.

At 631, the process 600 starts. For example, a buyer logs into a buyer trading account in the trading platform. At 632, the buyer drafts an order for trading with a seller on the trading platform. At 610, the buyer selects a trustable BPU service for at least one payment such as the remaining payment for the order. At 633, the trading platform validates the order, e.g., after the buyer and the seller confirmed the order and the trading platform verifies that the buyer is qualified for a trustable AP service guaranteed by the buyer bank. In response to determining that the initial payment condition is met with the order being validated, the smart contract automatically triggers an automatic payment demand to instruct the buyer bank to make the initial payment at 634.

At 612, the trading platform initiates a BPU application to the buyer bank through the blockchain network, e.g., through the trading platform node and the buyer bank node. At 614, the buyer bank verifies whether the buyer is qualified for the trustable BPU service for the payment for the order based on a credit of the buyer and order data of the order.

At 616, the buyer bank determines that the buyer passes the BPU verification and submits verification data to the blockchain network, e.g., to the buyer bank node. The buyer bank node stores the verification data on a blockchain of the blockchain network.

At 618, the buyer bank node or the trading platform node generates a trustable BPU certificate, e.g., the BPU certificate 900 of FIG. 9. The BPU certificate includes an amount of the payment that is guaranteed by the buyer bank that automatically makes that automatically makes the payment on behalf of the buyer in response to that a payment condition specified in a smart contract deployed on the blockchain is met. At 620, the seller uses the trustable BPU certificate to submit a financing request, e.g., a financing loan, to the seller bank 606. At 622, the seller bank approves the financing request of the seller.

At 635, the seller ships out products of the order. After the seller ships out products of the order, at 636, the seller submits an invoice, e.g., the invoice 800 of FIG. 8, on the trading platform, which can be a remaining payment condition for the remaining payment. The trading platform can submit the invoice to the trading platform node that stores the invoice and associated order status data on the blockchain. At 637, the smart contract is executed to determine the remaining payment condition is reached and, at 624, automatically triggers an automatic command that instructs the buyer bank to make the remaining payment according to the trustable BPU service for the remaining payment.

At 626, the buyer bank makes the remaining payment to the seller financial account in the seller bank according to the trustable BPU service for the remaining payment. At 628, the seller or the seller bank can repay the financing, e.g., with the remaining payment received from the buyer bank. After making the remaining payment according to the trustable BPU service, the buyer bank submits payment data to the trading platform, e.g., through the buyer bank node and the trading platform node. The payment data confirms that the remaining payment has been successfully made to the seller at 629. After the buyer confirms delivery of the products at 638, the process 600 is completed at 640.

Referring to FIG. 7, another process 700 for implementing blockchain-based trustable trading services is illustrated. Similar to the process 500 of FIG. 5, the process 700 can apply both trustable AP service and trustable BPU service. The trustable AP service is the base service for the trading platform, and the BPU service is selectable for the trading platform. As illustrated in FIG. 7, a base process 710 is illustrated by solid lines and includes steps shared by the AP service and the BPU service. A BPU-only process 750 is illustrated by dash lines and includes steps only related to the BPU service.

The process 700 can include steps along row 702 related to activities of a buyer, steps along row 704 related to activities of the buyer bank, steps along row 706 related to activities of the seller, and steps along row 708 related to activities of the seller bank.

At 712, the buyer uses a client device to log into a buyer trading account on the trading platform. At 714, the trading platform submits a verification request to the buyer bank, e.g., through the trading platform node and the buyer bank node of the blockchain network. The verification request requests the buyer bank to verify whether the buyer is authorized to use the trustable AP service and/or know your customer (KYC) service. At 716, the buyer bank performs the verification based on a credit of the buyer. At 720, the seller logins in a seller trading account on the trading platform and gets verified with credential information by the trading platform. In some embodiments, the seller trading account includes information of a seller financing account in the seller bank. At 722, the trading platform can verify whether the seller financial account is valid.

After the buyer is verified to have the authorization of using the trustable AP service on the trading platform, at 718, the buyer is permitted by the trading platform to draft an order for trading with the seller. At 724, the seller reviews and confirms the order. At 752, after the order is confirmed by the buyer and the seller, the trading platform can determine that the buyer selects a trustable BPU service for a remaining payment of the order. The trading platform can submit a BPU application to the buyer bank through the trading platform node and the buyer bank node. At 752, the buyer bank determines whether the buyer is qualified for the trustable BPU service based on a credit of the buyer. If the buyer is qualified, the BPU service is approved. The buyer bank can submit verification data to the blockchain network, e.g., to the buyer bank node. The buyer bank node stores the verification data on a blockchain of the blockchain network.

At 618, the buyer bank node or the trading platform node generates a trustable BPU certificate, e.g., the BPU certificate 900 of FIG. 9. The BPU certificate includes an amount of the payment that is guaranteed by the buyer bank that automatically makes that automatically makes the payment on behalf of the buyer in response to that a payment condition specified in a smart contract deployed on the blockchain is met. At 620, the seller uses the trustable BPU certificate to submit a financing request, e.g., a financing loan, to the seller bank 606. At 622, the seller bank approves the financing request of the seller.

At 726, the buyer bank makes the initial payment according to the trustable AP service, e.g., in response to receiving an automatic payment command generated by a smart contract on the blockchain. The smart contract triggers the automatic payment command in response to determining that an initial payment condition corresponding to the initial payment is met.

At 728, the seller bank receives the initial payment from the buyer bank. If the seller bank and the buyer bank belong to offshore bank and onshore bank, the seller bank collect foreign exchange. After receiving the initial payment, at 730, the seller ships products of the order. At 732, the buyer confirms delivery of the products, which can be the remaining payment condition for the remaining payment. At 754 and 756, the remaining payment can be made by the trustable AP service or by the trustable BPU service.

In some cases, if the buyer does not select the BPU service or the BPU application is rejected by the buyer bank, at 734, the smart contract on the blockchain triggers an automatic AP command for the buyer bank to make the remaining payment according to the trustable AP service. In some cases, if the BPU application is approved by the buyer bank, at 758, the smart contract triggers an automatic BPU command to automatically instruct the buyer bank to make the remaining payment for the order to the seller according to the trustable BPU service.

At 738, the seller bank receives the remaining payment from the buyer bank with foreign exchange collection. After the seller bank confirms reception of the remaining payment, the process 700 ends.

Figure 10:
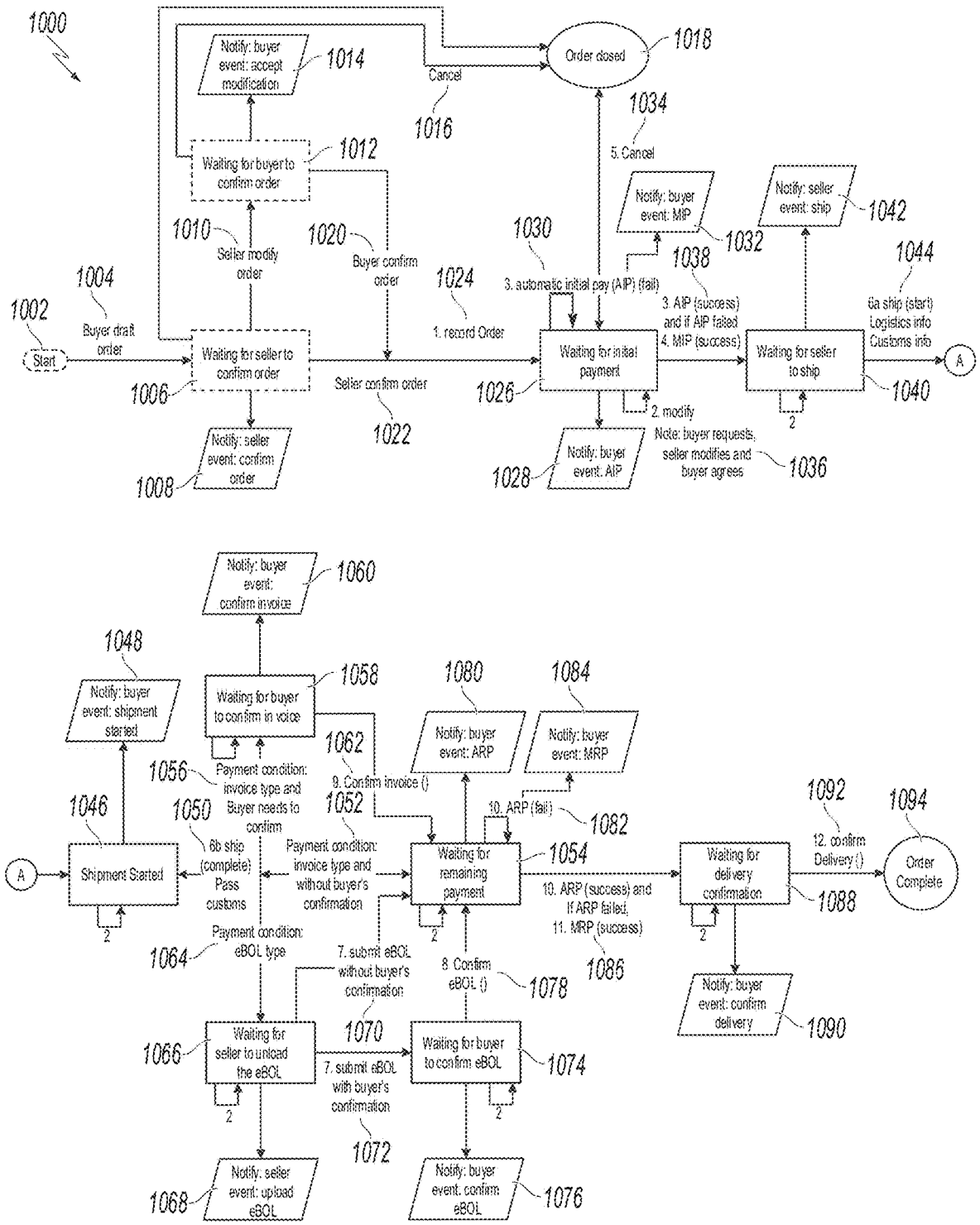
FIG. 10 is a flowchart illustrating an example of a process for implementing blockchain-based trustable transaction services with different payment conditions that can be executed in accordance with embodiments of this specification.
Figure 11:
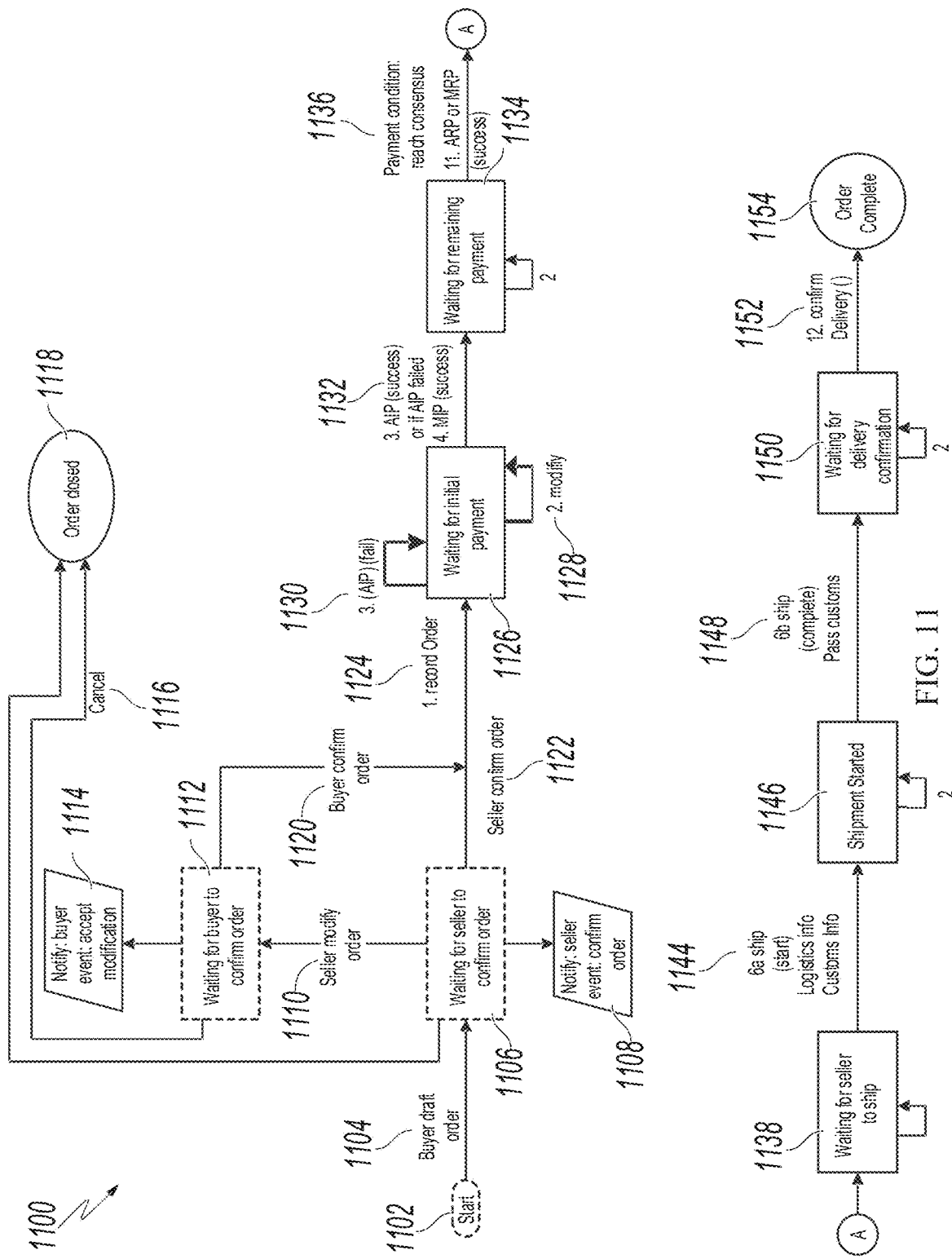
FIG. 11 is a flowchart illustrating an example of a process for implementing blockchain-based trustable transaction services with a consensus payment condition that can be executed in accordance with embodiments of this specification.
Figure 12:
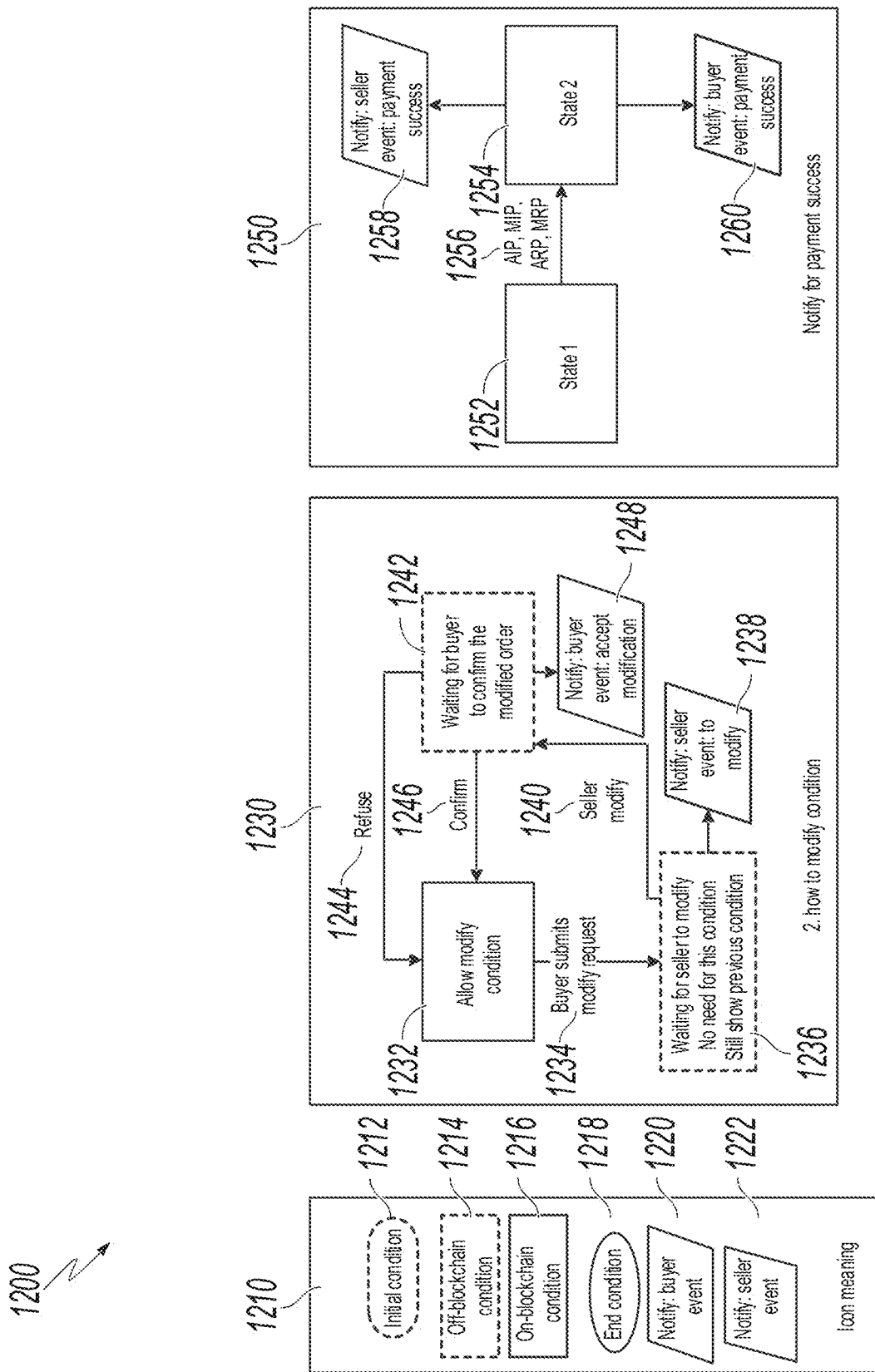
FIG. 12 show a diagram illustrating steps in the processes of FIG. 10 or FIG. 11 in accordance with embodiments of this specification.

FIGS. 10, 11, and 12 illustrate examples of processes for implementing blockchain-based trustable trading services that can be executed in accordance with embodiments of this specification. Each process illustrates a flow of an order from start to end. The order is paid with an initial payment with a corresponding payment condition and a remaining payment with a corresponding payment condition. The initial payment can be made by automatic initial payment (AIP) or manual initial payment (MIP) if AIP fails. The remaining payment can be made by automatic remaining payment (ARP) or manual remaining payment (MRP) if ARP fails. As illustrated in FIGS. 5-7, the AIP can be implemented by a trustable AP service, and the ARP can be implemented by a trustable AP service or a trustable BPU service.

The processes in FIGS. 10, 11, and 12 can be implemented in an environment or system, e.g., the blockchain-based trustable trading and financing system 300 of FIG. 3, that includes a blockchain network, e.g., the blockchain network 320 of FIG. 3 and multiple participants including a trading platform, e.g., the trading platform 310 of FIG. 3, a buyer bank, e.g., the buyer bank 330 of FIG. 3, a seller bank, e.g., the seller bank 340 of FIG. 3, a logistics provider, e.g., the logistics provider 350 of FIG. 3, and a customs office, e.g., the customs office 360 of FIG. 3. The blockchain network can include multiple trustable nodes corresponding to the multiple participants. The trading platform provides trustable trading services between a buyer, e.g., the buyer 302 of FIG. 3, and a seller, e.g., the seller 304 of FIG. 3. The buyer bank provides financial services, e.g., payment services, for the buyer. The seller bank provides financial services, e.g., financial loans, deposits, for the seller. In some embodiments, a trustable trading system includes the blockchain network 320 that can be coupled to different trading platforms. In some embodiments, the trustable trading system includes the blockchain network 320 and the trading platform.

FIG. 10 is a flowchart illustrating an example of a process 1000 for implementing blockchain-based trustable trading services with various payment conditions that can be executed in accordance with embodiments of this specification.

At 1002, the process 1000 starts. For example, the buyer can use a buyer client device to log in a buyer trading account on the trading system. At 1004, the buyer drafts the order, e.g., similar to step 522 of FIG. 5, 632 of FIG. 6, or 718 of FIG. 7. The order can include order terms and payment conditions. At 1006, after the buyer completes the order, the trading platform is waiting for the seller to conform the order. At 1008, the trading platform sends a notify message as a seller event to a seller client device of the seller to confirm the order.

In some cases, if the seller cancels the order at 1016, the order is closed at 1018. In some cases, if the trading platform has not received the seller's confirmation after a predetermined time period, the order is cancelled at 1016 and closed at 1018. In some cases, the seller modifies the order at 1010 and sends to the trading system. At 1012, the trading platform is waiting for the buyer to confirm the modified order. At 1014, the trading platform sends a notify message as a buyer event to the buyer client device of the buyer to accept modification. In some cases, if the buyer cancels the modified order by the seller at 1016, the order is closed at 1018. In some cases, if the buyer confirms the modified order at 1020, it indicates that the modified order is confirmed by both the buyer and the seller. If the seller confirms the order the buyer drafted at 1022, it indicates that the order is confirmed by both the buyer and the seller. The trading platform records the confirmed order at 1024. The trading platform can submit order data of the confirmed order on a blockchain of the blockchain network, e.g., similar to step 533 of FIG. 5.

A smart contract for the order can be generated on the blockchain based on the order data. The smart contract can include an automatic function that automatically instructs the buyer bank to make an order payment for the order to the seller according to a payment service in response to determining that a payment condition for the order payment is met. The smart contract can also include an order status update function that automatically updates a status of the order in response to determining a status of the order is changed based on order status data uploaded to the blockchain.

At 1026, the seller (or the seller bank) is waiting for the initial payment from the buyer (or the buyer bank). At 1028, the seller can send a notify message as a buyer event to the buyer client device of the buyer to make the automatic initial payment (AIP). In some cases, the buyer bank node can execute the smart contract to automatically instruct the buyer bank to make the initial payment to the seller (or the seller bank) according to AIP in response to determining that a payment condition deployed on the smart contract is met. At 1030, if the AIP fails, the order can be cancelled at 1034 and the order is closed at 1018, or the trading platform sends a notify message as a buyer event to the buyer client device of the buyer make the payment according to the MIP service at 1032. In some cases, the buyer can request to modify the order term or order condition, the seller can modify, and the buyer can agree again at 1036.

If the AIP succeeds or if AIP fails but MIP succeeds at 1038, the trading system is waiting for the seller to ship products of the order at 1040. The trading system can send a notify message as a seller event to the seller client device of the seller to ship at 1042. At 1044, the products are shipped out by the seller, and logistics information and customs information can be uploaded to the blockchain by corresponding logistics provider and customs office.

At 1046, the trading system records shipment data on the blockchain and sends a notify message 1048 as a buyer event to the buyer client device that shipment is started. At 1050, the logistics provider can submit shipment complete data to the blockchain or the customs office can submit customs data showing that the products pass the inspection to the blockchain.

There can be a number of different payment conditions for the remaining payment. If the payment condition is an invoice type and the buyer need s to confirm at 1056, the trading system is waiting for the buyer to confirm the invoice at 1058. The trading system can send a notify message 1060 as a buyer event to the buyer client device to confirm the invoice. After the buyer confirms the invoice at 1062, the trading system waits for the buyer bank to make the remaining payment at 1054, e.g., by executing the smart contract to automatically instruct the buyer bank to make the remaining payment according to the ARP service.

In some embodiments, the payment condition for the remaining payment is electronic bill of lading (eBOL) type (1064). The trading system is waiting for the seller to upload the eBOL at 1066 and can send a notify message 1068 to the seller client device of the seller. If the payment condition is that the seller submits the eBOL without the buyer's confirmation (1070), the process 1000 proceeds to step 1054. If the payment condition is that the eBOL is submitted with the buyer's confirmation (1072), the trading system waits for the buyer to confirm the eBOL at 1074 and sends a notify message 1076 to ask the buyer to confirm the eBOL. After the buyer confirms the eBOL at 1078, the process 1000 proceeds to step 1054.

In some embodiments, the payment condition for the remaining condition is an invoice type without the buyer's confirmation (1052), and the process 1000 proceeds directly from 1050 to 1054, that is, waiting for the remaining payment.

The trading system can send a notify message 1080 as a buyer event to the buyer bank or the client device of the buyer to make the remaining payment according to the ARP. If the ARP fails at 1082, the trading system can send a notify message 1084 to the buyer bank or the buyer client device of the buyer to make the remaining payment according to the MRP. If the ARP succeeds or if the ARP failed but MRP succeeds at 1086, the trading system is waiting for delivery confirmation at 1088. The trading system can send a notify message 1090 as a buyer event to the buyer client device to confirm delivery of the products. After the buyer confirms delivery at 1092, the order is completed at 1094.

FIG. 11 is a flowchart illustrating an example of a process 1100 for implementing blockchain-based trustable trading services with a consensus payment condition that can be executed in accordance with embodiments of this specification.

At 1102, the process 1100 starts. At 1104, the buyer drafts an order on the trading platform. After the order is completed, the trading system is waiting for the seller to confirm the order at 1106 and sends a notify message to ask the seller to confirm the order at 1108. If the seller confirms the order at 1122, it indicates that the order is confirmed by both the buyer and the seller, and the order is recorded at 1124.

If the seller cancels the order at 1116, the order is closed at 1118. If the seller modifies the order at 1110, the trading platform is waiting for the buyer to confirm the modified order at 1112 and can send a notify message 1114 to ask the buyer to accept modification. If the buyer cancels the modified order at 1116, the order is closed at 1118. If the buyer confirms the modified order at 1120, it indicates that the modified order is confirmed by both the buyer and the seller, and the modified order is recorded at 1124.

The initial payment condition for the initial payment is recording the order. After the order is recorded, e.g., on a blockchain of the blockchain network, the trading system is waiting for the initial payment at 1126. If the AIP fails at 1130, the initial payment can be modified at 1128, and the trading system can notify the buyer to make the initial payment according to the MIP. If the AIP succeeds or if the AIP failed but the MIP succeeds at 1132, the trading system is waiting for the remaining payment by the buyer bank or the buyer at 1134.

If the payment condition is that the buyer and the seller reach consensus (1136) and if either ARP or MRP succeeds, the trading system is waiting for the seller to ship products at 1138. At 1144, the products are being shipped, and logistics information and customs information can be uploaded by the logistics provider and the customs office to the trading system. The trading system can determine the shipment started based on the order status data at 1146. After the shipment is completed and passes the customs at 1148, the trading system is waiting for delivery confirmation at 1150. After the trading system receives delivery confirmation from the buyer at 1152, the order is completed at 1154.

FIG. 12 show a diagram 1200 illustrating steps in the processes of FIG. 10 and FIG. 11 in accordance with embodiments of this specification. Block 1210 shows different icons representing different meaning. Icon 1212 represents an initial condition, icon 1214 represents an off-blockchain condition, icon 1216 represents on-blockchain condition, icon 1218 represents end condition, icon 1220 represents a notify message as a buyer event, and icon 1222 represents a notify message as a seller event.

Block 1230 illustrates how to modify condition. At 1232, the trading system allows a modify condition. At 1234, the buyer submits a modify request, and the trading system is waiting for the seller to modify at 1236 and sends a notify message to the seller to modify at 1238. If there is no need for this condition, the trading system can still show the previous condition. The seller modifies at 1240 and the trading system is waiting for the buyer to confirm the modified order at 1242. The trading system sends a notify message as a buyer event to ask the buyer to accept modification at 1248. If the buyer refuses to confirm the modified order at 1244, the process goes back to step 1232. If the buyer confirms the modified order at 1246, the process goes back to step 1232.

Block 1250 illustrates a state change for notify for payment success. At 1252, the payment state is at state 1. After the payment is successfully made under AIP or MIP for the initial payment, or ARP or MRP for the remaining payment at 1256, the payment state is at state 2 (1254). The trading system sends a notify message 1258 as a seller event to notify the seller about the payment success and sends a notify message 1260 as a buyer event to notify the buyer about the payment success.

Figure 13A:
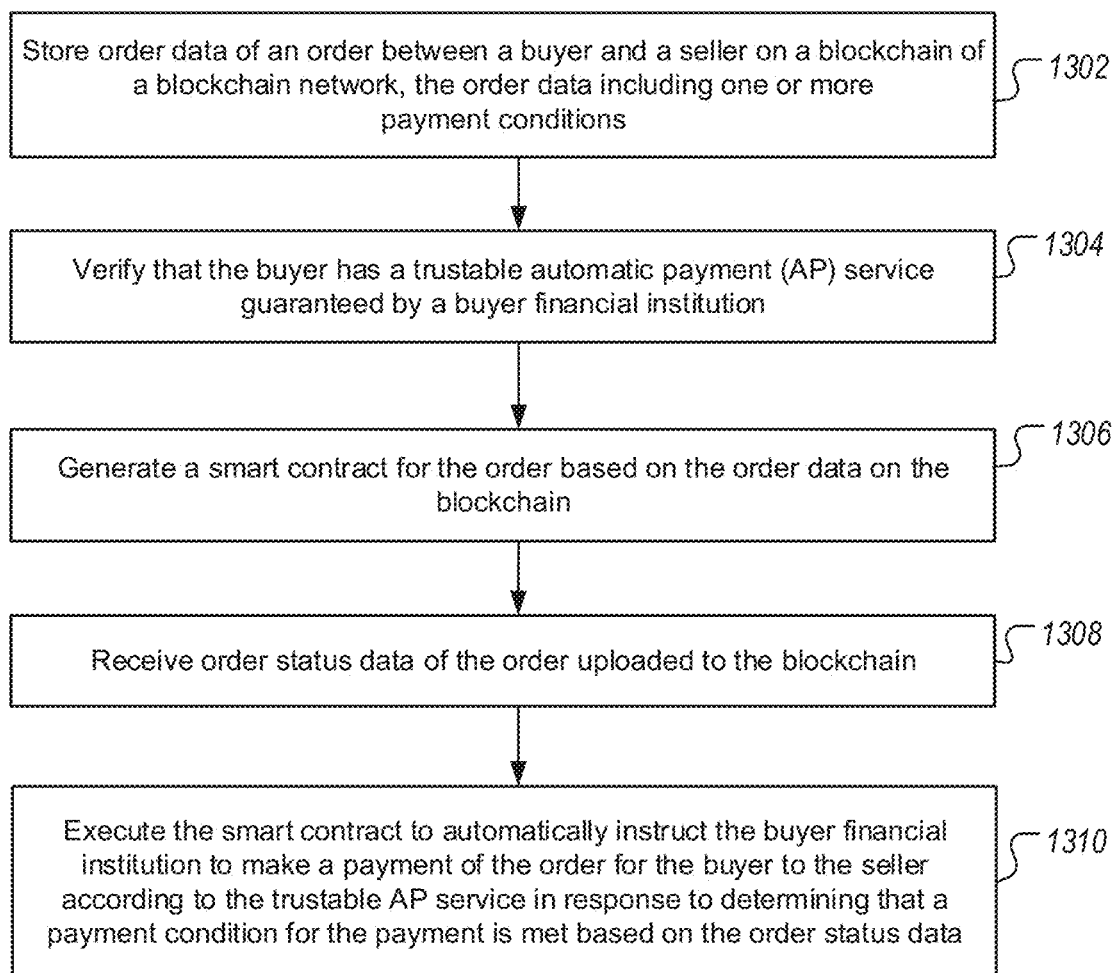
FIG. 13A is a flowchart illustrating an example of a process in accordance with embodiments of this specification.

FIG. 13A is a flowchart illustrating an example of a process 1300 for managing blockchain-based trustable transaction services that can be executed by a blockchain-based trustable trading and financing system (e.g., the blockchain-based trustable trading and financing system 300 of FIG. 3) in accordance with embodiments of this specification. The blockchain-based trustable trading and financing system can include a blockchain network. The blockchain network can be a public, private, or consortium blockchain network. In some embodiments, the blockchain network can be the blockchain network 102 of FIG. 1, the blockchain network 212 of FIG. 2, or the blockchain network 320 of FIG. 3. The blockchain network can be composed of a plurality of trustable nodes. Each trustable node can correspond to a respective participant of trade in the blockchain-based trustable trading and financing system. In some embodiments, one or more of the steps of the process 1300 can be performed by a trustable network node of the blockchain network (e.g., the trading platform node 321, the buyer bank node 322, or the seller bank node 324). In some embodiments, one or more of the steps of the process 1300 can be performed by a computing device connected to the trustable network node of the blockchain network (e.g., the trading platform 310, a computing device of the buyer bank 330, or a computing device of the seller bank node 324). In some embodiments, one or more of the steps of the process 1300 can be performed by a combination or an integration of a trustable network node of the blockchain network (e.g., the trading platform node 321) and the computing device connected to the trustable network node of the blockchain network (e.g., the trading platform 310). In some embodiments, one or more of the steps of the process 1300 can be performed according to the techniques described with respect to the processes 500, 600, 700, 1000, 1100, and/or 1200.

At 1302, order data of an order between a buyer (e.g., the buyer 302 of FIG. 3) and a seller (e.g., the seller 304 of FIG. 3) is stored on a blockchain of the blockchain network for the order. The order data includes one or more payment conditions for the order. The order data can be stored by a trustable trading platform node, e.g., the node 321 of FIG. 3, corresponding to a trading platform, e.g., the trade platform 310 of FIG. 3. The trading platform is configured to provide blockchain-based trustable trading services between the buyer and the seller. The order data can be stored on the blockchain after the order is confirmed by the buyer and the seller on the trading platform.

At 1304, the buyer is verified to have a trustable automatic payment (AP) service guaranteed by a buyer financial institution, e.g., the buyer bank 330 of FIG. 3. The trustable AP service is guaranteed by the buyer financial institution that automatically makes a payment on behalf of the buyer in response to that a condition specified in a smart contract deployed on a blockchain of the blockchain network is met. Each order can correspond to a corresponding smart contract. Each order can have one or more order payments with one or more corresponding payment conditions. Each order can correspond to a corresponding blockchain of the blockchain network.

Having the trustable AP service can be a base requirement for using the trading platform. After the buyer logs in a buyer trading account on the trading platform, the trading platform node can communicate with a buyer financial institution node, e.g., the node 322 of FIG. 3, corresponding to the buyer financial institution to verify whether a buyer financial account of the buyer in the buyer financial institution is qualified for the trustable AP service on the trading platform. The buyer financial institution node can communicate with a computing device of the buyer financial institution to verify that the buyer has the trustable automatic payment service guaranteed by the buyer financial institution. The buyer trading account can include information of the buyer financial account, e.g., an account number, a buyer name, and a name of the buyer financial institution. The trading platform can be configured to permit the buyer to draft an order or review an order the seller prepared on the trading platform in response to determining that the buyer financial account is qualified for the trustable AP service.

The seller also has a seller trading account on the trading platform and a seller financial account in a seller financial institution. The blockchain network can include a seller financial institution node corresponding to the seller financial institution. The buyer financial institution can make a payment for the buyer to the seller financial account in the seller financial institution. In some embodiments, one of the buyer financial institution and the seller financial institution is an offshore entity, and the other one of the buyer financial institution and the seller financial institution is an onshore entity. The offshore entity and the onshore entity are subject to different financial regulations, and the buyer financial institution node corresponding to the buyer financial institution and the seller financial institution node corresponding to the seller financial institution belong to the same blockchain network of the plurality of trustable nodes.

At 1306, a corresponding smart contract for the order is generated on the blockchain based on the order data. The corresponding smart contract can include an automatic function that automatically instructs the buyer financial institution to make an order payment for the order to the seller according to the trustable AP service in response to determining that a corresponding payment condition for the order payment is met. In some embodiments, the trading platform node is configured to generate the corresponding smart contract for the order from a smart contract template based on the order data, the smart contract template including a plurality of functions for the trustable trading services. In generating the corresponding smart contract for the order, the trading platform node can be configured to call one or more of the plurality of functions in the smart contract template and use the order data as input to the one or more of the plurality of functions in the smart contract template.

At 1308, order status data of the order uploaded to the blockchain is received. Each node in the blockchain network can receive corresponding order status data uploaded by a corresponding participant. The order status data can include at least one of logistics data from a logistics provider such as the logistics provider 350 of FIG. 3 to a logistics provider node such as the node 326 of FIG. 3, supplychain data from a supplychain service company, customs data from a customs office such as the customs office 360 of FIG. 3 to a customs office node such as the node 328 of FIG. 3, bill of lading data from the trading platform to the trading platform node, or payment data from the buyer financial institution to the buyer financial institution node and/or payment data from the seller financial institution to the seller financial institution node.

The corresponding smart contract can include an order status update function that automatically updates a status of the order in response to determining the status of the order is changed based on the order status data uploaded to the corresponding blockchain. The status of the order can indicate at least one of products associated with the order having been prepared or shipped by the seller, the products having been inspected by the customs office, the products being transported by the logistics provider, a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, a consensus having been reached between the buyer and the seller on the order, the automatic payment having been made by the buyer financial institution, the automatic payment having been received by the seller financial institution, or the products having been received by the buyer.

At 1310, the corresponding smart contract is executed to automatically instruct the computing device of the buyer financial institution to make the order payment to the seller according to the trustable AP service in response to determining that the corresponding payment condition for the order payment is met based on the order status data. In response to determining that the corresponding payment condition for the order payment is met, the corresponding smart contract can automatically generate or trigger an automatic payment command. The buyer financial institution node can transmit the automatic payment command to the computing device of the buyer financial institution, the automatic payment command instructing the computing device of the buyer financial institution to make the order payment to the seller according to the trustable AP service. In some embodiments, the corresponding smart contract generates the automatic payment command in response to determining that a predetermined time has reached or a predetermined time period has lapsed after the corresponding payment condition for the order payment is met.

The buyer financial institution node can be configured to execute the corresponding smart contract to automatically instruct the computing device of the buyer financial institution to make the order payment directly to the seller financial account in the seller financial institution, without going through the trading platform, in response to determining that the corresponding payment condition for the order payment is met.

In some embodiments, the one or more payment conditions include a first payment condition for a first payment for the order and a second payment condition for a second payment for the order. The buyer financial institution node can be configured to: execute the corresponding smart contract to automatically instruct the computing device of the buyer financial institution to make the first payment to the seller in response to determining that the first condition for the first payment is met, and execute the corresponding smart contract to automatically instruct the computing device of the buyer financial institution to make the second payment to the seller in response to determining that the second condition for the second payment is met.

In some embodiments, the first payment is an initial payment of the order, and the first payment condition includes the order having been validated on the trading platform. The second payment is a remaining payment of the order, and the second payment condition can include at least one of: a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, or a consensus having been reached between the buyer and the seller on the order.

In some embodiments, the order payment can be made by wire transfer between the buyer financial institution and the seller financial institution. The wire transfer can be a Whale transfer or a SWIFT transfer. In some embodiments, the order payment can be made in digital currencies. In response to receiving the automatic payment command, the buyer financial institution can transfer a digital value corresponding to the order payment to the seller financial institution, e.g., in the blockchain network through the buyer financial institution node and the seller financial institution node or in any other blockchain network.

The buyer financial institution node can be configured to receive order payment data confirming that the buyer financial institution has made the order payment to the seller and store the order payment data on the corresponding blockchain. The seller financial institution node can be configured to store payment reception data on the corresponding blockchain, the payment reception data confirming that the order payment has been received by the seller financial account in the seller financial institution from the buyer financial institution. The trading platform can be configured to receive the order payment data from the corresponding blockchain through the trading platform node and feed back a payment status to the buyer and the seller based on the order payment data.

Figure 13B:
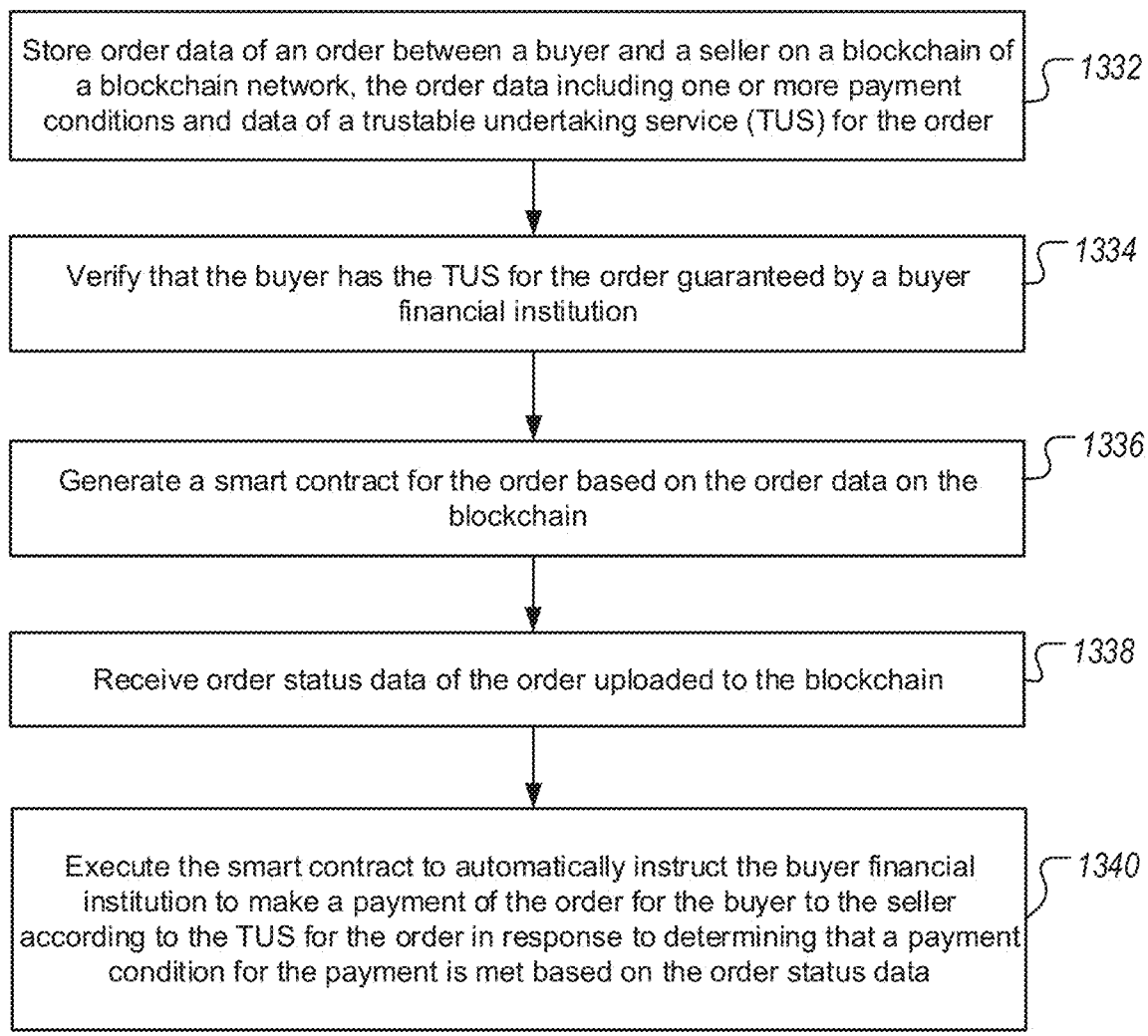
FIG. 13B is a flowchart illustrating an example of a process in accordance with embodiments of this specification.

FIG. 13B is a flowchart illustrating an example of a process 1330 for managing blockchain-based trustable transaction services that can be executed by a blockchain-based trustable trading and financing system (e.g., the blockchain-based trustable trading and financing system 300 of FIG. 3) in accordance with embodiments of this specification. The blockchain-based trustable trading and financing system can include a blockchain network. The blockchain network can be a public, private, or consortium blockchain network. In some embodiments, the blockchain network can be the blockchain network 102 of FIG. 1, the blockchain network 212 of FIG. 2, or the blockchain network 320 of FIG. 3. The blockchain network can be composed of a plurality of trustable nodes. Each trustable node can correspond to a respective participant of trade in the blockchain-based trustable trading and financing system. In some embodiments, one or more of the steps of the process 1330 can be performed by a trustable network node of the blockchain network (e.g., the trading platform node 321, the buyer bank node 322, or the seller bank node 324). In some embodiments, one or more of the steps of the process 1330 can be performed by a computing device connected to the trustable network node of the blockchain network (e.g., the trading platform 310, a computing device of the buyer bank 330, or a computing device of the seller bank node 324). In some embodiments, one or more of the steps of the process 1330 can be performed by a combination or an integration of a trustable network node of the blockchain network (e.g., the trading platform node 321) and the computing device connected to the trustable network node of the blockchain network (e.g., the trading platform 310). In some embodiments, one or more of the steps of the process 1330 can be performed according to the techniques described with respect to the processes 500, 600, 700, 1000, 1100, and/or 1200.

At 1332, order data of an order between a buyer and a seller is stored on a blockchain of the blockchain network for the order. The order data includes one or more payment conditions for the order and data of a trustable undertaking (TU) service for the order. The order data can be stored by a trustable trading platform node corresponding to a trading platform. The trading platform is configured to provide blockchain-based trustable trading services between the buyer and the seller. The order data can be stored on the blockchain after the order is confirmed by the buyer and the seller on the trading platform.

At 1334, the buyer is verified to have the trustable undertaking (TU) service for the order guaranteed by a buyer financial institution that automatically makes a payment of the order for the buyer to the seller based on a credit of the buyer in the buyer financial institution in response to that a condition specified in a smart contract deployed on the blockchain is met.

In some embodiments, the trading platform node is configured to: determine, based on the TU data, that the buyer selects to use the TU service for the order on the trading platform, and transmit a request to a computing device of the buyer financial institution through the buyer financial institution node, the request requesting the buy financial institution to verify whether the buyer is qualified for the TU service for the order guaranteed by the buyer financial institution.

In some embodiments, the trading platform is configured to provide a user interface for receiving user input of the order data, and the user interface includes a selection to use the corresponding TU service for the order.

In some embodiments, the trading platform node is configured to transmit the request after storing the order data of the order on the blockchain.

In some embodiments, the blockchain network includes a buyer financial institution node corresponding to the buyer financial institution. The buyer financial institution node is configured to: receive verification data from the computing device of the buyer financial institution, the verification data confirming that the buyer has the TU service for the order guaranteed by the buyer financial institution, and store the verification data on the corresponding blockchain.

In some embodiments, the trading platform is configured to: determine, based on the verification data stored on the blockchain, that the buyer has the TU service for the order guaranteed by the buyer financial institution, and validate the order after determining that the buyer has the TU service for the order guaranteed by the buyer financial institution.

In some embodiments, the corresponding payment condition for the order payment is determined based on the TU service for the order.

At 1336, the smart contract for the order is generated based on the order data of the order, and the smart contract includes an automatic function that automatically instructs the buyer financial institution to make an order payment for the order to the seller according to the TU service for the order in response to determining that a corresponding payment condition for the order payment is met. In some embodiments, the trading platform node is configured to generate the corresponding smart contract for the order from a smart contract template based on the order data, the smart contract template including a plurality of functions for the trustable trading services. In generating the corresponding smart contract for the order, the trading platform node can be configured to call one or more of the plurality of functions in the smart contract template and use the order data as input to the one or more of the plurality of functions in the smart contract template.

At 1338, order status data of the order uploaded to the blockchain is received. In some embodiments, the smart contract further includes an order status update function that automatically updates a status of the order in response to determining the status of the order is changed based on order status data uploaded to the corresponding blockchain.

In some embodiments, the status of the order indicates at least one of: products associated with the order having been prepared or shipped by the seller, the products having been inspected by a customs office, the products being transported by at least one logistics provider, a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, a consensus having been reached between the buyer and the seller on the order, the automatic payment having been made by the buyer financial institution, the automatic payment having been received by the seller, or the products having been received by the buyer.

In some embodiments, the blockchain networks of the plurality of trustable nodes further includes at least one of: a customs office node corresponding to the customs office, the order status data including custom data uploaded to the corresponding blockchain by the customs office node, or a logistic provider node corresponding to the at least one logistics provider, the order status data including logistic data uploaded to the corresponding blockchain by the logistic provide node.

In some embodiments, the order status data includes at least one of logistics data, supplychain data, customs data, bill of lading data, or payment data.

At 1340, the smart contract is executed to automatically instruct a computing device of the buyer financial institution to make the order payment to the seller according to the TU in response to determining that the corresponding payment condition for the order payment is met based on the order status data.

In some embodiments, the blockchain network includes a buyer financial institution node corresponding to the buyer financial institution. The buyer financial institution node is configured to: receive order payment data confirming that the buyer financial institution has successfully made the order payment to the seller according to the TU service for the order, and store the order payment data on the blockchain.

In some embodiments, the blockchain network includes a seller financial institution node corresponding to a seller financial institution. The seller has a seller financial account in the seller financial institution, and the seller financial institution node is configured to store payment reception data on the corresponding blockchain, the payment reception data confirming that the order payment for the order has been received by the seller financial account in the seller financial institution from the buyer financial institution.

In some embodiments, the buyer financial institution node is configured to execute the smart contract to automatically instruct the computing device of the buyer financial institution to make the order payment to the seller according to the TU service for the order in response to determining that a predetermined time has reached or a predetermined time period has lapsed after the corresponding payment condition for the order payment is met.

In some embodiments, the predetermined time or the predetermined time period is determined based on the corresponding TU service for the order.

In some embodiments, the one or more payment conditions includes a first payment condition for a first payment for the order and a second payment condition for a second payment for the order. The second payment is the order payment made according to the TU service for the order, and the second payment condition includes the corresponding payment condition. The buyer financial institution node is configured to execute the smart contract to automatically instruct the computing device of the buyer financial institution to make the second payment to the seller according to the TU service for the order in response to determining that the second payment condition for the second payment is met.

In some embodiments, the buyer financial institution node is configured to: execute the smart contract to automatically instruct the computing device of the buyer financial institution to make the first payment to the seller according to a trustable automatic payment service for the buyer provided by the buyer financial institution in response to determining that the first payment condition for the first payment is met.

In some embodiments, the trading platform node is configured to: after the buyer logs in a buyer trading account on the trading platform, communicate with the computing device of the buyer financial institution through the buyer financial institution node to verify whether a buyer financial account of the buyer in the buyer financial institution is qualified for the trustable automatic payment service, the buyer trading account including information of the buyer financial account.

In some embodiments, the first payment is an initial payment for the order, and the first payment condition includes a validation of the order. The second payment is a remaining payment for the order, and the second payment condition includes at least one of: a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, or a consensus having been reached between the buyer and the seller on the order.

Figure 13C:
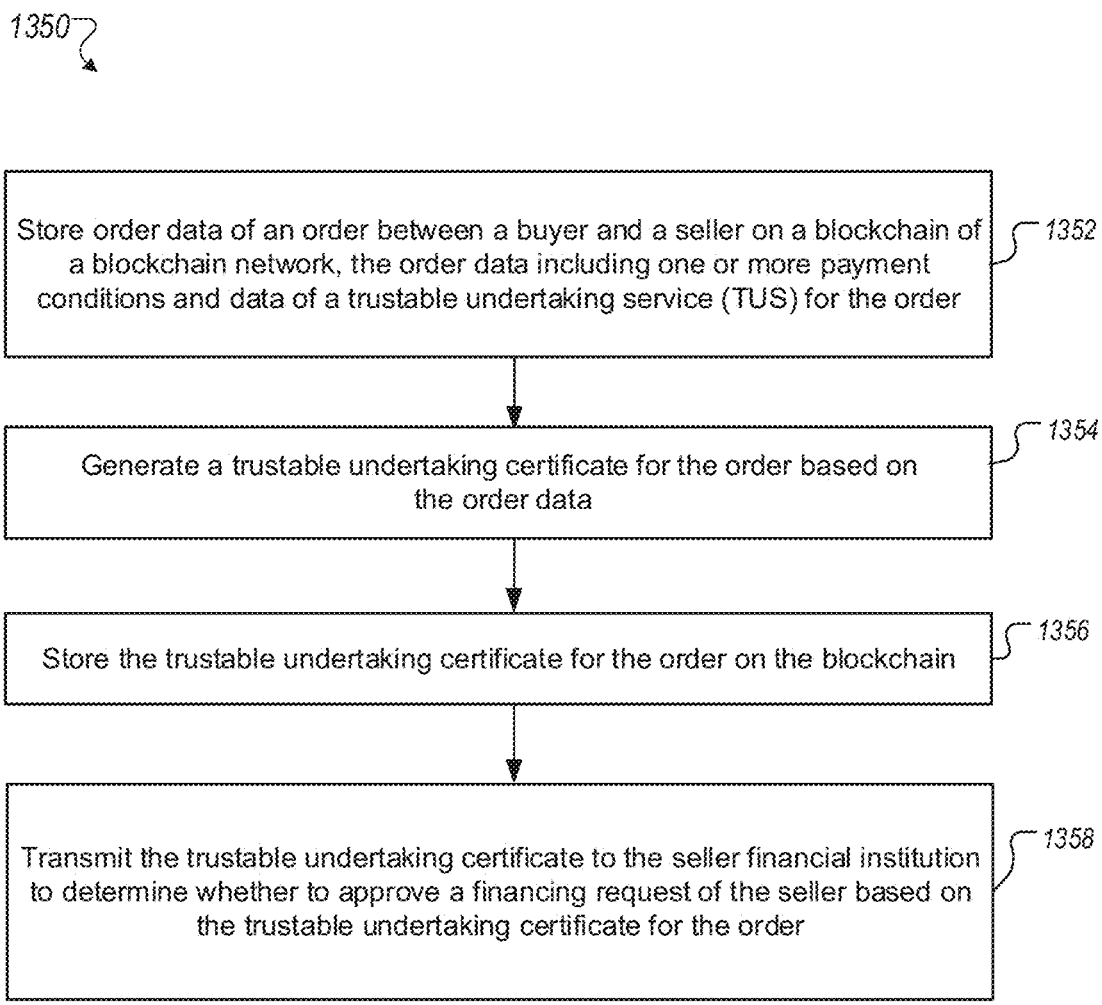
FIG. 13C is a flowchart illustrating an example of a process in accordance with embodiments of this specification.

FIG. 13C is a flowchart illustrating an example of a process 1350 for managing blockchain-based transaction trading services that can be executed by a blockchain-based trustable trading and financing system (e.g., the blockchain-based trustable trading and financing system 300 of FIG. 3) in accordance with embodiments of this specification. The blockchain-based trustable trading and financing system can include a blockchain network. The blockchain network can be a public, private, or consortium blockchain network. In some embodiments, the blockchain network can be the blockchain network 102 of FIG. 1, the blockchain network 212 of FIG. 2, or the blockchain network 320 of FIG. 3. The blockchain network can be composed of a plurality of trustable nodes. Each trustable node can correspond to a respective participant of trade in the blockchain-based trustable trading and financing system. In some embodiments, one or more of the steps of the process 1350 can be performed by a trustable network node of the blockchain network (e.g., the trading platform node 321, the buyer bank node 322, or the seller bank node 324). In some embodiments, one or more of the steps of the process 1350 can be performed by a computing device connected to the trustable network node of the blockchain network (e.g., the trading platform 310, a computing device of the buyer bank 330, or a computing device of the seller bank node 324). In some embodiments, one or more of the steps of the process 1300 can be performed by a combination or an integration of a trustable network node of the blockchain network (e.g., the trading platform node 321) and the computing device connected to the trustable network node of the blockchain network (e.g., the trading platform 310). In some embodiments, one or more of the steps of the process 1350 can be performed according to the techniques described with respect to the processes 500, 600, 700, 1000, 1100, and/or 1200.

At 1352, order data of an order between a buyer and a seller is stored on a blockchain of the blockchain network for the order. The order data includes one or more payment conditions for the order and data of a trustable undertaking service (TU) for the order. The order data can be stored by a trustable trading platform node corresponding to a trading platform. The trading platform is configured to provide blockchain-based trustable trading services between the buyer and the seller. The order data can be stored on the blockchain after the order is confirmed by the buyer and the seller on the trading platform. The TU service for the order is guaranteed by a buyer financial institution that automatically makes a payment on behalf of the buyer based on a credit of the buyer in the buyer financial institution to a seller financial institution associated with the seller in response to that a condition specified in a smart contract deployed on the blockchain is met.

The plurality of trustable nodes can include a trading platform node corresponding to the trading platform. The plurality of trustable nodes can include a buyer financial institution node corresponding to the buyer financial institution. The plurality of trustable nodes can include a seller financial institution node corresponding to the seller financial institution.

In some embodiments, one of the buyer financial institution and the seller financial institution is an offshore entity, and the other one of the buyer financial institution and the seller financial institution is an onshore entity. The offshore entity and the onshore entity are subject to different financial regulations. The buyer financial institution node corresponding to the buyer financial institution and the seller financial institution node corresponding to the seller financial institution belong to the same blockchain network of the plurality of trustable nodes.

At 1354, a trustable undertaking certificate for the order is generated based on the order data including the TU data. In some embodiments, the trustable undertaking certificate includes at least one of: an identifier of the trustable undertaking certificate, an effective time of the trustable undertaking certificate, the corresponding payment condition for the order payment, information of the order including at least one of an order identifier, a total cost of the order, or product information, logistics information for the order including at least one of a shipping method, a trade term, a shipping cost, or a shipping insurance cost, information of the buyer and the seller, information of the buyer financial institution and the seller financial institution, or information of the buyer financial account in the buyer financial institution and the seller financial account in the seller financial institution.

At 1356, the trustable undertaking certificate for the order is stored on the blockchain.

In some embodiments, the trading platform node is configured to: verify whether the buyer is authorized for the TU service for the order on the trading platform with a computing device of the buyer financial institution through the buyer financial institution node. In some embodiments, generating the trustable undertaking certificate for the order on the blockchain is in response to verifying that the buyer is authorized for the corresponding TU service for the order guaranteed by the buyer financial institution.

In some embodiments, the trading platform node is configure to submit a verification request with the trustable undertaking certificate to a computing device of the buyer financial institution through the buyer financial institution node, and the buyer financial institution is configured to verify whether the buyer is authorized for the corresponding TU service for the order based on the trustable undertaking certificate.

In some embodiments, the trading platform node is configured to: in response to verifying that the buyer is authorized for the corresponding TU service for the order guaranteed by the buyer financial institution, transmit a verification message to the trading platform confirming that the buyer is authorized for the corresponding TU service for the order.

In some embodiments, the trading platform is configured to validate the order after receiving the verification message from the trading platform node.

In some embodiments, the trading platform node is configured to transmit the verification request after storing the order data of the order on the blockchain.

In some embodiments, the corresponding payment condition is determined based on the corresponding TU service for the order.

At 1358, the trustable undertaking certificate is transmitted to a computing device of a seller financial institution to determine whether to approve a financing request of the seller based on the trustable undertaking certificate.

In some embodiments, the seller financial institution node is configured to: receive approval data from the computing device of the seller financial institution, the approval data indicating that the seller financial institution has approved the financing request of the seller for a financing amount based on the trustable undertaking certificate, and store the approval data on the blockchain, where the approval data references the trustable undertaking certificate.

In some embodiments, the seller financial institution node is configured to: receive financing payment data from the computing device of the seller financial institution, the financing payment data confirming that a financing amount associated with the financing request has been paid by the seller financial account in the seller financial institution, and store the financing payment data on the blockchain.

In some embodiments, the seller financial institution node is configured to: receive payment reception data from the computing device of the seller financial institution, the payment reception data confirming that the order payment for the order has been received by the seller financial account in the seller financial institution from the buyer financial institution, and store the payment reception data on the blockchain.

In some embodiments, the trading platform node is configured to: generate a corresponding smart contract for the order based on the order data of the order. The corresponding smart contract includes an automatic function that automatically instructs the buyer financial institution to make an order payment for the order to the seller according to the TU service for the order in response to determining that a corresponding payment condition for the order payment is met.

In some embodiments, the buyer financial institution node is configured to: execute the corresponding smart contract to automatically instruct the computing device of the buyer financial institution to make the order payment to the seller according to the TU service for the order in response to determining that the corresponding payment condition for the order payment is met.

In some embodiments, the buyer financial institution node is configured to: execute the corresponding smart contract to generate an automatic payment command in response to determining that the corresponding payment condition for the order payment is met, the automatic payment command instructing the computing device of the buyer financial institution to make the order payment to the seller according to the corresponding trustable undertaking service for the order; and transmit the automatic payment command to the computing device of the buyer financial institution.

In some embodiments, the blockchain network is configured to: execute the corresponding smart contract to automatically instruct the computing device of the buyer financial institution to make the order payment to the seller according to the corresponding TU service for the order in response to determining that a predetermined time has reached or a predetermined time period has lapsed after the corresponding payment condition is met.

In some embodiments, the predetermined time or the predetermined time period is determined based on the TU service for the order.

In some embodiments, the one or more payment conditions includes a first payment condition for a first payment for the order and a second payment condition for a second payment for the order. The second payment is the order payment made according to the TU service for the order, and the second condition includes the corresponding payment condition.

In some embodiments, the buyer financial institution node is configured to: execute the corresponding smart contract to automatically instruct the computing device of the buyer financial institution to make the first payment to the seller according to a trustable automatic payment service for the buyer provided by the buyer financial institution in response to determining that the first payment condition for the first payment is met, and execute the corresponding smart contract to automatically instruct the computing device of the buyer financial institution to make the second payment to the seller according to the corresponding TU service for the order in response to determining that the second payment condition for the second payment is met.

In some embodiments, the first payment is an initial payment for the order, and the first payment condition includes a validation of the order. The second payment is a remaining payment for the order, and the second payment condition includes at least one of: a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, or a consensus having been reached between the buyer and the seller on the order.

In some embodiments, the trading platform node is configured to: after the buyer logs in a buyer trading account on the trading platform, communicate with the computing device of the buyer financial institution through the buyer financial institution node to verify whether a buyer financial account of the buyer in the buyer financial institution is qualified for the trustable automatic payment service, the buyer trading account including information of the buyer financial account.

In some embodiments, the corresponding smart contract further includes an order status update function that automatically updates a status of the order in response to determining the status of the order is changed based on order status data uploaded to the corresponding blockchain.

In some embodiments, the status of the order indicates at least one of: products associated with the order having been prepared or shipped by the seller, the products having been inspected by a customs office, the products being transported by at least one logistics provider, a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, a consensus having been reached between the buyer and the seller on the order, the automatic payment having been made by the buyer financial institution, the automatic payment having been received by the seller, or the products having been received by the buyer.

In some embodiments, the blockchain networks of the plurality of trustable nodes further includes at least one of: a customs office node corresponding to the customs office, the order status data including custom data uploaded to the corresponding blockchain by the customs office node, or a logistic provider node corresponding to the at least one logistics provider, the order status data including logistic data uploaded to the corresponding blockchain by the logistic provide node.

In some embodiments, the order status data includes at least one of logistics data, supplychain data, customs data, bill of lading data, or payment data.

Figure 14A:
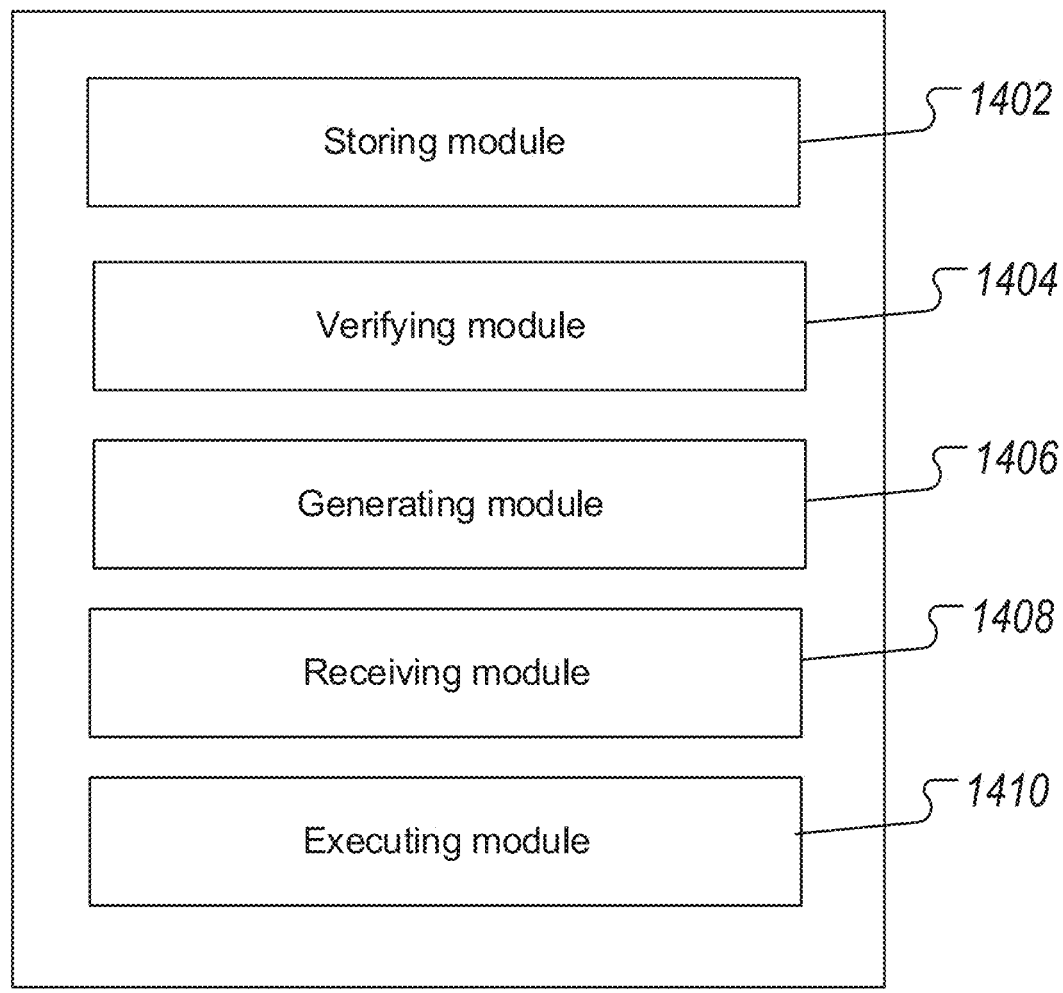
FIG. 14A depicts examples of modules of an apparatus in accordance with embodiments of this specification.

FIG. 14A depicts examples of modules of an apparatus 1400 in accordance with embodiments of this specification. The apparatus 1400 can be an example of an embodiment of a blockchain network configured to manage blockchain-based trustable trading services. The apparatus 1400 can correspond to the embodiments described above, and the apparatus 1400 includes the following: a storing module 1402 that store order data of an order between a buyer and a seller on a blockchain of the blockchain network for the order after the order is confirmed by the buyer and the seller on a trading platform, the order data including one or more payment conditions for the order; a verifying module 1404 that verifies the buyer has a trustable automatic payment service guaranteed by a buyer financial institution that automatically makes a payment on behalf of the buyer in response to that a condition specified in a smart contract deployed on the blockchain is met; a generating module 1406 that generates a corresponding smart contract for the order based on the order data of the order, the corresponding smart contract including an automatic function that automatically instructs the buyer financial institution to make an order payment for the order to the seller in response to determining that a corresponding payment condition for the order payment is met; a receiving module 1408 that receives order status data of the order uploaded to the blockchain; and an executing module 1410 that executes the corresponding smart contract to automatically instruct a computing device of the buyer financial institution to make the order payment to the seller according to the trustable AP service in response to determining that the corresponding payment condition for the order payment is met based on the order status data.

In some embodiments, the apparatus 1400 includes a buyer financial institution node corresponding to the buyer financial institution. The buyer financial institution node is configured to communicate with the computing device of the buyer financial institution to verify that the buyer has the trustable automatic payment service guaranteed by the buyer financial institution and execute the corresponding smart contract.

In some embodiments, the buyer financial institution node is configured to receive order payment data confirming that the buyer financial institution has made the order payment to the seller and store the order payment data on the corresponding blockchain.

In some embodiments, the trading platform is configured to: receive the order payment data from the corresponding blockchain; and feed back a payment status to the buyer and the seller based on the order payment data.

In some embodiments, the buyer financial institution node is configured to: execute the corresponding smart contract to automatically instruct the computing device of the buyer financial institution to make the order payment to the seller in response to determining that a predetermined time has reached or a predetermined time period has lapsed after the corresponding payment condition for the order payment is met.

In some embodiments, the buyer financial institution node is configured to: execute the corresponding smart contract to generate an automatic payment command in response to determining that the corresponding payment condition for the order payment is met; and transmit the automatic payment command to the computing device of the buyer financial institution, the automatic payment command instructing the computing device of the buyer financial institution to make the order payment to the seller according to the trustable automatic payment service.

In some embodiments, the buyer financial institution node is configured to store order payment data on the corresponding blockchain, the order payment data confirming that the order payment has been made by the buyer financial institution to the seller.

In some embodiments, the buyer has a buyer financial account in the buyer financial institution, and the seller has a seller financial account in a seller financial institution. The buyer financial institution node is configured to execute the corresponding smart contract to automatically instruct the computing device of the buyer financial institution to make the order payment directly to the seller financial account in the seller financial institution, without going through the trading platform, in response to determining that the corresponding payment condition for the order payment is met.

In some embodiments, the apparatus 1400 includes a seller financial institution node corresponding to the seller financial institution.

In some embodiments, one of the buyer financial institution and the seller financial institution is an offshore entity, and the other one of the buyer financial institution and the seller financial institution is an onshore entity. The offshore entity and the onshore entity are subject to different financial regulations, and the buyer financial institution node corresponding to the buyer financial institution and the seller financial institution node corresponding to the seller financial institution belong to the same blockchain network of the plurality of trustable nodes.

In some embodiments, the buyer financial institution is configured to: in response to the automatic payment command, transfer a digital value corresponding to the order payment to the seller financial institution.

In some embodiments, the seller financial institution node is configured to: store payment reception data on the corresponding blockchain, the payment reception data confirming that the order payment has been received by the seller financial account in the seller financial institution from the buyer financial institution.

In some embodiments, the apparatus 1400 includes a trading platform node corresponding to the trading platform.

In some embodiments, the trading platform node is configured to generate the corresponding smart contract for the order from a smart contract template based on the order data, the smart contract template including a plurality of functions for the trustable trading services, and in generating the corresponding smart contract for the order, the trading platform node is configured to call one or more of the plurality of functions in the smart contract template and use the order data as input to the one or more of the plurality of functions in the smart contract template.

In some embodiments, the trading platform node is configured to: after the buyer logs in a buyer trading account on the trading platform, communicate with the buyer financial institution node to verify whether a buyer financial account of the buyer in the buyer financial institution is qualified for the trustable automatic payment service on the trading platform, the buyer trading account including information of the buyer financial account.

In some embodiments, the trading platform is configured to: permit the buyer to draft or review the order on the trading platform in response to determining that the buyer financial account is qualified for the trustable automatic payment service.

In some embodiments, the corresponding smart contract further includes: an order status update function that automatically updates a status of the order in response to determining the status of the order is changed based on order status data uploaded to the corresponding blockchain.

In some embodiments, the order status data includes at least one of logistics data, supplychain data, customs data, bill of lading data, or payment data.

In some embodiments, the status of the order indicates at least one of: products associated with the order having been prepared or shipped by the seller, the products having been inspected by a customs office, the products being transported by at least one logistics provider, a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, a consensus having been reached between the buyer and the seller on the order, the automatic payment having been made by the buyer financial institution, the automatic payment having been received by the seller, or the products having been received by the buyer.

In some embodiments, the apparatus 1400 further includes at least one of: a customs office node corresponding to a customs office, where the order status data includes custom data uploaded to the corresponding blockchain by the customs office node, or a logistic provider node corresponding to at least one logistics provider, where the order status data include logistic data uploaded to the corresponding blockchain by the logistic provide node.

In some embodiments, the one or more payment conditions includes a first payment condition for a first payment for the order and a second payment condition for a second payment for the order. The buyer financial institution node is configured to: execute the corresponding smart contract to automatically instruct the computing device of the buyer financial institution to make the first payment to the seller in response to determining that the first condition for the first payment is met, and execute the corresponding smart contract to automatically instruct the computing device of the buyer financial institution to make the second payment to the seller in response to determining that the second condition for the second payment is met.

In some embodiments, the first payment is an initial payment of the order, and the first payment condition includes the order having been validated on the trading platform. The second payment is a remaining payment of the order, and the second payment condition includes at least one of: a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, or a consensus having been reached between the buyer and the seller on the order.

Figure 14B:
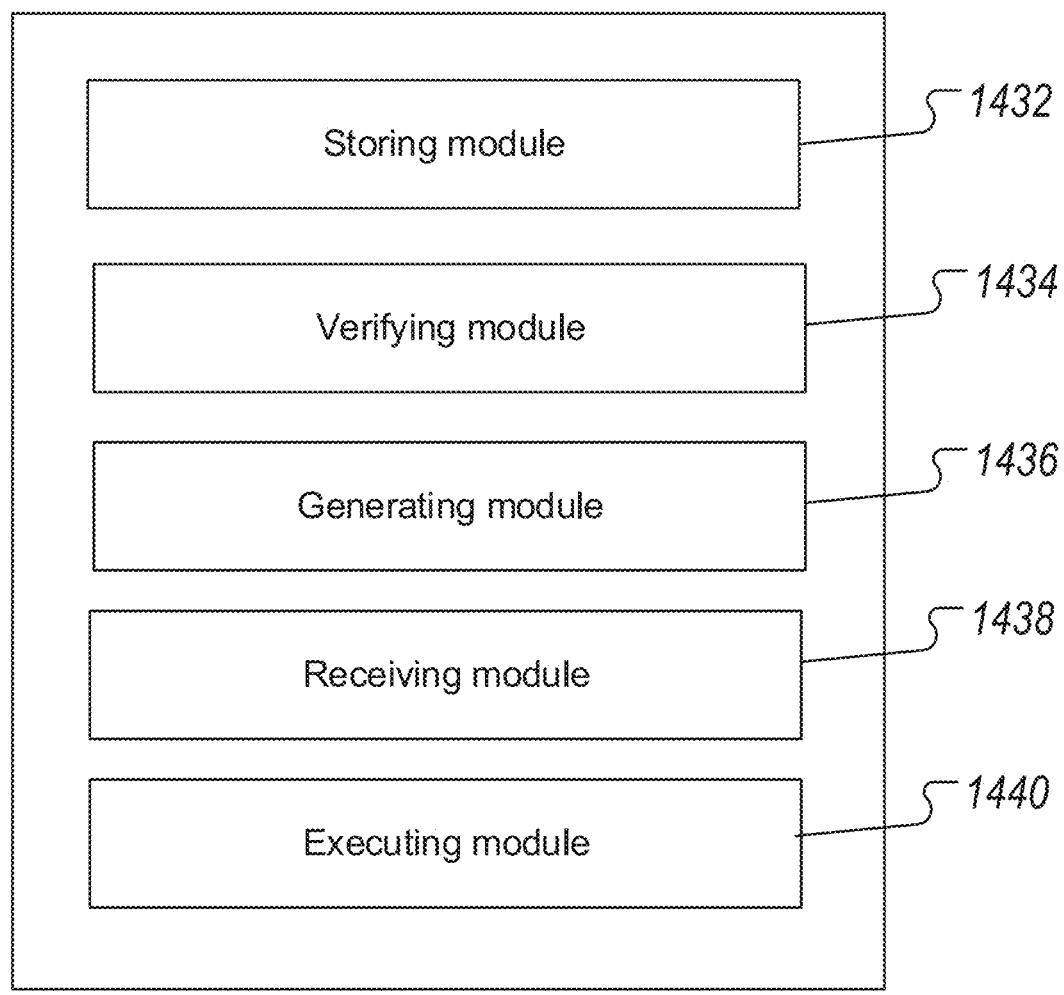
FIG. 14B depicts examples of modules of another apparatus in accordance with embodiments of this specification.

FIG. 14B depicts examples of modules of an apparatus 1430 in accordance with embodiments of this specification. The apparatus 1430 can be an example of an embodiment of a blockchain network configured to manage blockchain-based trustable trading services. The apparatus 1430 can correspond to the embodiments described above, and the apparatus 1430 includes the following: a storing module 1432 that store order data of an order between a buyer and a seller on a blockchain of the blockchain network for the order after the order is confirmed by the buyer and the seller on a trading platform, the order data including one or more payment conditions for the order and data of a trustable undertaking service (TU) for the order; a verifying module 1434 that verifies the buyer has the TU guaranteed by a buyer financial institution that automatically makes a payment on behalf of the buyer in response to that a condition specified in a smart contract deployed on the blockchain is met; a generating module 1436 that generates a corresponding smart contract for the order based on the order data of the order, the corresponding smart contract including an automatic function that automatically instructs the buyer financial institution to make an order payment for the order to the seller according to the TU service for the order in response to determining that a corresponding payment condition for the order payment is met; a receiving module 1438 that receives order status data of the order uploaded to the blockchain; and an executing module 1440 that executes the corresponding smart contract to automatically instruct a computing device of the buyer financial institution to make the order payment to the seller according to the TU in response to determining that the corresponding payment condition for the order payment is met based on the order status data.

In some embodiments, the apparatus 1430 includes a buyer financial institution node corresponding to the buyer financial institution. The buyer financial institution node is configured to: receive order payment data confirming that the buyer financial institution has successfully made the order payment to the seller according to the corresponding TU service for the order; and store the order payment data on the corresponding blockchain.

In some embodiments, the apparatus 1430 includes a seller financial institution node corresponding to a seller financial institution. The seller has a seller financial account in the seller financial institution, and the seller financial institution node is configured to store payment reception data on the corresponding blockchain, the payment reception data confirming that the order payment for the order has been received by the seller financial account in the seller financial institution from the buyer financial institution.

In some embodiments, the apparatus 1430 includes a trading platform node corresponding to the trading platform. The trading platform node is configured to: determine, based on the TU data, that the buyer selects to use the corresponding TU service for the order on the trading platform, and transmit a request to the computing device of the buyer financial institution through the buyer financial institution node, the request requesting the buy financial institution to verify whether the buyer is qualified for the corresponding TU service for the order guaranteed by the buyer financial institution.

In some embodiments, the trading platform is configured to provide a user interface for receiving user input of the order data, and the user interface includes a selection to use the corresponding TU service for the order.

In some embodiments, the buyer financial institution node is configured to: receive verification data from the computing device of the buyer financial institution, the verification data confirming that the buyer has the corresponding TU service for the order guaranteed by the buyer financial institution, and store the verification data on the corresponding blockchain.

In some embodiments, the trading platform is configured to: determine, based on the verification data stored on the corresponding blockchain, that the buyer has the corresponding TU service for the order guaranteed by the buyer financial institution, and validate the order after determining that the buyer has the corresponding TU service for the order guaranteed by the buyer financial institution.

In some embodiments, the trading platform node is configured to transmit the request after storing the order data of the order on the corresponding blockchain.

In some embodiments, the corresponding payment condition for the order payment is determined based on the corresponding TU service for the order.

In some embodiments, the buyer financial institution node is configured to execute the corresponding smart contract to automatically instruct the computing device of the buyer financial institution to make the order payment to the seller according to the corresponding TU service for the order in response to determining that a predetermined time has reached or a predetermined time period has lapsed after the corresponding payment condition for the order payment is met.

In some embodiments, the predetermined time or the predetermined time period is determined based on the corresponding TU service for the order.

In some embodiments, the one or more payment conditions includes a first payment condition for a first payment for the order and a second payment condition for a second payment for the order. The second payment is the order payment made according to the corresponding TU service, and the second payment condition includes the corresponding payment condition. The buyer financial institution node is configured to execute the corresponding smart contract to automatically instruct the computing device of the buyer financial institution to make the second payment to the seller according to the corresponding TU service for the order in response to determining that the second payment condition for the second payment is met.

In some embodiments, the buyer financial institution node is configured to: execute the corresponding smart contract to automatically instruct the computing device of the buyer financial institution to make the first payment to the seller according to a trustable automatic payment service for the buyer provided by the buyer financial institution in response to determining that the first payment condition for the first payment is met.

In some embodiments, the trading platform node is configured to: after the buyer logs in a buyer trading account on the trading platform, communicate with the computing device of the buyer financial institution through the buyer financial institution node to verify whether a buyer financial account of the buyer in the buyer financial institution is qualified for the trustable automatic payment service, the buyer trading account including information of the buyer financial account.

In some embodiments, the first payment is an initial payment for the order, and the first payment condition includes a validation of the order. The second payment is a remaining payment for the order, and the second payment condition includes at least one of: a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, or a consensus having been reached between the buyer and the seller on the order.

In some embodiments, the corresponding smart contract further includes an order status update function that automatically updates a status of the order in response to determining the status of the order is changed based on order status data uploaded to the corresponding blockchain.

In some embodiments, the status of the order indicates at least one of: products associated with the order having been prepared or shipped by the seller, the products having been inspected by a customs office, the products being transported by at least one logistics provider, a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, a consensus having been reached between the buyer and the seller on the order, the automatic payment having been made by the buyer financial institution, the automatic payment having been received by the seller, or the products having been received by the buyer.

In some embodiments, the blockchain networks of the plurality of trustable nodes further includes at least one of: a customs office node corresponding to the customs office, the order status data including custom data uploaded to the corresponding blockchain by the customs office node, or a logistic provider node corresponding to the at least one logistics provider, the order status data including logistic data uploaded to the corresponding blockchain by the logistic provide node.

In some embodiments, the order status data includes at least one of logistics data, supplychain data, customs data, bill of lading data, or payment data.

Figure 14C:
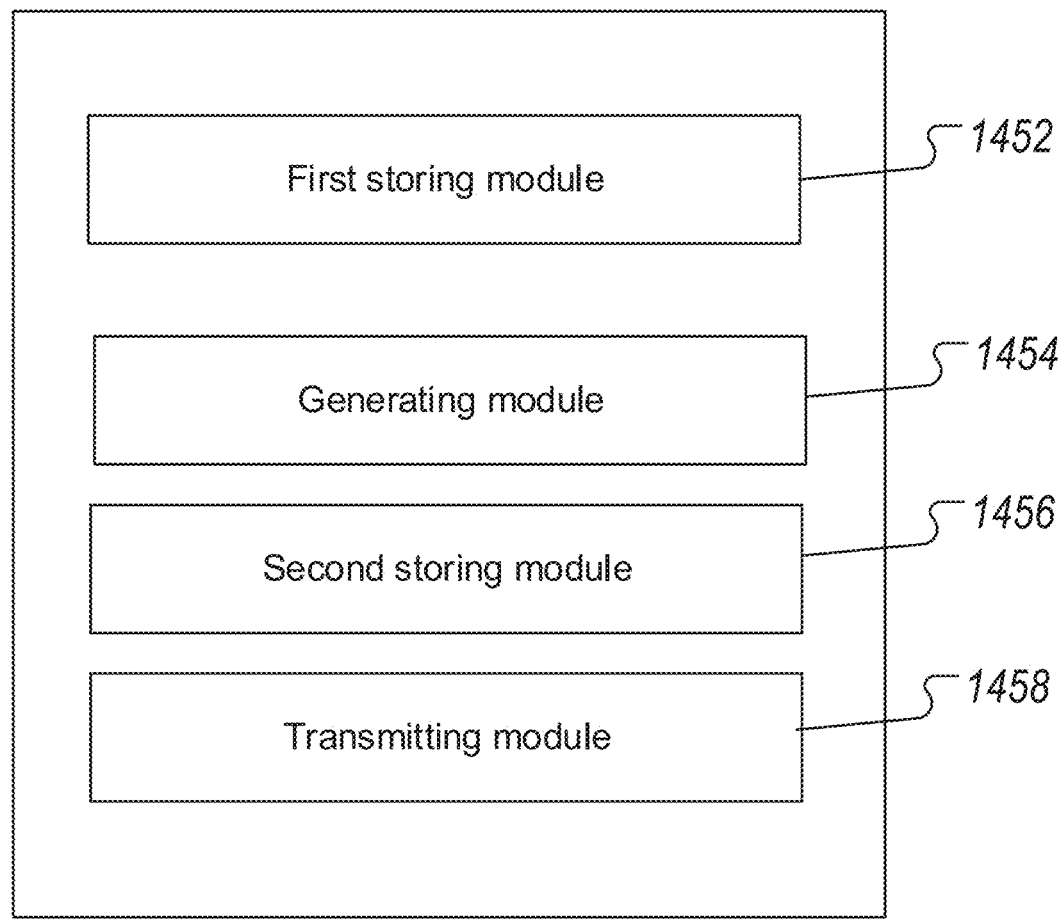
FIG. 14C depicts examples of modules of another apparatus in accordance with embodiments of this specification.

FIG. 14C depicts examples of modules of an apparatus 1450 in accordance with embodiments of this specification. The apparatus 1450 can be an example of an embodiment of a blockchain network configured to manage blockchain-based trustable trading services. The apparatus 1450 can correspond to the embodiments described above, and the apparatus 1450 includes the following: a first storing module 1452 that store order data of an order between a buyer and a seller on a blockchain of the blockchain network for the order after the order is confirmed by the buyer and the seller on a trading platform, the order data including one or more payment conditions for the order and data of a trustable undertaking (TU) service for the order, the TU service being guaranteed by a buyer financial institution that automatically makes a payment on behalf of the buyer in response to that a condition specified in a smart contract deployed on the blockchain is met; a generating module 1454 that generates a trustable undertaking certificate for the order based on the order data including the TU data; a second storing module 1456 that stores the trustable undertaking certificate for the order on the blockchain; and a transmitting module 1458 that transmits the trustable undertaking certificate to a computing device of a seller financial institution to determine whether to approve a financing request of the seller based on the trustable undertaking certificate.

The apparatus 1450 includes a plurality of trustable nodes. In some embodiments, the apparatus 1450 includes a trading platform node corresponding to the trading platform. In some embodiments, the apparatus 1450 includes a buyer financial institution node corresponding to the buyer financial institution. In some embodiments, the apparatus 1450 includes a seller financial institution node corresponding to the seller financial institution.

In some embodiments, one of the buyer financial institution and the seller financial institution is an offshore entity, and the other one of the buyer financial institution and the seller financial institution is an onshore entity. The offshore entity and the onshore entity are subject to different financial regulations. The buyer financial institution node corresponding to the buyer financial institution and the seller financial institution node corresponding to the seller financial institution belong to the same blockchain network of the plurality of trustable nodes.

In some embodiments, the seller financial institution node is configured to: receive approval data from the computing device of the seller financial institution, the approval data indicating that the seller financial institution has approved the financing request of the seller for a financing amount based on the trustable undertaking certificate, and store the approval data on the blockchain, where the approval data references the trustable undertaking certificate.

In some embodiments, the seller financial institution node is configured to: receive financing payment data from the computing device of the seller financial institution, the financing payment data confirming that a financing amount associated with the financing request has been paid by the seller financial account in the seller financial institution, and store the financing payment data on the blockchain.

In some embodiments, the trustable undertaking certificate includes at least one of: an identifier of the trustable undertaking certificate, an effective time of the trustable undertaking certificate, the corresponding payment condition for the order payment, information of the order including at least one of an order identifier, a total cost of the order, or product information, logistics information for the order including at least one of a shipping method, a trade term, a shipping cost, or a shipping insurance cost, information of the buyer and the seller, information of the buyer financial institution and the seller financial institution, or information of the buyer financial account in the buyer financial institution and the seller financial account in the seller financial institution.

In some embodiments, the seller financial institution node is configured to: receive payment reception data from the computing device of the seller financial institution, the payment reception data confirming that the order payment for the order has been received by the seller financial account in the seller financial institution from the buyer financial institution, and store the payment reception data on the blockchain.

In some embodiments, the trading platform node is configured to: generate a corresponding smart contract for the order based on the order data of the order. The corresponding smart contract includes an automatic function that automatically instructs the buyer financial institution to make an order payment for the order to the seller according to the corresponding TU service for the order in response to determining that a corresponding payment condition for the order payment is met.

In some embodiments, the trading platform node is configured to: verify whether the buyer is authorized for the corresponding TU service for the order on the trading platform with a computing device of the buyer financial institution through the buyer financial institution node.

In some embodiments, generating the trustable undertaking certificate for the order on the blockchain is in response to verifying that the buyer is authorized for the corresponding TU service for the order guaranteed by the buyer financial institution.

In some embodiments, the trading platform node is configured to submit a verification request with the trustable undertaking certificate to a computing device of the buyer financial institution through the buyer financial institution node, and the buyer financial institution is configured to verify whether the buyer is authorized for the corresponding TU service for the order based on the trustable undertaking certificate.

In some embodiments, the trading platform node is configured to: in response to verifying that the buyer is authorized for the corresponding TU service for the order guaranteed by the buyer financial institution, transmit a verification message to the trading platform confirming that the buyer is authorized for the corresponding TU service for the order.

In some embodiments, the trading platform is configured to validate the order after receiving the verification message from the trading platform node.

In some embodiments, the trading platform node is configured to transmit the verification request after storing the order data of the order on the blockchain.

In some embodiments, the corresponding payment condition is determined based on the corresponding TU service for the order.

In some embodiments, the buyer financial institution node is configured to: execute the corresponding smart contract, where executing the corresponding smart contract includes automatically instructing the computing device of the buyer financial institution to make the order payment to the seller according to the corresponding TU service for the order in response to determining that the corresponding payment condition for the order payment is met.

In some embodiments, the buyer financial institution node is configured to: execute the corresponding smart contract to generate an automatic payment command in response to determining that the corresponding payment condition for the order payment is met, the automatic payment command instructing the computing device of the buyer financial institution to make the order payment to the seller according to the corresponding trustable undertaking service for the order; and transmit the automatic payment command to the computing device of the buyer financial institution.

In some embodiments, the blockchain network is configured to: execute the corresponding smart contract to automatically instruct the computing device of the buyer financial institution to make the order payment to the seller according to the corresponding TU service for the order in response to determining that a predetermined time has reached or a predetermined time period has lapsed after the corresponding payment condition is met.

In some embodiments, the predetermined time or the predetermined time period is determined based on the corresponding TU service for the order.

In some embodiments, the one or more payment conditions includes a first payment condition for a first payment for the order and a second payment condition for a second payment for the order. The second payment is the order payment made according to the TU service for the order, and the second condition includes the corresponding payment condition.

In some embodiments, the buyer financial institution node is configured to: execute the corresponding smart contract to automatically instruct the computing device of the buyer financial institution to make the first payment to the seller according to a trustable automatic payment service for the buyer provided by the buyer financial institution in response to determining that the first payment condition for the first payment is met, and execute the corresponding smart contract to automatically instruct the computing device of the buyer financial institution to make the second payment to the seller according to the corresponding TU service for the order in response to determining that the second payment condition for the second payment is met.

In some embodiments, the first payment is an initial payment for the order, and the first payment condition includes a validation of the order. The second payment is a remaining payment for the order, and the second payment condition includes at least one of: a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, or a consensus having been reached between the buyer and the seller on the order.

In some embodiments, the trading platform node is configured to: after the buyer logs in a buyer trading account on the trading platform, communicate with the computing device of the buyer financial institution through the buyer financial institution node to verify whether a buyer financial account of the buyer in the buyer financial institution is qualified for the trustable automatic payment service, the buyer trading account including information of the buyer financial account.

In some embodiments, the corresponding smart contract further includes an order status update function that automatically updates a status of the order in response to determining the status of the order is changed based on order status data uploaded to the corresponding blockchain.

In some embodiments, the status of the order indicates at least one of: products associated with the order having been prepared or shipped by the seller, the products having been inspected by a customs office, the products being transported by at least one logistics provider, a bill of lading associated with the order having been submitted by the seller on the trading platform, the submitted bill of lading having been confirmed by the buyer on the trading platform, an invoice associated with the order having been generated by the blockchain network, the generated invoice having been confirmed by the buyer, a consensus having been reached between the buyer and the seller on the order, the automatic payment having been made by the buyer financial institution, the automatic payment having been received by the seller, or the products having been received by the buyer.

In some embodiments, the blockchain networks of the plurality of trustable nodes further includes at least one of: a customs office node corresponding to the customs office, the order status data including custom data uploaded to the corresponding blockchain by the customs office node, or a logistic provider node corresponding to the at least one logistics provider, the order status data including logistic data uploaded to the corresponding blockchain by the logistic provide node.

In some embodiments, the order status data includes at least one of logistics data, supplychain data, customs data, bill of lading data, or payment data.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 14A, 14B, or 14C, it can be interpreted as illustrating internal functional modules and a structure of a blockchain network implementation apparatus. An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures, as described in this specification. This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with embodiments of the methods provided herein.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiment can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A system for managing blockchain-based trustable transaction services, comprising:
   a blockchain network of a plurality of trustable nodes that comprises:
      a trading platform node corresponding to a trading platform for providing blockchain-based trustable trading services between a buyer and a seller, wherein the buyer is verified to have a trustable undertaking (TU) service guaranteed by a buyer financial institution that automatically makes a payment for the buyer to the seller based on a credit of the buyer in the buyer financial institution in response to that a condition specified in a smart contract deployed on a blockchain of the blockchain network is met; and
      a buyer financial institution node corresponding to the buyer financial institution,
   wherein the trading platform node is configured to:
      store order data of an order on a corresponding blockchain of the blockchain network for the order after the order is confirmed by the buyer and the seller on the trading platform, the order data comprising one or more payment conditions for the order and TU service data representing a corresponding TU service for the order,
      generate a corresponding smart contract for the order based on the order data of the order, wherein the corresponding smart contract comprises one or more computer-executable logics, instructions, scripts, or lines of codes configured to be an automatic function that is automatically executed to instruct the buyer financial institution to make an order payment for the order to the seller according to the corresponding TU service for the order in response to determining that a corresponding payment condition for the order payment is met, and
      deploy the corresponding smart contract on the corresponding blockchain of the blockchain network,
   wherein, through a consensus process among the plurality of trustable nodes, the corresponding smart contract deployed on the corresponding blockchain is executable by the plurality of trustable nodes in the blockchain network, and
   wherein the buyer financial institution node is configured to:
      communicate with a computing device of the buyer financial institution to verify that the buyer has the corresponding TU service for the order guaranteed by the buyer financial institution, and
      execute the corresponding smart contract deployed on the corresponding blockchain of the blockchain network, wherein executing the corresponding smart contract comprises automatically instructing the computing device of the buyer financial institution to make the order payment to the seller according to the corresponding TU service in response to determining that the corresponding payment condition for the order payment is met.

2. The system of claim 1, wherein the buyer financial institution node is configured to:
   receive order payment data confirming that the buyer financial institution has successfully made the order payment to the seller according to the corresponding TU service for the order; and
   store the order payment data on the corresponding blockchain.

3. The system of claim 2, wherein the blockchain network of the plurality of trustable nodes further comprises:
   a seller financial institution node corresponding to a seller financial institution,
   wherein the seller has a seller financial account in the seller financial institution, and
   wherein the seller financial institution node is configured to store payment reception data on the corresponding blockchain, the payment reception data confirming that the order payment for the order has been received by the seller financial account in the seller financial institution from the buyer financial institution.

4. The system of claim 1, wherein the trading platform node is configured to:
   determine, based on the TU service data, that the buyer selects to use the corresponding TU service for the order on the trading platform, and
   transmit a request to the computing device of the buyer financial institution through the buyer financial institution node, the request requesting the buy financial institution to verify whether the buyer is qualified for the corresponding TU service for the order guaranteed by the buyer financial institution.

5. The system of claim 4, wherein the buyer financial institution node is configured to:
   receive verification data from the computing device of the buyer financial institution, the verification data confirming that the buyer has the corresponding TU service for the order guaranteed by the buyer financial institution, and
   store the verification data on the corresponding blockchain.

6. The system of claim 5, wherein the trading platform is configured to:
   determine, based on the verification data stored on the corresponding blockchain, that the buyer has the corresponding TU service for the order guaranteed by the buyer financial institution, and validate the order after determining that the buyer has the corresponding TU service for the order guaranteed by the buyer financial institution.

7. The system of claim 1, wherein the buyer financial institution node is configured to execute the corresponding smart contract to automatically instruct the computing device of the buyer financial institution to make the order payment to the seller according to the corresponding TU service for the order in response to determining that a predetermined time has reached or a predetermined time period has lapsed after the corresponding payment condition for the order payment is met.

8. The system of claim 1, wherein the one or more payment conditions comprises a first payment condition for a first payment for the order and a second payment condition for a second payment for the order,
wherein the second payment is the order payment made according to the corresponding TU service, and the second payment condition comprises the corresponding payment condition, and
wherein the buyer financial institution node is configured to:
execute the corresponding smart contract to automatically instruct the computing device of the buyer financial institution to make the second payment to the seller according to the corresponding TU service for the order in response to determining that the second payment condition for the second payment is met.

9. The system of claim 8, wherein the buyer financial institution node is configured to:
execute the corresponding smart contract to automatically instruct the computing device of the buyer financial institution to make the first payment to the seller according to a trustable automatic payment service for the buyer provided by the buyer financial institution in response to determining that the first payment condition for the first payment is met.

10. The system of claim 9, wherein the trading platform node is configured to:
after the buyer logs in a buyer trading account on the trading platform, communicate with the computing device of the buyer financial institution through the buyer financial institution node to verify whether a buyer financial account of the buyer in the buyer financial institution is qualified for the trustable automatic payment service, the buyer trading account comprising information of the buyer financial account.

11. The system of claim 8, wherein the first payment is an initial payment for the order, and the first payment condition comprises a validation of the order, and
wherein the second payment is a remaining payment for the order, and the second payment condition comprises at least one of:
a bill of lading associated with the order having been submitted by the seller on the trading platform,
the submitted bill of lading having been confirmed by the buyer on the trading platform,
an invoice associated with the order having been generated by the blockchain network,
the generated invoice having been confirmed by the buyer, or a consensus having been reached between the buyer and the seller on the order.

12. The system of claim 1, wherein the corresponding smart contract further comprises an order status update function that automatically updates a status of the order in response to determining the status of the order is changed based on order status data uploaded to the corresponding blockchain, and
wherein the status of the order indicates at least one of:
products associated with the order having been prepared or shipped by the seller,
the products having been inspected by a customs office,
the products being transported by at least one logistics provider,
a bill of lading associated with the order having been submitted by the seller on the trading platform,
the submitted bill of lading having been confirmed by the buyer on the trading platform,
an invoice associated with the order having been generated by the blockchain network,
the generated invoice having been confirmed by the buyer,
a consensus having been reached between the buyer and the seller on the order,
an automatic payment having been made by the buyer financial institution,
the automatic payment having been received by the seller, or
the products having been received by the buyer.

13. A computer-implemented method performed in a blockchain network of a plurality of trustable nodes, comprising:
in a trading platform node corresponding to a trading platform for providing blockchain-based trustable trading services between a buyer and a seller, wherein the buyer is verified to have a trustable undertaking (TU) service guaranteed by a buyer financial institution:
storing order data of an order on a corresponding blockchain of the blockchain network for the order after the order is confirmed by the buyer and the seller on the trading platform, the order data comprising one or more payment conditions for the order and TU service data representing a corresponding TU service for the order,
generating a corresponding smart contract for the order based on the order data of the order, wherein the corresponding smart contract comprises one or more computer-executable logics, instructions, scripts, or lines of codes configured to be an automatic function that is automatically executed to instruct the buyer financial institution to make an order payment for the order to the seller according to the corresponding TU service for the order in response to determining that a corresponding payment condition for the order payment is met and
deploying the corresponding smart contract on the corresponding blockchain of the blockchain network, wherein, through a consensus process among the plurality of trustable nodes, the corresponding smart contract deployed on the corresponding blockchain is executable by the plurality of trustable nodes in the blockchain network;
automatically making a payment for the buyer to the seller based on a credit of the buyer in the buyer financial institution in response to meeting a condition specified in a smart contract deployed on a blockchain of the blockchain network; and
in a buyer financial institution node corresponding to the buyer financial institution:
communicating with a computing device of the buyer financial institution to verify that the buyer has the corresponding TU service for the order guaranteed by the buyer financial institution; and executing the corresponding smart contract deployed on the corresponding blockchain of the blockchain network, wherein executing the corresponding smart contract comprises automatically instructing the computing device of the buyer financial institution to make the order payment to the seller according to the corresponding TU service in response to determining that the corresponding payment condition for the order payment is met.

14. The computer-implemented method of claim 13, further comprising:

receiving, by the buyer financial institution node, order payment data confirming that the buyer financial institution has successfully made the order payment to the seller according to the corresponding TU service for the order; and storing, by the buyer financial institution node, the order payment data on the corresponding blockchain.

15. The computer-implemented method of claim 13, further comprising:

determining, by the trading platform node, based on the TU service data, that the buyer selects to use the corresponding TU service for the order on the trading platform node, and transmitting, by the trading platform node, a request to the computing device of the buyer financial institution through the buyer financial institution node, the request requesting the buy financial institution to verify whether the buyer is qualified for the corresponding TU service for the order guaranteed by the buyer financial institution.

16. The computer-implemented method of claim 15, further comprising:

receiving, by the buyer financial institution node, verification data from the computing device of the buyer financial institution, the verification data confirming that the buyer has the corresponding TU service for the order guaranteed by the buyer financial institution, and storing the verification data on the corresponding blockchain.

17. The computer-implemented method of claim 15, further comprising:

determining, by the trading platform node, based on the verification data stored on the corresponding blockchain, that the buyer has the corresponding TU service for the order guaranteed by the buyer financial institution, and validating, by the trading platform node, the order after determining that the buyer has the corresponding TU service for the order guaranteed by the buyer financial institution.

18. A non-transitory, computer-readable medium storing instructions executable by a computer system in a blockchain network of a plurality of trustable nodes, wherein upon such execution:

in a trading platform node corresponding to a trading platform for providing blockchain-based trustable trading services between a buyer and a seller, wherein the buyer is verified to have a trustable undertaking (TU) service guaranteed by a buyer financial institution that automatically makes a payment for the buyer to the seller based on a credit of the buyer in the buyer financial institution in response to meeting a condition specified in a smart contract deployed on a blockchain of the blockchain network:

storing order data of an order on a corresponding blockchain of the blockchain network for the order after the order is confirmed by the buyer and the seller on the trading platform, the order data comprising one or more payment conditions for the order and TU service data representing a corresponding TU service for the order, generating a corresponding smart contract for the order based on the order data of the order, wherein the corresponding smart contract comprises one or more computer-executable logics, instructions, scripts, or lines of codes configured to be an automatic function that is automatically executed to instruct the buyer financial institution to make an order payment for the order to the seller according to the corresponding TU service for the order in response to determining that a corresponding payment condition for the order payment is met, and deploying the corresponding smart contract on the corresponding blockchain of the blockchain network, wherein, through a consensus process among the plurality of trustable nodes, the corresponding smart contract deployed on the corresponding blockchain is executable by the plurality of trustable nodes in the blockchain network; and in a buyer financial institution node corresponding to the buyer financial institution:

communicating with a computing device of the buyer financial institution to verify that the buyer has the corresponding TU service for the order guaranteed by the buyer financial institution; and executing the corresponding smart contract deployed on the corresponding blockchain of the blockchain network, wherein executing the corresponding smart contract comprises automatically instructing the computing device of the buyer financial institution to make the order payment to the seller according to the corresponding TU service in response to determining that the corresponding payment condition for the order payment is met.

19. The computer-implemented method of claim 13, further comprising:

in a seller financial institution node corresponding to a seller financial institution, and wherein the seller has a seller financial account in the seller financial institution, storing payment reception data on the corresponding blockchain, the payment reception data confirming that the order payment for the order has been received by the seller financial account in the seller financial institution from the buyer financial institution.

* * * * *

UNITED STATES PATENT AND TRADEMARK OFFICE
CERTIFICATE OF CORRECTION

PATENT NO. : 11,935,048 B2
APPLICATION NO. : 17/855363
DATED : March 19, 2024
INVENTOR(S) : Qisheng Ma, Feifei Jin and Xuan Tao It is certified that error appears in the above-identified patent and that said Letters Patent is hereby corrected as shown below:

In the Claims

In Claim 13, Line 50, after "met" insert --,--.

In Claim 17, delete "claim 15," and insert --claim 16,--.

Signed and Sealed this
Fifth Day of November, 2024

Katherine Kelly Vidal
*Director of the United States Patent and Trademark Office*